(12) United States Patent
Morofuji et al.

(10) Patent No.: US 6,233,009 B1
(45) Date of Patent: *May 15, 2001

(54) IMAGE-SHAKE CORRECTING DEVICE FOR DETECTING VIBRATION FREQUENCY AND FOR CHANGING VIBRATION CHARACTERISTICS

(75) Inventors: Tsuyoshi Morofuji; Akihiro Fujiwara, both of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,820

(22) Filed: Oct. 15, 1997

Related U.S. Application Data

(63) Continuation of application No. 08/638,319, filed on Apr. 26, 1996, now abandoned, which is a continuation of application No. 08/490,513, filed on Jun. 14, 1995, now abandoned, which is a continuation of application No. 08/118,803, filed on Sep. 8, 1993, now abandoned.

(51) Int. Cl.[7] .................................................. H04N 5/228
(52) U.S. Cl. ........................... 348/208; 348/214; 396/53; 396/55; 382/254
(58) Field of Search ..................................... 348/207, 208, 348/214; 396/52, 53, 55; 382/254

(56) References Cited

U.S. PATENT DOCUMENTS

| | | | | |
|---|---|---|---|---|
| 4,623,930 | * | 11/1986 | Oshima et al. | 348/208 |
| 4,713,697 | * | 12/1987 | Gotou et al. | 348/208 |
| 4,780,739 | * | 10/1988 | Kawakami et al. | 348/208 |
| 4,862,277 | * | 8/1989 | Iwaibana | 358/222 |
| 4,963,981 | * | 10/1990 | Todaka et al. | 358/213.13 |
| 5,060,074 | * | 10/1991 | Kimugasa et al. | 348/208 |
| 5,095,198 | * | 3/1992 | Nakagawa et al. | 250/201.8 |
| 5,117,246 | * | 5/1992 | Takahashi et al. | 354/202 |
| 5,172,150 | * | 12/1992 | Teramoto et al. | 354/202 |
| 5,282,044 | * | 1/1994 | Misawa et al. | 358/222 |

* cited by examiner

Primary Examiner—Matthew C. Bella
(74) Attorney, Agent, or Firm—Robin Blecker & Daley

(57) ABSTRACT

An image-shake correcting device includes a vibration sensor for detecting a vibration of an apparatus, a correcting member for correcting a movement of an image due to a vibration, a first controlling circuit for controlling the correcting member on the basis of an output of the vibration sensor and driving the correcting member in a direction in which the movement of the image is corrected, a detecting circuit for detecting a frequency and an amplitude of the vibration from the output of the vibration sensor, and a second controlling circuit for controlling a characteristic of the first controlling circuit on the basis of an output of the detecting circuit.

37 Claims, 40 Drawing Sheets

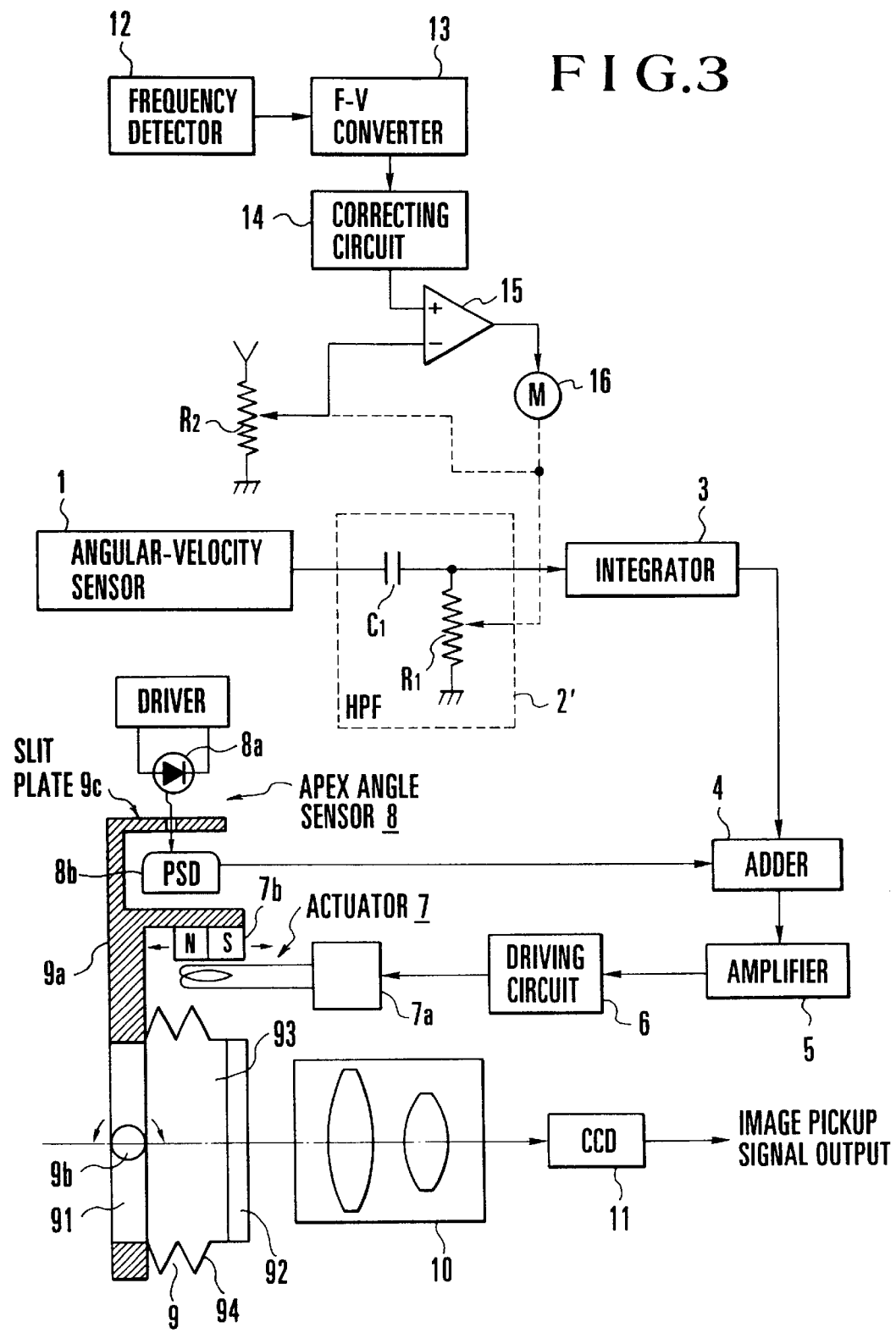

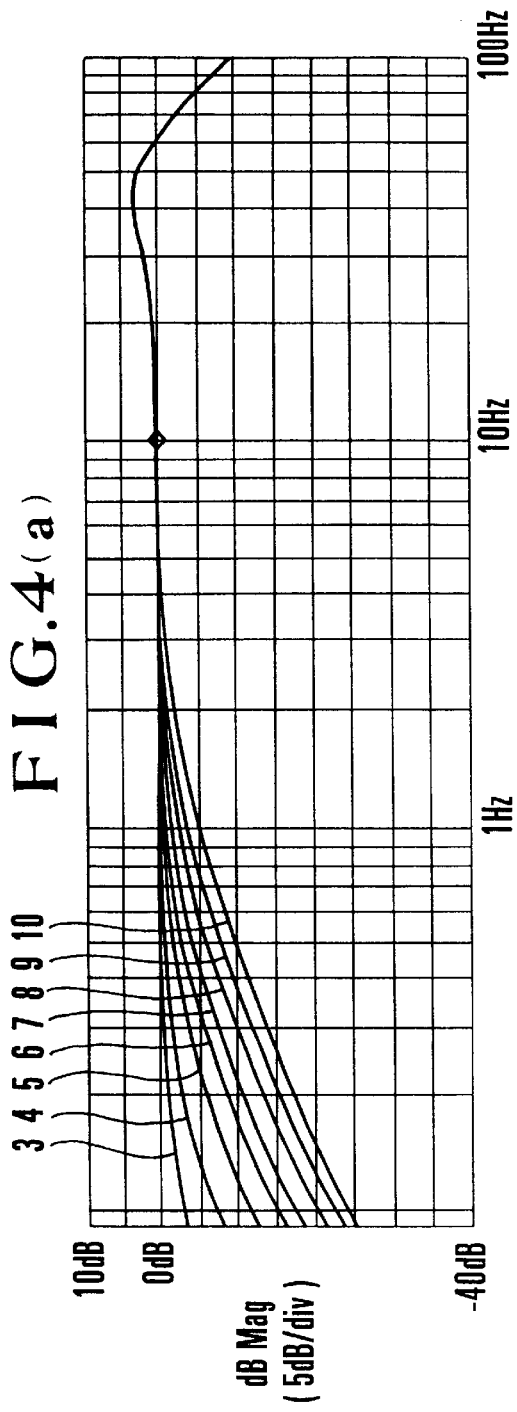
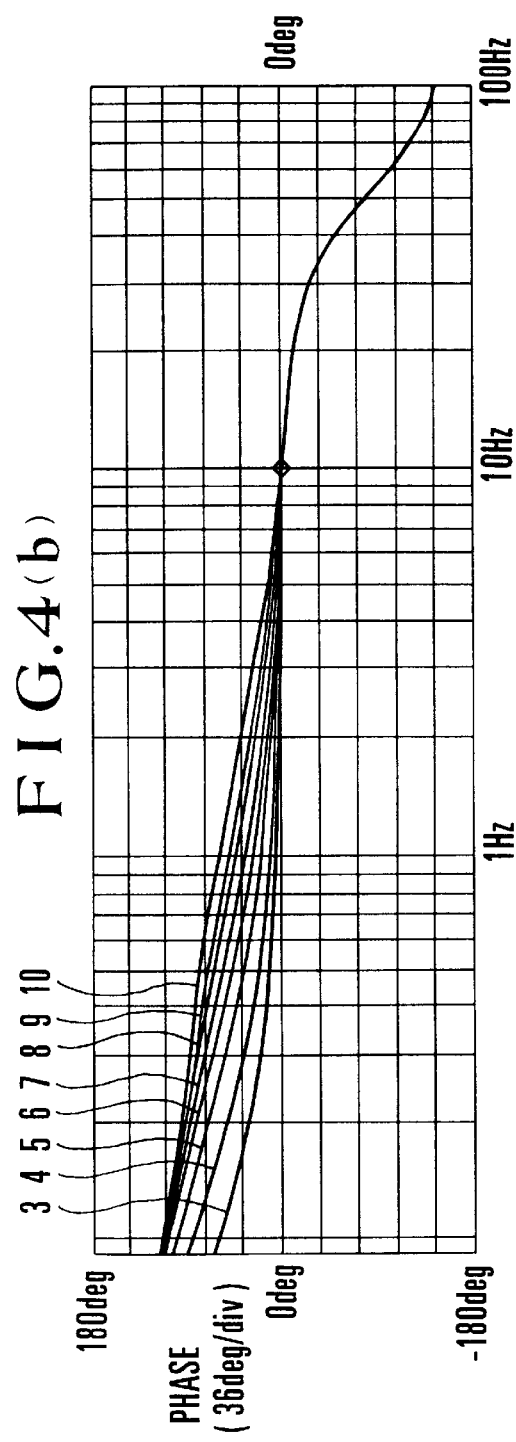

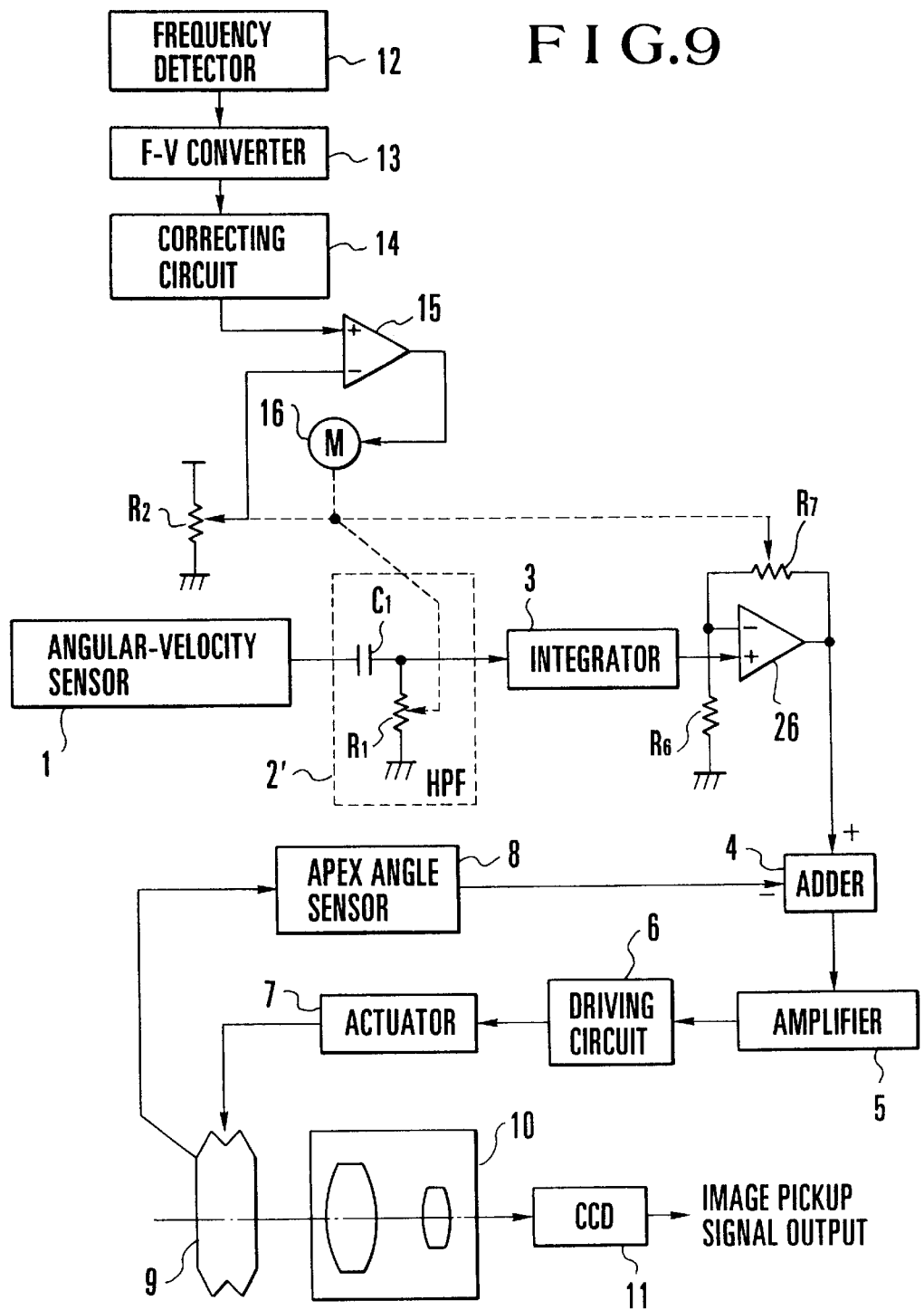

FIG.14

| VIBRATION FREQUENCY f (Hz) | HPF CONTROL DUTY (%) | GAIN CONTROL DUTY (%) |
|---|---|---|
| 1 | 3 | 26% |
| 2 | 3 | 28% |
| 3 | 3 | 30% |
| 4 | 3 | ... |
| 5 | 6 | ... |
| 6 | 9 | ... |
| ... | ... | ... |
| 10 | ... | 50% |
| 11 | ... | 48% |
| ... | ... | ... |
| n | 100 | 26% |

DUTY DATA TABLE

FIG.17

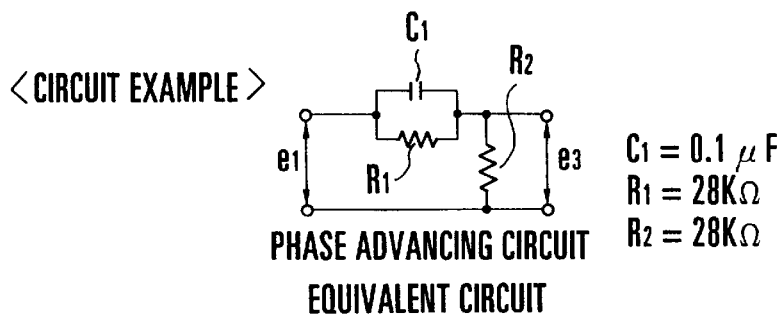

⟨CIRCUIT EXAMPLE⟩

PHASE ADVANCING CIRCUIT EQUIVALENT CIRCUIT $C_1 = 0.1 \mu F$
$R_1 = 28K\Omega$
$R_2 = 28K\Omega$

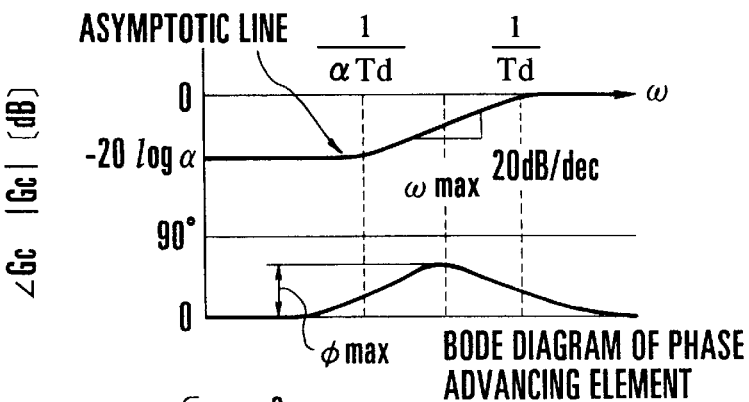

BODE DIAGRAM OF PHASE ADVANCING ELEMENT $\begin{cases} \alpha = 2 \\ T_d = 0.0014 \end{cases}$ GAIN FALL : $-20 \log \alpha = -6$ dB
$\omega_{max} = 503$ (80Hz)
$\phi_{max} = 19.5$ deg

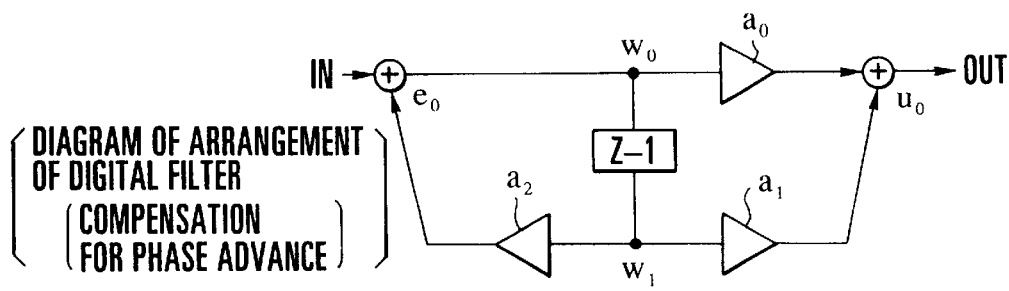

$\begin{cases} \text{DIAGRAM OF ARRANGEMENT} \\ \text{OF DIGITAL FILTER} \\ \begin{pmatrix} \text{COMPENSATION} \\ \text{FOR PHASE ADVANCE} \end{pmatrix} \end{cases}$ $$H_{(z)} = \frac{a_0 + a_1 \cdot Z^{-1}}{1 + a_2 \cdot Z^{-1}}$$

$\begin{cases} w_0 = e_0 + a_2 \cdot w_1 \\ u_0 = a_0 \cdot w_0 + a_1 \cdot w_1 \end{cases}$

DIGITAL FILTER

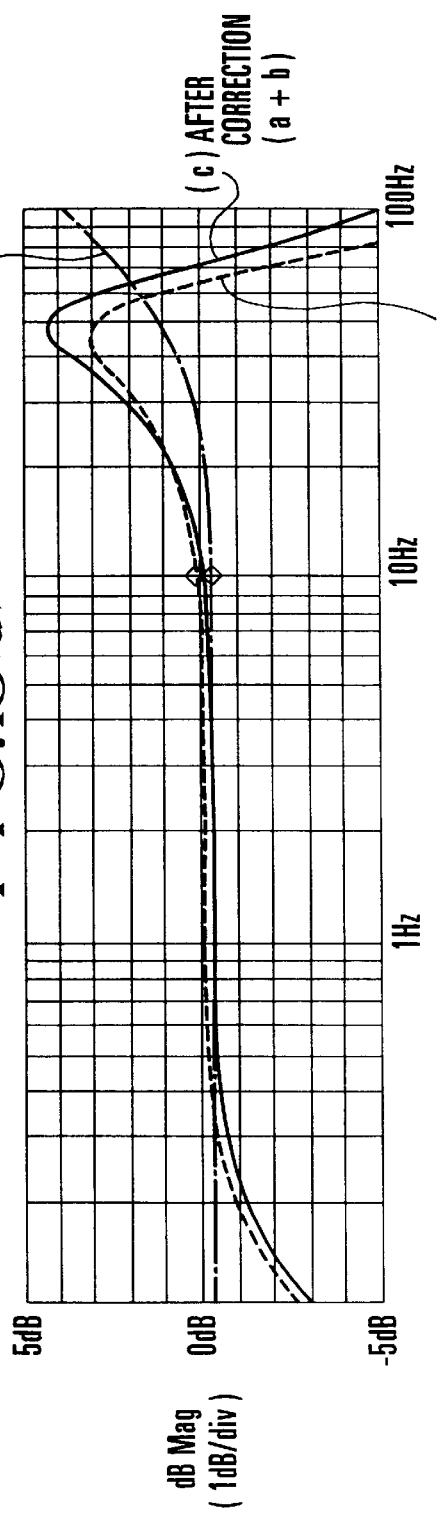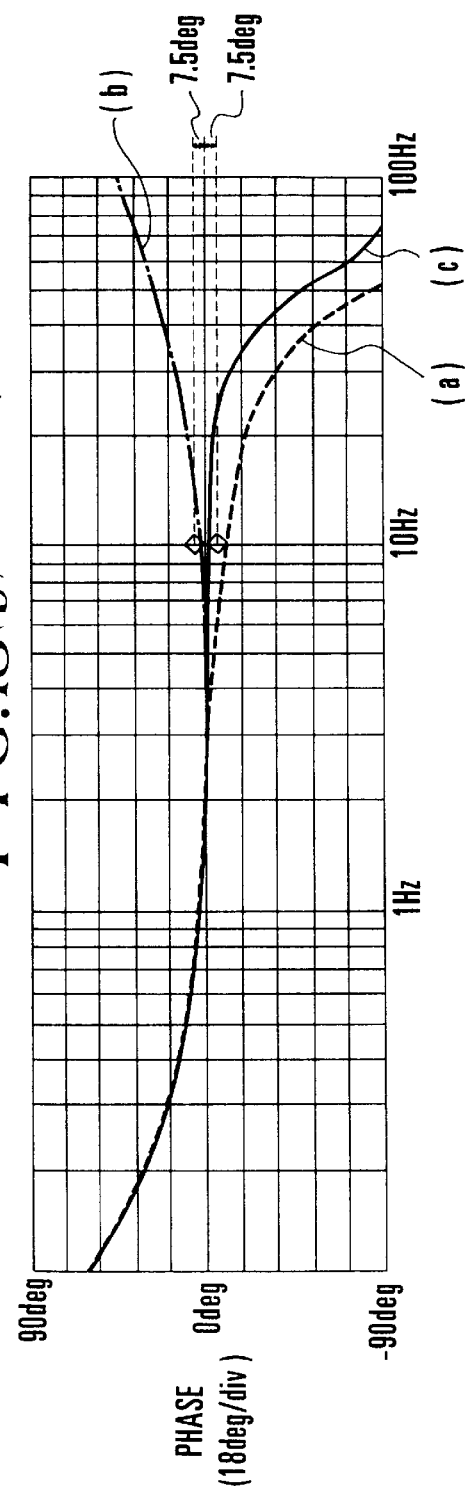
FIG.18(a)
FIG.18(b)

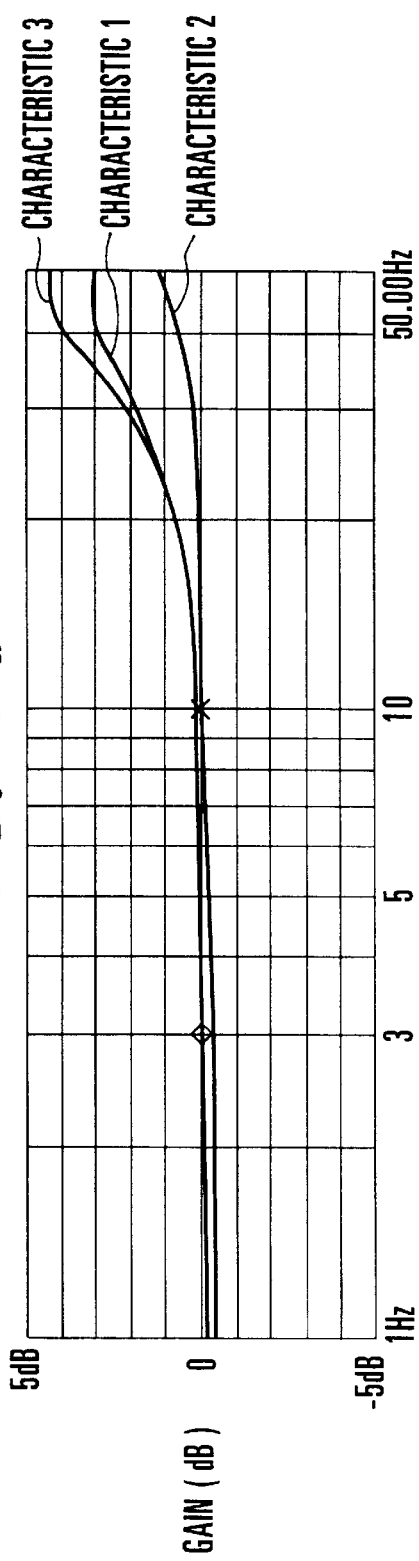
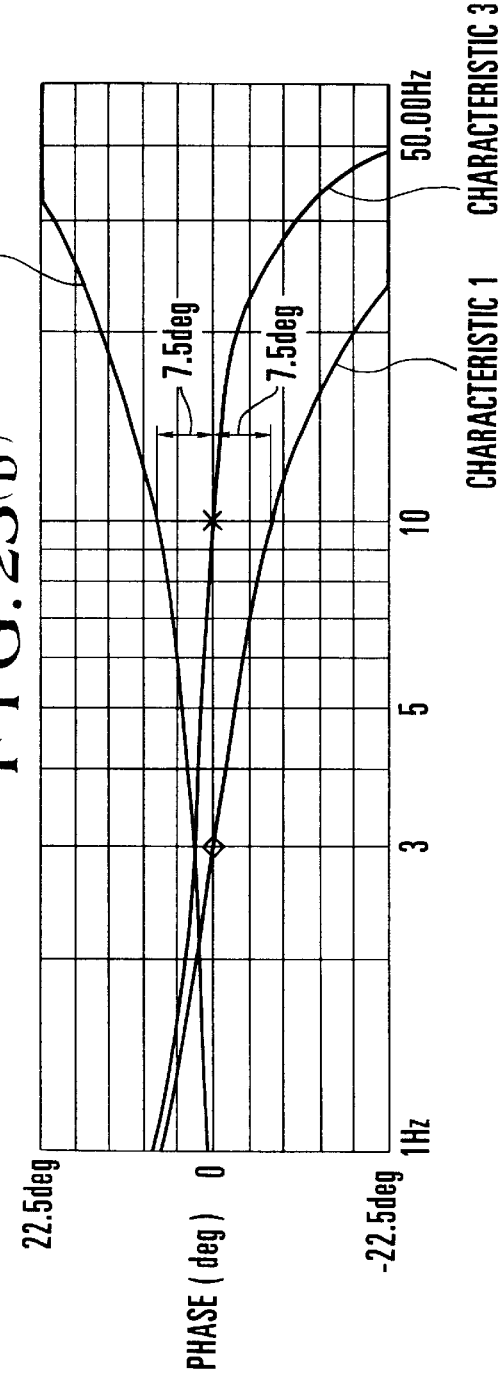
FIG. 25(a)
FIG. 25(b)

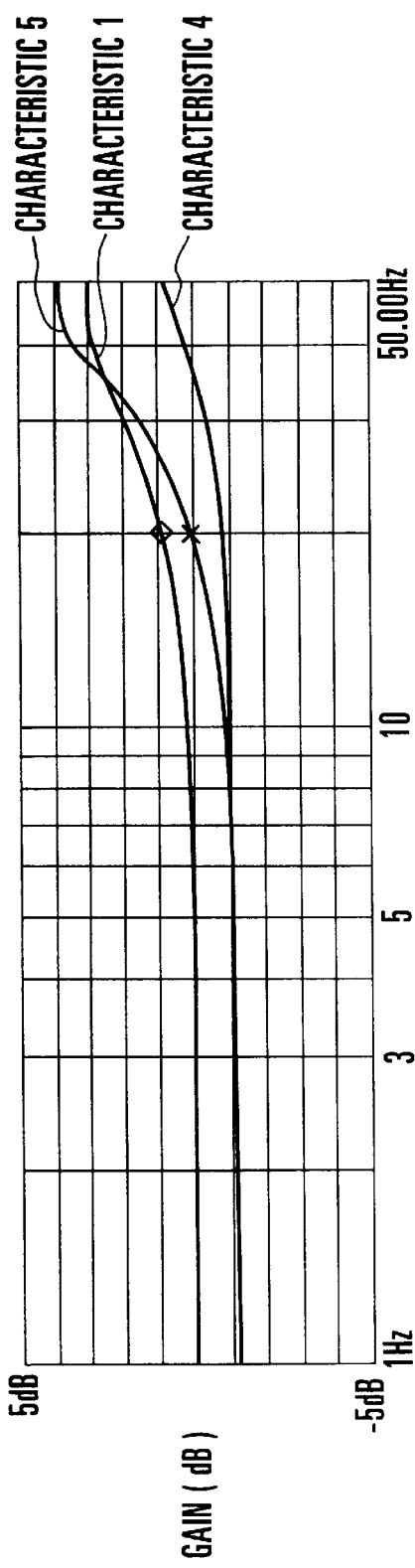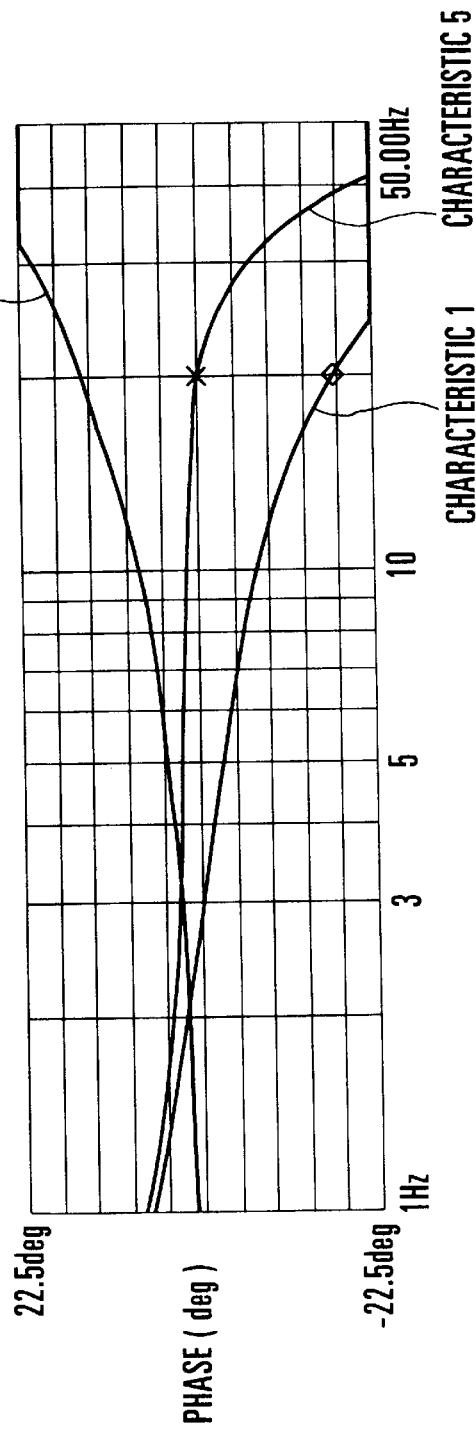

IMAGE-SHAKE CORRECTING DEVICE FOR DETECTING VIBRATION FREQUENCY AND FOR CHANGING VIBRATION CHARACTERISTICS

This application is a continuation, of application Ser. No. 08/638,319, abandoned Apr. 26, 1996, which is a continuation of Ser. No. 08/490,513, filed Jun. 14, 1995, abandoned, which is a continuation of Ser. No. 08/118,803 filed Sep. 8, 1993, abandoned.

BACKGROUND OF THE INVENTION

1. Field of the Invention

The present invention relates to an image-shake correcting device suitable for use in a photographic apparatus such as a camera.

2. Description of the Related Art

In the field of photographic apparatus such as cameras, various photographic functions, such as exposure setting and focus adjustment, have heretofore been automated, and a greater number of functions have been incorporated into a single camera. Accordingly, photographers can enjoy photography at any time irrespective of photographic environments.

In spite of many innovations made in this art, there is the problem that the quality of a photographic image is often remarkably impaired by a camera shake during actual photography. In recent years, various image-shake correcting devices have been proposed and receiving much attention.

Although various forms of image-shake correcting devices are considered, they are generally classified into several types in terms of the kind of correcting system or detecting system used therein. One type of image-shake correcting device uses a correction system for optically correcting an image shake, and another type uses a correction system for electrically correcting an image shake by using image processing. Yet another type uses a detecting system for physically detecting a vibration, while a further type uses a detecting system for detecting a motion vector or the like of an image by image processing.

FIG. 1 is a block diagram showing one example of a proposed image-shake correcting device. Referring to FIG. 1, a gyro (angular-velocity sensor) 1 is mounted in the body of a photographic apparatus such as a camera, and is arranged to physically detect a vibration applied to the photographic apparatus, in the form of an angular velocity and output an angular-velocity signal. A DC-cut high-pass filter 2 (hereinafter referred to the "HPF") is provided for eliminating a direct-current component from the angular-velocity signal outputted from the angular-velocity sensor 1, thereby causing only a vibration component to pass through the HPF 2. An integrator 3 is provided for integrating the vibration component passing through the HPF 2, computing an average value of the vibration component, and outputting an angular-velocity signal. The angular-velocity signal serves as an evaluation value indicative of the vibration of the phothotograhic apparatus.

A variable-angle prism (hereinafter referred to as the "VAP") 9 includes two transparent parallel plates 91 and 92 which are opposed to each other, and an elastic substance or inactive liquid 93 made from a transparent material of high refractive index is hermetically enclosed in the space between the transparent parallel plates 91 and 92. The space between the transparent parallel plates 91 and 92 are elastically sealed around the external circumference thereof by a sealing material 94, such as a resin film, so that the transparent parallel plates 91 and 92 are relatively swingably arranged. By varying the relative angle made by the two transparent parallel plates 91 and 92 by means of a mechanical driving produced by an actuator 7, the apex angle of the VAP 9 is made to vary, thereby varying the angle of incidence of a light flux upon a lens unit 10. The state of driving of the VAP 9, i.e., the apex angle, is detected by an apex angle sensor 8 as a displacement angle relative to the position at which the two transparent parallel plates 91 and 92 are parallel to each other.

The arrangement shown in FIG. 1 also includes an adder 4 for performing an opposite-polarity addition (subtraction) of the output signal of the apex angle sensor 8 to the angular-displacement signal outputted from the integrator 3, an amplifier 5 for amplifying the output signal of the adder 4, and a driving circuit 6 for converting the output signal of the amplifier 5 into a driving signal to be applied to the actuator 7 for driving the VAP 9.

More specifically, in the adder 4, the angular-displacement signal obtained by causing the integrator 3 to average the vibration component detected by the angular-velocity sensor 1 is subtracted from the amount of variation of the apex angle of the VAP 9 which is outputted from the apex angle sensor 8, thus preparing the difference therebetween. The amplifier 5 and the driving circuit 6 control the actuator 7 to drive the VAP 9 in the direction in which the difference is made "0". The resultant displacement of the apex angle of the VAP 9 is detected by the apex angle sensor 8 and supplied to the adder 4.

Accordingly, a closed loop is formed which starts with the adder 4, passes through the amplifier 5, the driving circuit 6, the actuator 7, the VAP 9 and the apex angle sensor 8, and returns to the adder 4. The VAP 9 is controlled so that the output signal of the adder 4 is made "0", i.e., the angular-displacement signal supplied from the integrator 3 and the signal indicative of the apex angle, outputted from the apex angle sensor 8, coincide with each other at all times. Thus, image-shake correction can be effected.

The light flux the angle of incidence of which has been changed by the VAP 9 is focused on the image pickup surface of an image pickup device 11, such as a CCD, by the lens unit 10, and an image pickup signal obtained by photoelectrically converting the incident light flux is outputted from the image pickup device 11.

The aforesaid variable angle prism is arranged to deflect the optical axis by varying its apex angle. Accordingly, the variable angle prism varies the apex angle according to a vibration applied to the photographic apparatus, thereby deflecting the optical axis so that the optical axis is made stable with respect to the image pickup device to effect stabilization of an incident image. Therefore, what is required for the mechanical driving method for varying the apex angle of the VAP is to incline the apex angle so that the optical axis is stably deflected in accordance with a control signal.

However, the above-described image-shake correcting device has a number of problems which will be described below.

FIGS. 2($a$) and 2($b$) show the frequency characteristics of the vibration component outputted from the HPF 2 when a vibration of constant amplitude is applied to a photographic apparatus including the image-shake correcting device of FIG. 1 which uses an existing type of angular-velocity sensor. FIG. 2($a$) shows a gain characteristic, and FIG. 2($b$) shows a phase characteristic.

Referring to the frequency characteristics of the vibration component of a vibration whose frequency is 10 Hz, the gain at 10 Hz is approximately 0 dB and no vibration component is detected, so that it may seem that a sufficient image stabilization effect is attained. However, the corresponding phase shown in FIG. 2(b) exhibits a deviation of approximately 7.5 degrees. Assuming that the frequency characteristics of an image correcting system (the VAP and the like) are ideal (i.e., a gain of 0 dB and no phase deviation over the entire image-shake correction frequency range), if an image stabilization effect, which is influenced by a phase deviation occurring in the vibration detecting system due to the phase deviation of 7.5 degrees, is calculated on the basis of Equation "20 log(OUT/IN)=G (gain)", it is understood that the aforesaid vibration is suppressed to ⅛.

In the above-described case, during normal photography, it is possible to achieve a sufficiently high, image stabilization effect. However, if a vibration of frequency in the neighborhood of 10 Hz is continuously applied to the photographic apparatus for a long time, the vibration may become steady to a visually perceptible extent.

In other words, if the photographic apparatus is exposed to a continuous vibration occurring in the frequency range in which no sufficient, vibration suppression effect can be achieved by the existing angular-velocity sensors, it is impossible to completely correct an image shake if the applied vibration reaches a certain magnitude.

SUMMARY OF THE INVENTION

A first object of the present invention which has been made to solve the above-described problems is to provide an image-shake correcting device capable of realizing sufficient image-shake correction characteristics at all times under any condition.

A second object of the present invention is to provide an image-shake correcting device capable of setting optimum image stabilization characteristics at all times according to the state of a vibration applied to an apparatus.

A third object of the present invention is to provide a stable and highly reliable, image-shake correcting device which produces no image-shake correction error even in the case of correction of a vibration which continues for a long time.

To achieve the above objects, according to one aspect of the present invention, there is provided an imageshake correcting device which includes vibration detecting means for detecting a vibration of an apparatus, correcting means for correcting an image shake due to the vibration, according to an output of the vibration detecting means, frequency detecting means for detecting a frequency of the vibration, and controlling means for changing frequency characteristics of the correcting means on the basis of an output of the frequency detecting means.

According to the above-described image-shake correcting device, the center frequency of the vibration applied to a photographic apparatus including the image-shake correcting device is detected, and a phase deviation is corrected by varying a phase characteristic according to the detected center frequency. Therefore, it is possible to effect sufficient image-shake correction according to the frequency of the vibration without involving a phase deviation in the primary frequency range of the vibration.

By correcting a gain characteristic as well as the phase characteristic, it is possible to achieve a further improvement. In this case, it is possible to eliminate both a phase deviation and a gain deviation in the primary frequency range of a vibration, whereby it is possible to effect sufficient image-shake correction according to the frequency of the vibration.

A fourth object of the present invention is to improve the detection accuracy of a vibration detecting device and to simplify the arrangement thereof.

A fifth object of the present invention is to makes it possible to optimumly set the control characteristics of a vibration detecting system and an image-shake correcting system during panning or tilting.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIG. 3 is a block diagram showing a first embodiment of an image-shake correcting device according to the present invention;

FIGS. 4(a) and 4(b) are views showing frequency characteristics obtained by correcting the characteristics of an angular-velocity sensor used in the first embodiment;

FIG. 9 is a block diagram showing a fourth embodiment of the image-shake correcting device according to the present invention;

FIG. 14 is a view showing a data table used in the fifth embodiment of the image-shake correcting device according to the present invention;

FIG. 17 is a view showing an arrangement example of a digital filter used in the sixth embodiment of the image-shake correcting device according to the present invention;

FIGS. 18(a) and 18(b) are views showing frequency characteristics obtained by correcting the detection characteristics of an angular-velocity sensor used in the sixth embodiment;

FIGS. 25(a) and 25(b) are respectively gain and phase characteristic charts which serve to explain the operation of the image-shake correcting device according to the present invention;

FIGS. 26(a) and 26(b) are respectively gain and phase characteristic charts which serve to explain the operation of the image-shake correcting device according to the present invention;

DETAILED DESCRIPTION OF THE PREFERRED EMBODIMENTS

Figure 1:
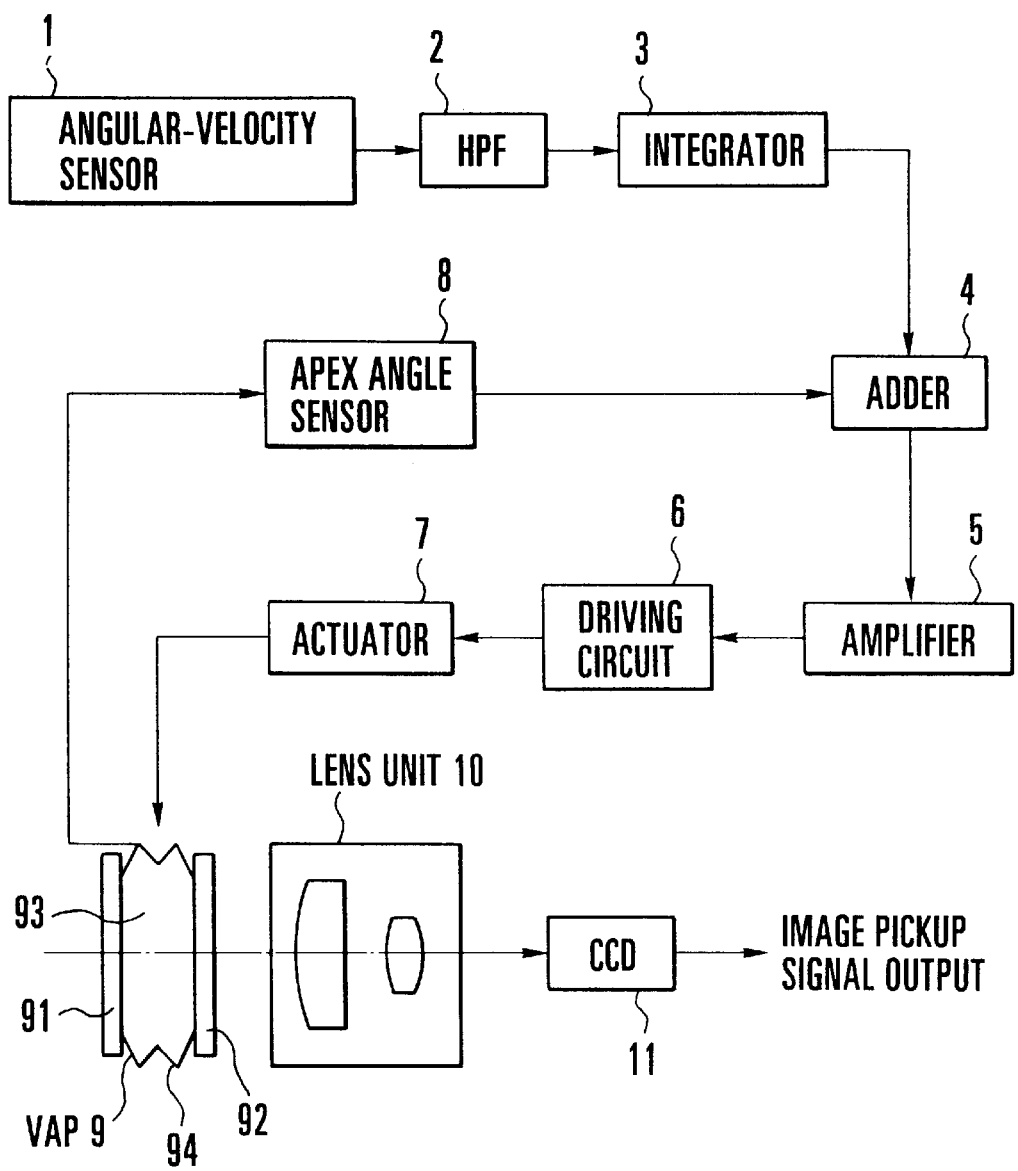
FIG. 1 is a block diagram showing the arrangement of a related-art image-shake correcting device.

Embodiments of an image-shake correcting device according to the present invention will be described below with reference to the accompanying drawings.

(First Embodiment)

FIG. 3 is a block diagram schematically showing a first embodiment of the image-shake correcting device according to the present invention. In FIG. 3, identical reference numerals are used to denote constituent parts which are substantially identical to those of the related-art example shown in FIG. 1, and description thereof is omitted.

Similarly to the image-shake correcting device shown in FIG. 1, the image-shake correcting device shown in FIG. 3 uses a VAP 9 as image-shake correcting means. In the shown closed-loop control system, an output from an angular-velocity sensor 1 is supplied to an HPF 2', and the HPF 2' cuts a direct-current component from the output to provide a vibration component. An integrator 3 averages the vibration component to provide an angular-displacement signal, and an adder 4 outputs a difference by subtracting the angular-displacement signal from the output of an apex angle sensor 8. An actuator 7 is driven to control the VAP 9 so that the difference outputted from the adder 4 is made "0".

The respective arrangements of the actuator 7 for driving the VAP 9 and the apex angle sensor 8 will be described later in detail. The VAP 9 includes two transparent parallel plates 91 and 92, and the transparent plate 91 is turnably supported by a supporting frame 9a which is arranged to turn about an axis 9b, so that the apex angle of the VAP 9 can be varied.

It is to be noted that the supporting frame 9a is supported turnably about an axis perpendicular to the axis 9b by a supporting mechanism (not shown) so that a camera shake occurring in either of X and Y directions can be corrected. Similarly to the actuator 7 and the apex angle sensor 8, an actuator and an apex angle sensor, neither of which is shown, are provided for coping with the turning motion of the supporting frame 9a about the axis perpendicular to the axis 9b. However, for the sake of convenience of explanation, the following description will refer to only the actuator 7 and the apex angle sensor 8 which are provided for coping with the turning motion of the supporting frame 9a about the axis 9b.

The actuator 7 includes a coil 7a and a magnet 7b which is mounted on a projection formed integrally with the supporting frame 9a. When an electric current is made to flow in the coil 7a, an electromagnetic force is generated between the coil 7a and the magnet 7b, thereby turning the supporting frame 9a about the axis 9b so that the apex angle of the VAP 9 is varied. Accordingly, it is possible to control the amount and direction of driving of the VAP 9 by varying the amount of electric current to be supplied to the coil 7a.

The apex angle sensor 8 for detecting the apex angle of the VAP 9 includes a light emitting element 8a, such as an LED, and a light receiving element 8b, such as a PSD, and the light emitting element 8a and the light receiving element 8b are respectively disposed above and below a slit plate 9c formed integrally with the supporting frame 9a. According to a displacement of the apex angle of the VAP 9, the slit plate 9c moves while moving a slit image on the light receiving element 8b, so that the apex angle of the VAP 9 can be detected.

One feature of the first embodiment, i.e., an arrangement for detecting the center frequency of a vibration and varying the driving controlling frequency characteristics of the VAP 9, will be described below.

The HPF 2' includes a capacitor $C_1$ and a variable resistor $R_1$ and has the high-pass filter function of eliminating a direct-current component from the output signal of the angular-velocity sensor 1 and passing only the vibration component of the signal. The cut-off frequency, i.e., the frequency characteristics, of the HPF 2' can be varied by controlling the variable resistor $R_1$. The variable resistor $R_1$ is controlled by a motor which will be described later.

The image-shake correcting device shown in FIG. 3 also includes a frequency detector 12 for detecting the frequency of a vibration applied to a photographic apparatus which includes the image-shake correcting device according to the present invention as a built-in device. The frequency detector 12 may be made up of, for example, vibration detecting means for detecting a vibration, such as the angular-velocity sensor 1 shown in FIG. 3 or an acceleration sensor, and a frequency counter for counting the frequency of a vibration component detected by the vibration detecting means. The frequency counter serves to extract the vibration component from an output from the acceleration sensor and count the number of vibrations occurring within a predetermined time, so that the frequency of the vibration can be detected.

The image-shake correcting device shown in FIG. 3 also includes an F-V converter 13 for performing F-V conversion (frequency-voltage conversion) of a vibration frequency signal indicative of a vibration frequency detected by the frequency detector 12, and a correcting circuit 14 for correcting the correlation between the output of the F-V converter 13 and the resistance value of a resistor $R_2$, i.e., the correlation between the vibration frequency and the amount of correction. The correcting circuit 14 converts a signal corresponding to the vibration frequency, which has been converted into a voltage value by the F-V converter 13, into a signal of voltage level accommodated in the range of voltage levels for controlling the driving of a variable-resistor controlling motor 16 which will be described later. A motor driving circuit 15 compares the voltage level corresponding to the vibration frequency, which has been supplied from the correcting circuit 14, with a voltage level obtained by dividing a source voltage (not shown) by the variable resistor $R_2$ interlocked with the variable resistor $R_1$, and drives the variable-resistor controlling motor 16 according to the obtained difference between the voltage levels. The variable-resistor controlling motor 16 has a rotating shaft connected to the rotor of each of the two variable resistors $R_1$ and $R_2$, and is arranged to vary the resistance values of the respective variable resistors $R_1$ and $R_2$ by the rotation of the rotating shaft.

The resistance value of the variable resistor $R_1$ of the HPF 2' is reflected on the variable resistor $R_2$, and the motor driving circuit 15 drives the variable-resistor controlling motor 16 so that the output of the correcting circuit 14 and the voltage across the variable resistor $R_2$ are made equal. In this manner, the resistance value of the variable resistor $R_1$ in the HPF 2', i.e., the time constant of the HPF 2', can be varied according to the vibration frequency.

Figure 2A:
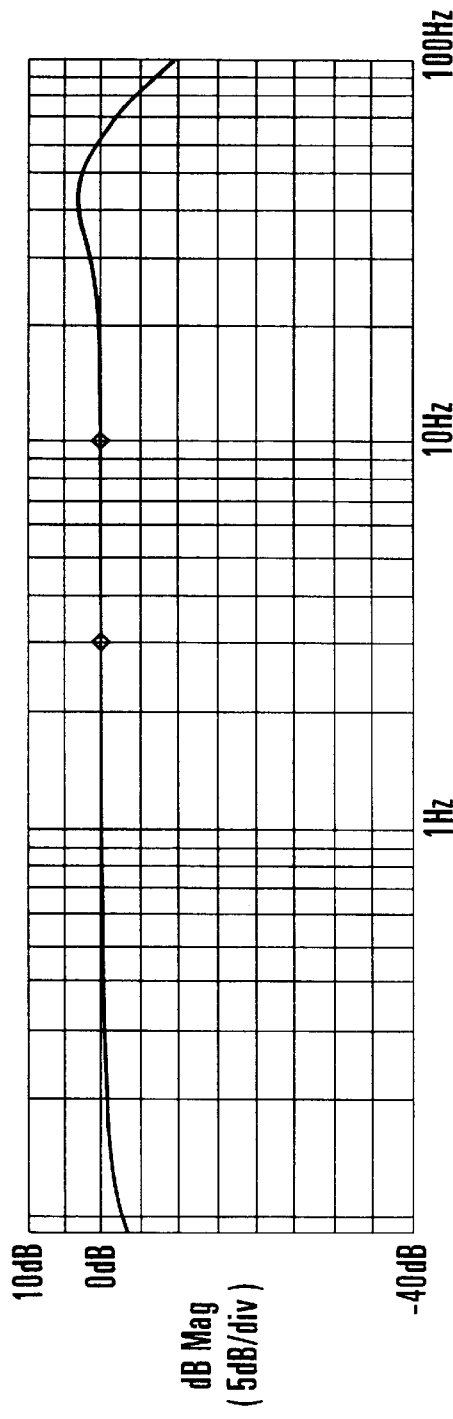
FIGS. 2(a) and 2(b) are views showing the frequency characteristics of an angular-velocity sensor used in the related-art image-shake correcting device.
Figure 2B:
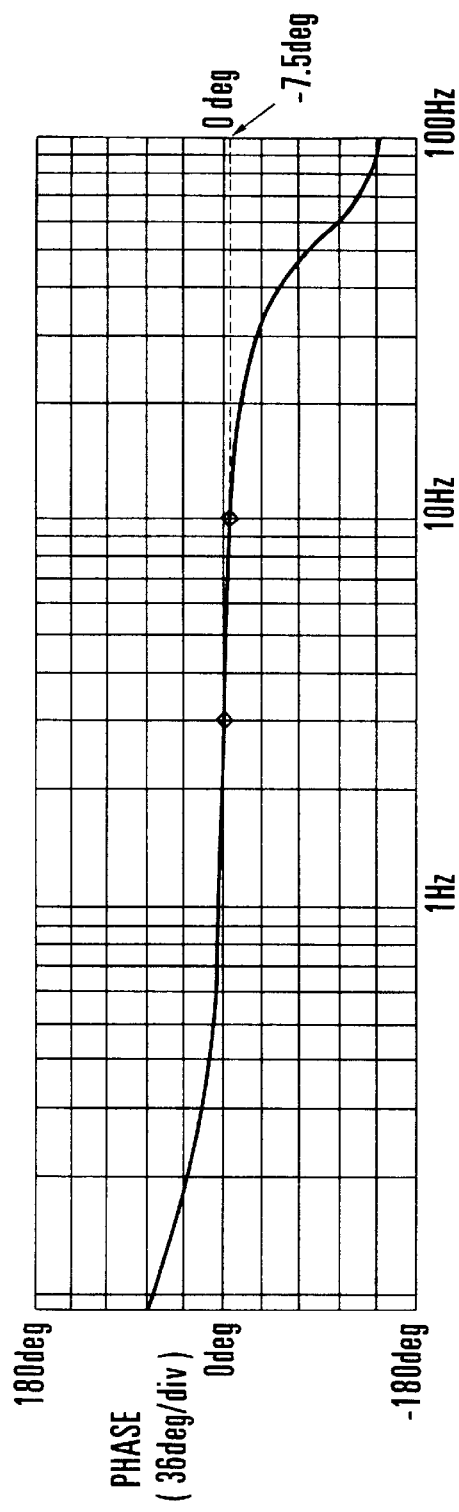

In the first embodiment, the amounts of phase deviations which occur at individual vibration frequencies are obtained on the basis of the frequency characteristics of the angular-velocity sensor 1 which are shown in FIGS. 2(a) and 2(b), and the correction value of the frequency characteristics required to correct a phase deviation occurring at each of the vibration frequencies, more specifically, the resistance value of the variable resistor $R_1$, can be obtained by a computation. Accordingly, a correspondence relationship between the resistance value of the variable resistor $R_2$ and the F-V converter 13 is set by the correcting circuit 14 so that the rotation of the variable-resistor controlling motor 16 can be controlled according to the frequency detected by the frequency detector 12 and a resistance value which serves to correct a phase deviation occurring at the frequency of interest is automatically set in the variable resistor $R_1$. Accordingly, a frequency characteristic is set in the HPF 2' which is capable of at any time preventing a phase deviation from occurring if a variation occurs in the vibration frequency, so that it is possible to achieve a remarkable, image stabilization effect irrespective of the vibration frequency.

Figure 5:
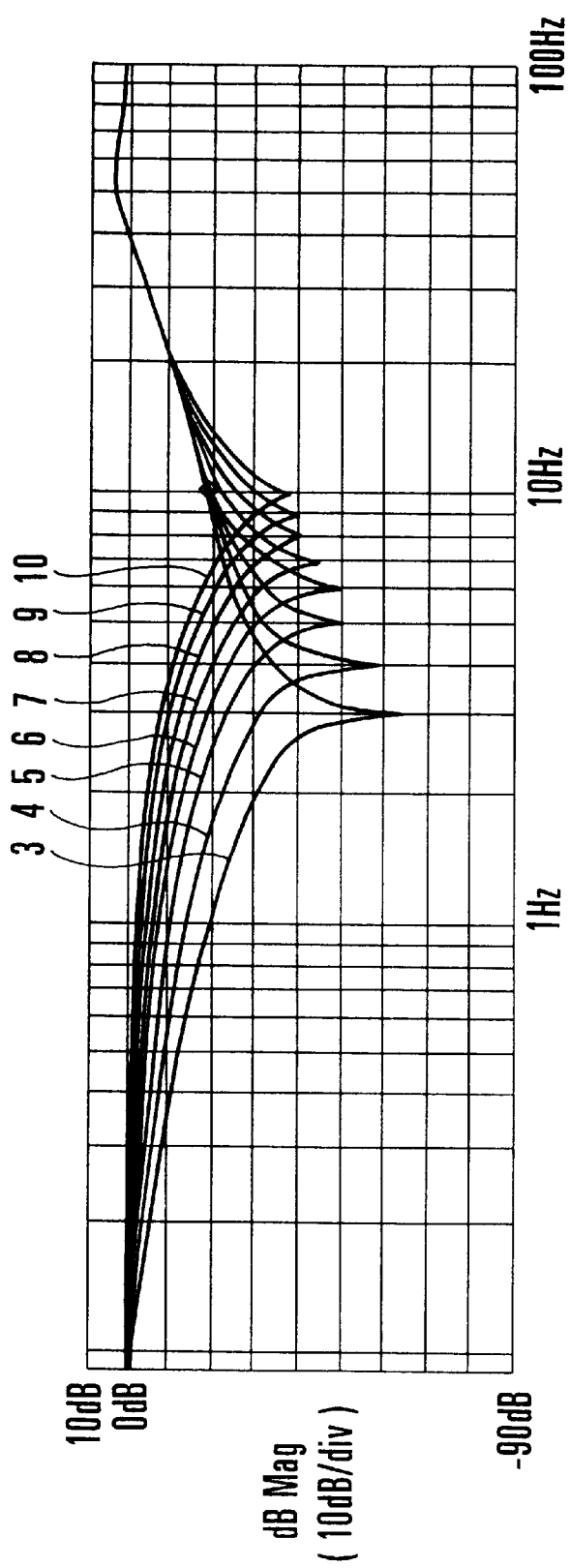
FIG. 5 is a frequency characteristic chart showing the vibration suppression effect obtained in the first embodiment.

FIGS. 4(a) and 4(b) show characteristic data about image stabilization realized by the first embodiment of the image-shake correcting device according to the present invention. FIG. 4(a) shows a gain characteristic and FIG. 4(b) shows a phase characteristic. FIG. 5 is a characteristic diagram showing a vibration suppression effect obtained on the basis of the gain and phase characteristics shown in FIGS. 4(a) and 4(b) (where it is assumed that an image correcting system is an ideal system, as described previously).

The characteristic of each of FIGS. 2(a) and 2(b) is selected so that the gain at each frequency which crosses a phase angle of 0 degrees is set to 0 dB, where the integrator 3 has a cut-off frequency of 0.07 Hz and the HPF 2' has a cut-off frequency of 0.06 Hz. In contrast, FIGS. 4(a) and 4(b) show the characteristic charts obtained by correcting phase deviations occurring at individual vibration frequencies (selected at intervals of 1 Hz).

In FIGS. 4(a) and 4(b), characteristic curves indicated by reference numerals 3 to 10 represent the frequency characteristics obtained by correcting phase deviations occurring at vibration frequencies of 3 Hz, 4 Hz, 5 Hz, 6 Hz, 7 Hz, 8 Hz, 9 Hz and 10 Hz, respectively. More specifically, the curves 3 to 10 represent the characteristic curves obtained by correcting the respective phase deviations by altering the value of the variable resistor $R_1$ so that the maximum vibration suppression effect can be achieved at each of the vibration frequencies of 3 Hz to 10 Hz by making the respective phase angle 0 degrees. The frequency range of 3 Hz to 10 Hz is selected to cope with the range of frequencies of vibrations occurring when photography is performed on a vehicle such as an automobile or a train.

As can be seen from FIGS. 2(a) and 2(b), the phase characteristic curve shown in FIG. 2(b) crosses a 0-deg line corresponding to a phase deviation of "0", but if a phase delay occurs, even if the gain at the frequency of interest is 0 dB, no sufficient image stabilization effect can be achieved as described previously. To cope with this problem, it is preferable to apply correction for making the phase deviation 0 degrees at each of the vibration frequencies. The curves 3 to 10 of FIGS. 4(a) and 4(b) are the characteristic curves obtained by applying such correction.

To realize means for selecting a desired characteristic curve from among the characteristic curves, the characteristic curves shown in FIGS. 4(a) and 4(b) are prepared in the HPF 2' so that a phase advancing correction for compensating for a phase delay is applied to a correcting system in correcting a phase deviation. More specifically, the time constant of the HPF 2' is varied by varying the resistance value of the variable resistor $R_1$, whereby as the vibration frequency becomes lower, the cut-off frequency of the HPF 2' is shifted to a lower frequency for the purpose of phase compensation.

FIG. 5 shows the vibrations suppressed by executing the above-described correction of the phase deviations. The vibration suppression effect shown in FIG. 5 is realized by selecting desired frequency characteristics from among the frequency characteristics shown in FIGS. 4(*a*) and 4(*b*) in accordance with each of the vibration frequencies and executing correction corresponding to each of the vibration frequencies. (In this case, it is assumed that the image correcting system is an ideal system as described previously.)

Referring to the respective correction effects achieved by correcting the phase deviations occurring at the individual vibration frequencies, it can be understood that the best result is achieved at each of the vibration frequencies.

As described above, in the case of a continuous vibration, even a vibration in the neighborhood of 10 Hz, at which the vibration suppression effect achieved by the first embodiment is the smallest, can be suppressed to $\frac{1}{40}$ or below owing to the vibration suppression effect improved by the first embodiment, compared to the vibration suppression effect of the related art to suppress such vibration to approximately $\frac{1}{8}$.

In the characteristic diagram of FIG. 5, the maximum vibration suppression effect (60 dB or more) appears at 3 Hz. This is because, in a simulation, experiments have been conducted with a system which exhibits a gain of 0 dB at 3 Hz. The variations of the vibration suppression effect caused by the variations of the gain characteristic can be solved by another embodiment of the present invention which will be described later.

The first embodiment has been described on the assumption that the constituent elements other than the angular-velocity sensor are ideal elements. However, if the characteristic factors of the entire system, such as the response delay of the VAP 9, are taken into account, it is preferable to adaptively vary the value of the voltage applied to the variable resistor $R_2$ or to adaptively alter the setting of the correcting circuit 14, so as to shift the setting of the motor driving circuit 15 on the basis of an actual measurement.

(Second Embodiment)

Figure 6:
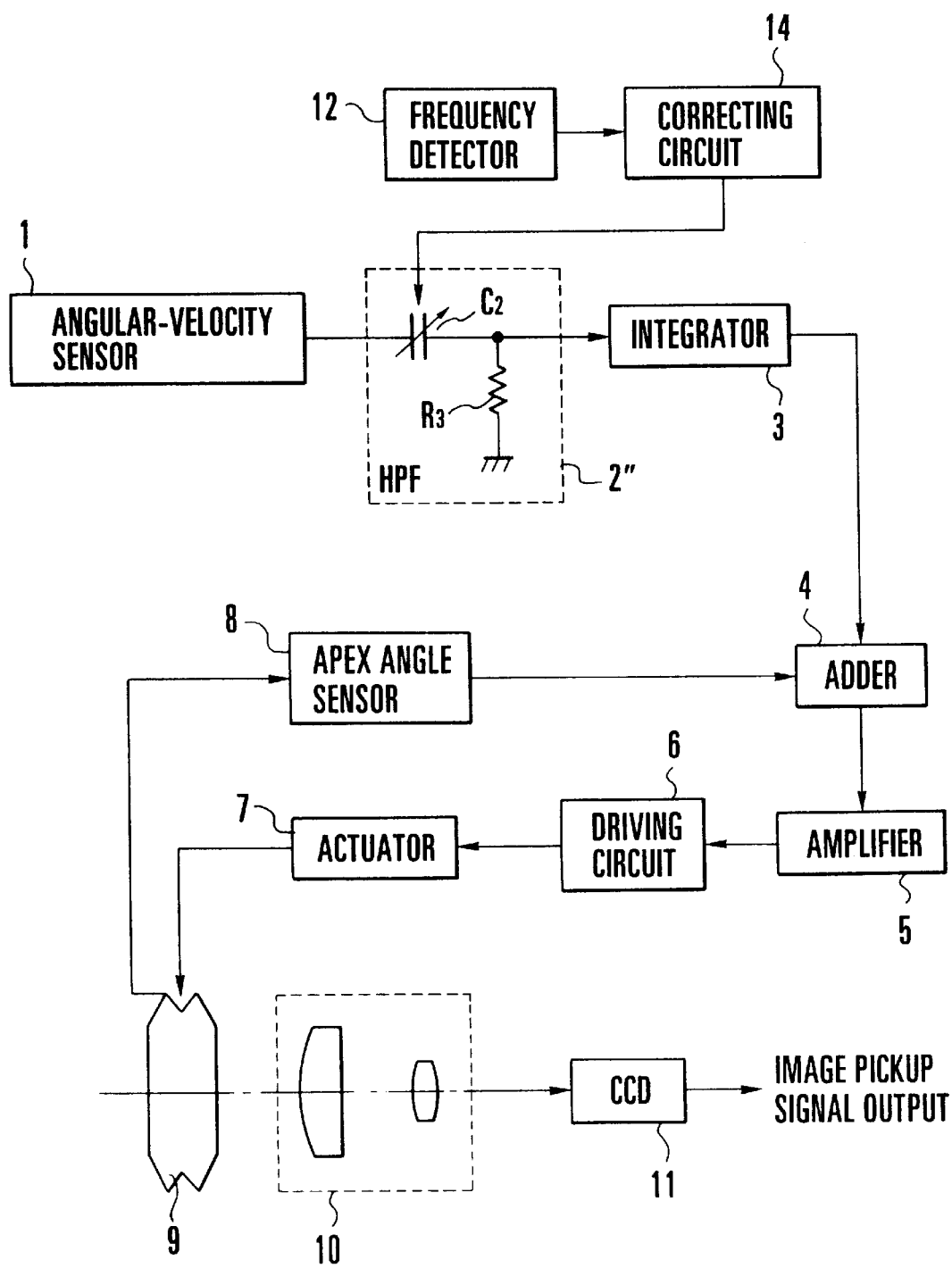
FIG. 6 is a block diagram showing a second embodiment of the image-shake correcting device according to the present invention.

FIG. 6 shows a second embodiment of the present invention. The first embodiment shown in FIG. 3 employs means for varying, according to a vibration frequency of interest, the resistance value of the variable resistor $R_1$ which constitutes part of the HPF 2' for cutting a direct-current component, thereby setting the image stabilization characteristic so that the maximum vibration suppression effect can be achieved at the vibration frequency of interest. However, an effect similar that of the first embodiment can be achieved by using the circuit arrangement shown in FIG. 6.

The second embodiment differs from the first embodiment of FIG. 1 in the following respect. A capacitor and a resistor which constitute an HPF 2" are formed as a variable capacitor $C_2$ and a fixed resistor $R_3$. The capacity of the capacitor $C_2$ is varied according to a vibration frequency of interest so that the frequency characteristics of the VAP 9 can be controlled to be frequency characteristics corresponding to a phase deviation which is to be corrected in the output.

More specifically, the set value of the variable capacitor $C_2$ for correcting a phase deviation occurring at each vibration frequency is beforehand obtained on the basis of the frequency characteristics of the angular-velocity sensor 1. By varying the capacity of the variable capacitor $C_2$ to a suitable set value on the basis of the output of the frequency detector 12, any phase deviation in the primary frequency range of an applied vibration can be made "0", whereby it is possible to effect a satisfactory image-shake correction corresponding to the frequency of each vibration.

In the above-described arrangement, although the variable capacitor $C_2$ may be controlled by a motor, it may also be electrically controlled by using a variable diode. In this case, it is preferable that the correcting circuit 14 have a correction characteristic suitable not for the characteristic of the variable resistor $R_1$ of FIG. 3 but for the characteristic of the variable capacitor $C_2$.

The arrangement of the other constituent elements is similar to the arrangement shown in FIG. 3, and further description thereof is omitted.

(Third Embodiment)

Figure 7:
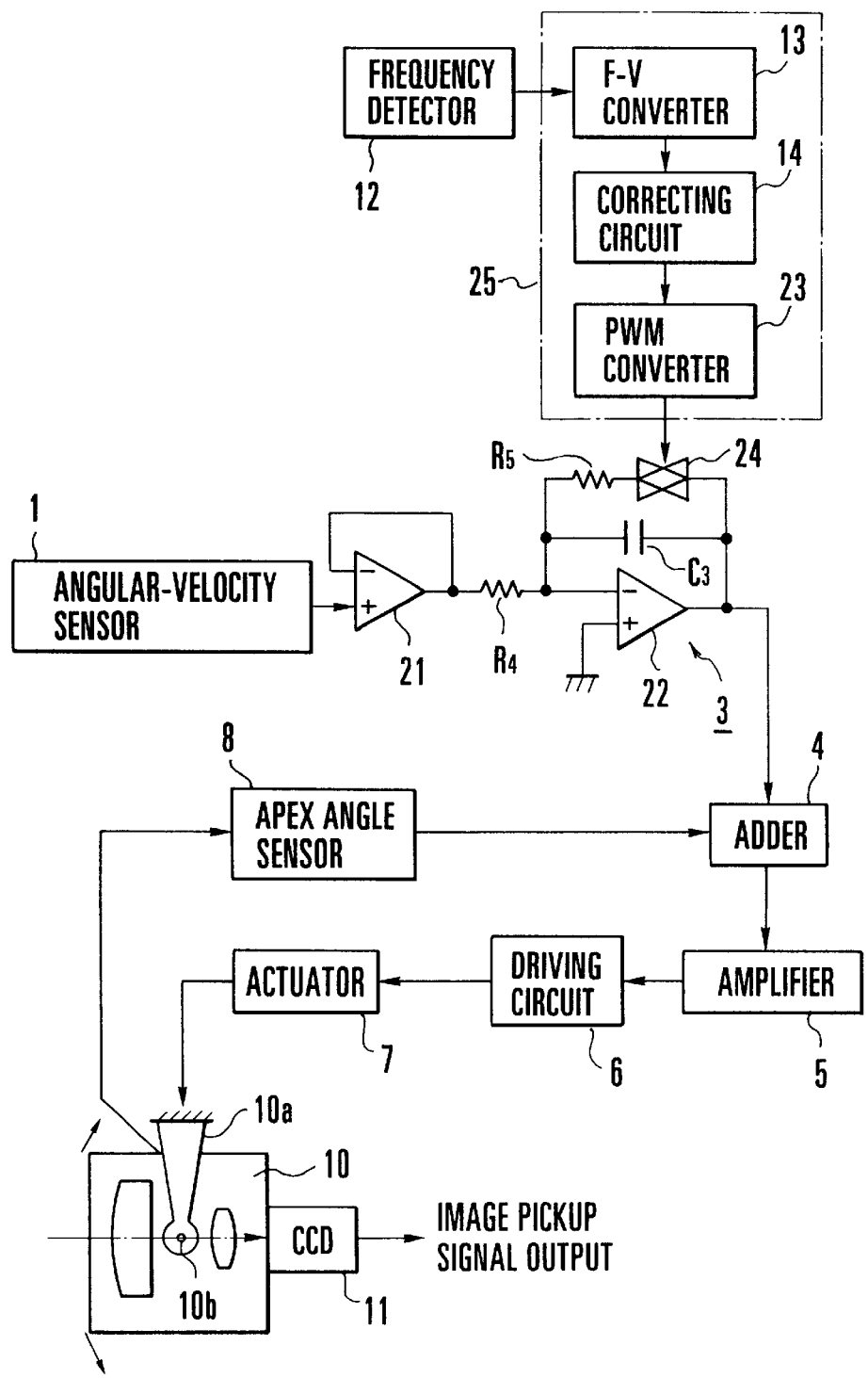
FIG. 7 is a block diagram showing a third embodiment of the image-shake correcting device according to the present invention.

FIG. 7 shows a third embodiment of the present invention.

In each of the first and second embodiments, the phase deviation corresponding to each of the vibration frequencies is corrected by varying the frequency characteristics by means of the HPF (2' or 2") for cutting a direct-current component. In this arrangement, the signal of each of the HPFs 2' and 2" of FIGS. 3 and 6 can be directly used as an angular-velocity signal whose phase deviation is corrected.

However, in the case of an angular-velocity sensor having a characteristic such that only a vibration component can be obtained and there is no need to cut a direct-current component, it is possible to achieve an advantage and an effect similar to those of each of the first and second embodiments by giving the integrator 3 the function of varying the frequency characteristics, as shown in FIG. 7.

More specifically, if it is assumed that the output of the angular-velocity sensor contains no direct-current component, the output is provided as a signal indicative of a differentiation of the amount of displacement. Logarithmically, the output of the angular-velocity sensor exhibits a differential characteristic curve having a uniform inclination with respect to the displacement of the frequency.

The integrator 3 has the inverse characteristic of that of the differential signal. Accordingly, by combining both characteristics and varying the cut-off frequency of the integrator 3, it is possible to vary the frequency characteristics of the entire system.

The third embodiment may not use a VAP as image-shake correcting means. As shown in FIG. 7 by way of example, an assembly of a lens unit 10 and an image pickup device 11 may be supported turnably about an axis 10*b* by a supporting member 10*a*, and the actuator 7 may be made to drive the supporting member 10*a* to vary the apex angle of the assembly, thereby effecting image-shake correction. Although not shown for the sake of convenience of explanation, it is a matter of course that a supporting member for supporting the supporting member 1a and for supporting the entire assembly turnably about an axis perpendicular to the axis 10*b* is disposed so that image-shake correction in each of the X and Y directions can be effected.

Referring to FIG. 7, a buffer amplifier 21 is provided for amplifying the vibration component outputted from the angular-velocity sensor 1 up to a predetermined level and for providing a matching, and an operational amplifier 22 is provided. The integrator 3 the frequency characteristics of which can be altered is formed by a resistor $R_4$ on the input side of the integrator 3 as well as a capacitor $C_3$, a resistor $R_5$ and an analog switch 24 which are provided in a feedback loop.

Means for altering the frequency characteristics of the integrator 3 is achieved by varying an apparent resistance value across the resistor $R_5$ and the analog switch 24 by controlling the on and off times of the analog switch 24 connected in series with the resistor $R_5$ inserted in the feedback loop of the operational amplifier 22, that is, by performing duty control of the analog switch 24 by using a PWM signal outputted from the PWM converter 23.

More specifically, when the analog switch 24 is on, the resistor $R_5$ is inserted in parallel with the capacitor $C_3$ to form a time constant circuit. When the analog switch 24 is off, the analog switch 24 is merely open to shut off an electric current. Accordingly, if on/off control of the analog switch 24 is executed at a predetermined frequency, according to the resultant duty, an electric current is allowed to flow in accordance with the time constant when the analog switch 24 is on, while when the analog switch 24 is off, the electric current is shut off. Accordingly, the amount of electric current for a certain period of time can be varied by varying the duty ratio, and this indicates that the resistance value can be substantially varied.

In the case of the above-described system, a ripple component of frequency corresponding to the on-off operations of the analog switch 24 penetrates into a vibration frequency signal. However, since the frequencies of general vibrations are in an extremely low frequency range between a frequency of 1 Hz or below and a frequency of less than 100 Hz, if on/off control of the analog switch 24 is executed at a frequency much higher than such a frequency range, the switching frequency of the analog switch 24 is absorbed by a filter itself which is provided by the time constant of the integrator 3. Accordingly, the switching frequency does not adversely affect the output of the integrator 3, and only the amount of electric current is controlled by the duty control and this indicates that the resistance value is substantially varied. With the above-described system, it is not necessary to employ a part which needs mechanical contact, such as a variable resistor, or means for driving such a part, so that control using a microcomputer can be easily achieved.

A vibration frequency signal outputted from the frequency detector 12 is subjected to F-V conversion by the F-V converter 13, and the output of the F-V converter 13 is supplied to the PWM converter 23 through the correcting circuit 14. The PWM converter 23 outputs a pulse signal for turning on and off the analog switch 24 and controls the duty of the analog switch 24. The correcting circuit 14 performs processing for converting the detected vibration frequency into a duty ratio for use in on/off control of the analog switch 24 is performed. Accordingly, the output of the integrator 3 is an angular-displacement signal having a frequency characteristic corresponding to a phase deviation to be corrected.

Although the above embodiment has been described in connection with each constituent element, the F-V converter 13, the correcting circuit 14 and the PWM converter 23 may be formed by a microcomputer 25. In an arrangement using the microcomputer 25, the correction values of the frequency characteristics of the integrator 3 for correcting phase deviations corresponding to the respective vibration frequencies, specifically, duty ratios for use in turning on and off the analog switch 24, are obtained on the basis of the frequency characteristic of the angular-velocity sensor 1, and the obtained duty ratios are stored in a ROM in the microcomputer 25 in table form. A duty ratio corresponding to a vibration frequency detected by the frequency detector 12 is read from the ROM and supplied to the PWM converter 23 for the purpose of controlling the duty of the analog switch 24.

Figures 8A, 8B:
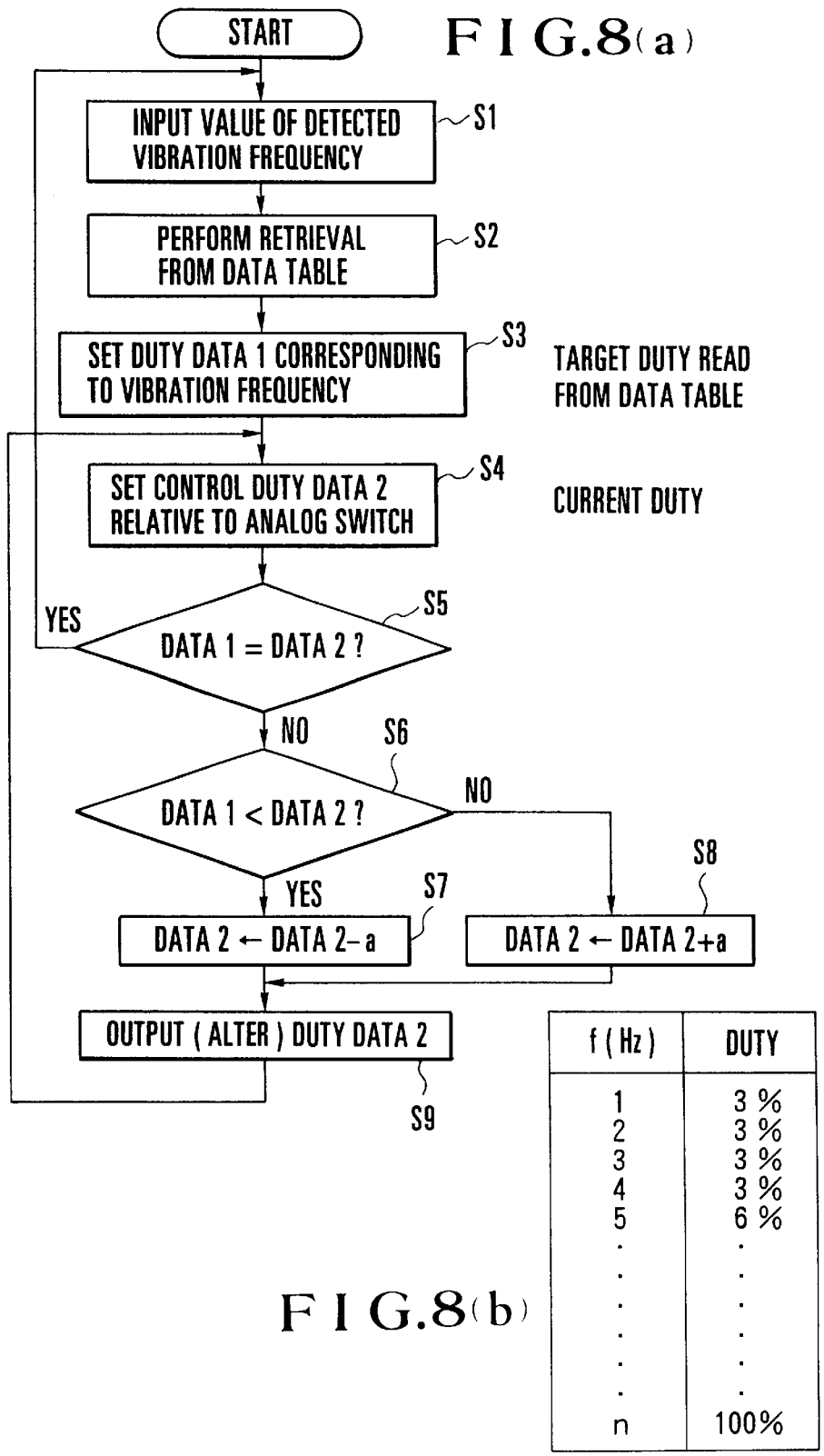
FIGS. 8(a) and 8(b) show a flowchart and a data table which serve to explain the third embodiment of the image-shake correcting device according to the present invention.

FIG. 8(a) is a flowchart showing the processing of setting the duty ratio of an on/off control signal to be applied to the analog switch 24 in accordance with a vibration frequency. FIG. 8(b) shows a data table on which are stored the values of vibration frequencies and duty ratios for use as the correction values of the respective vibration frequencies, the data table being stored in the ROM in the microcomputer 25.

Referring to FIG. 8(a), when the process is started, vibration frequency data supplied from the frequency detector 12 is inputted into the microcomputer 25 in Step S1. In Step S2, a duty ratio (the on time of the analog switch 24) corresponding to the vibration frequency is retrieved and read from the data table shown in FIG. 8(b).

In Step S3, the duty ratio corresponding to the vibration frequency, which has been read from the data table, is set as variable duty data 1 (a target value of the duty). In Step S4, a duty ratio which is used for the current on/off control of the analog switch 24 is set as variable duty data 2.

In Step S5, the duty data 1 and the duty data 2 are compared with each other, and if both are equivalent, it is determined that the current duty ratio is equal to the target value. Accordingly, the process returns to Step S1, and the value of a newly detected vibration frequency is again inputted.

If it is determined in Step S5 that the duty data 1 and the duty data 2 are not equivalent, the process proceeds to Step S6, in which it is determined whether the duty data 1 is smaller than the duty data 2. If the duty data 1 is smaller than the duty data 2, the process proceeds to Step S7, in which the duty data 2 is decreased by a predetermined value "a". If the duty data 1 is not smaller than the duty data 2, the process proceeds to Step S8, in which the duty data 2 is increased by the predetermined value "a". In other words, the duty ratio is not immediately altered into the target value, but is increased or decreased in units of the predetermined value "a", thereby making the control stable and smooth.

After the above-described processing has been executed, the duty data 2 is outputted (altered) and supplied to the PWM converter 23 in Step S9. The process returns to Step S4, in which the current duty ratio is set, and the above-described processing is repeated.

In the above-described manner, it is possible to realize frequency characteristics capable of correcting an image shake corresponding to each vibration frequency. Further, since the characteristics of the integrator 3 are placed under PWM control, it is possible to achieve an effect similar to that of each of the first and second embodiments.

(Fourth Embodiment)

FIG. 9 is a block diagram showing a fourth embodiment of the present invention.

According to each of the above-described first to third embodiments, by executing correction of a phase characteristic corresponding to each vibration frequency (so that the phase at each vibration frequency is made 0 degrees) as shown in FIGS. 4(a) and 4(b), it is possible to achieve a remarkably large, vibration suppression effect at each of the vibration frequencies of 3 Hz to 10 Hz as shown in FIG. 5. Accordingly, it is apparent that a considerable improvement in the frequency characteristics can be achieved by the correction of the phase characteristic. However, if a gain characteristic as well as the phase characteristic is corrected, it is possible to achieve a further improvement.

More specifically, it is possible to effect complete image-shake correction according to the frequency of each vibration by eliminating a phase deviation and a gain deviation in the primary frequency range of the vibration. A more detailed analysis will be made with reference to FIG. 5. As shown, by correcting the phase characteristic of each of the vibration frequencies, it is possible to achieve a sufficient, vibration suppression effect in the case of any of the vibration frequencies. However, a vibration suppression effect at the vibration frequency 3 Hz is larger than a vibration suppression effect at the vibration frequency 10 Hz. This is because, as shown in the gain characteristic shown in FIG. 4(a), the gain characteristic of the angular-velocity sensor is such that the gain reaches 0 dB at 3 Hz and such that as the vibration frequency becomes higher in the order of 4 Hz, 5 Hz, . . . , 10 Hz, the gain level gradually deviates from 0 dB.

Accordingly, if not only the phase characteristic but also the gain characteristic of each vibration frequency is corrected, it will be possible to achieve a uniform and high, vibration suppression effect at all the vibration frequencies.

The fourth embodiment shown in FIG. 9 differs from the first embodiment shown in, for example, FIG. 3 with regard to the following constituent parts. A variable gain amplifier is added after the integrator 3, and the variable gain amplifier is made up of an operational amplifier 26, a resistor $R_6$ and a variable resistor $R_7$ and the gain of the variable gain amplifier can be varied by varying the variable resistor $R_7$. The rotors of the respective variable resistors $R_1$ and $R_7$ are arranged to rotate in interlocked relation to the rotor of the variable resistor $R_2$ provided on the input side of the motor driving circuit 15. Thus, the rotational positions of the rotors of the variable resistors $R_1$ an $R_7$ for varying the frequency characteristics, i.e., their resistance values, are reflected on the input side of the motor driving circuit 15. Since the other parts are similar to those shown in FIG. 3, description thereof is omitted.

More specifically, as described previously in connection with the first embodiment, a phase deviation and a gain deviation which correspond to each vibration frequency are obtained on the basis of the frequency characteristics of the angular-velocity sensor 1 shown in FIGS. 2(a) and 2(b), and a phase correction value (the time constant of the HPF) for use in correction of the phase deviation and a gain correction value (the gain of the variable gain amplifier) for use in correction of the gain deviation are obtained. Phase and gain correction values corresponding to a vibration frequency outputted from the frequency detector 12 are set in the variable resistor $R_1$ of the HPF 2' and the variable resistor $R_7$ of the variable gain amplifier, whereby any phase deviation and any gain deviation in the primary frequency range of an applied vibration can be suppressed so that it is possible to effect a satisfactory image-shake correction corresponding to the frequency of each vibration.

The vibration frequency detected by the frequency detector 12 is converted into a voltage value by the F-V converter 13, and after the voltage value has been corrected by the correcting circuit 14, the corrected voltage value is supplied to the motor driving circuit 15, thereby driving the variable-resistor controlling motor 16. Thus, the variable resistor $R_1$ of the HPF 2' and the variable resistor $R_7$ of the variable gain amplifier are driven so that their resistance values are varied, whereby their respective phase and gain characteristics can be corrected.

A displacement of the resistance value of each of the variable resistors $R_1$ and $R_7$ appears on the resistance value of the variable resistor $R_2$, and the correcting circuit 14 corrects the output of the F-V converter 13 so that when the variable resistors $R_2$ and $R_7$ are driven and their respective resistance values are made equal to correction values corresponding to the vibration frequency, the voltage value set by the variable resistor $R_2$ and the output of the correcting circuit 14 are made equal to each other. In other words, a closed loop is formed by the motor driving circuit 15, the variable-resistor controlling motor 16 and the variable resistors $R_1$, $R_2$ and $R_7$.

Figure 10A:
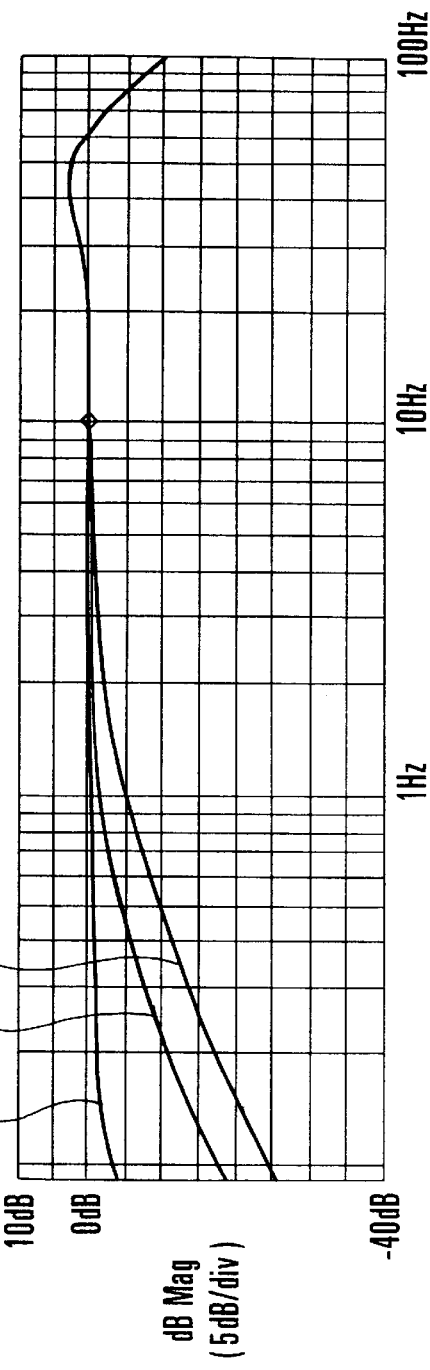
FIGS. 10(a) and 10(b) are views showing frequency characteristics obtained by correcting the characteristics of an angular-velocity sensor used in the fourth embodiment.
Figure 10B:
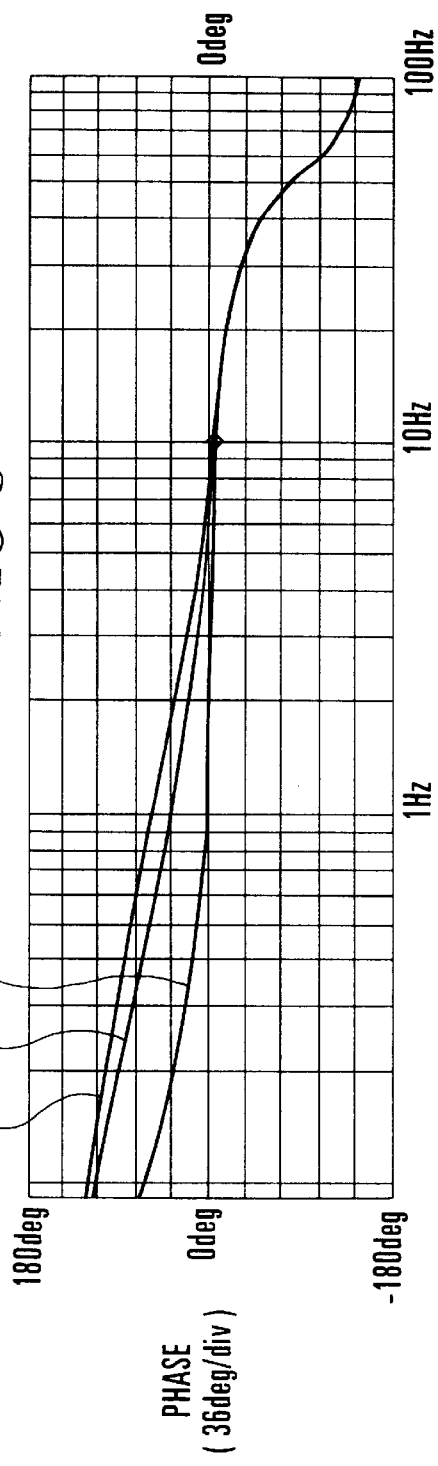
Figure 11:
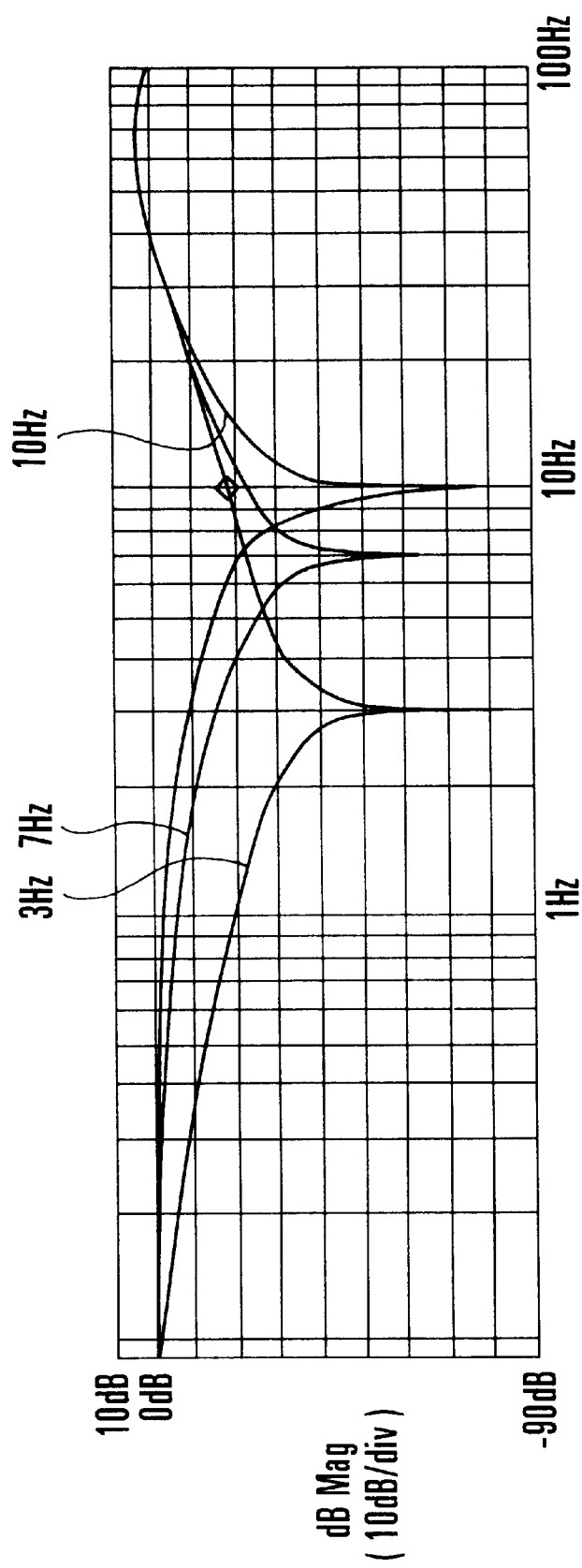
FIG. 11 is a frequency characteristic chart showing the vibration suppression effect obtained in the fourth embodiment.

FIGS. 10(a) and 10(b) show image stabilization characteristic data which are used in the present embodiment of the image-shake correcting device for the purpose of correcting phase deviations and gain deviations which occur at several vibration frequencies (3 Hz, 7 Hz and 10 Hz). FIG. 10(a) shows a gain characteristic, FIG. 10(b) shows a phase characteristic, and FIG. 11 shows the characteristics of the image stabilization effect obtained by correcting the phase deviations and the gain deviations at the vibration frequencies of 3 Hz, 7 Hz and 10 Hz. (It is assumed that the image correcting system is an ideal system as described previously.)

The frequency characteristic obtain e after gain correction is as shown in FIG. 10(a). As shown by the compensation characteristic curves 3, 7 and 10 which correspond to the respective vibration frequencies of 3 Hz, 7 Hz and 10 Hz, it is possible to obtain frequency characteristics which exhibit a gain of 0 dB at 3 Hz, 7 Hz and 10 Hz, respectively.

The frequency characteristic obtained after phase correction is as shown in FIG. 10(b). As shown by the compensation characteristic curves 3, 7 and 10 which correspond to the respective vibration frequencies of 3 Hz, 7 Hz and 10 Hz, it is possible to obtain frequency characteristics which exhibit a phase angle of 0 degrees at 3 Hz, 7 Hz and 10 Hz, respectively.

The above-described gain and phase corrections further provide the following vibration suppression effect. As shown in FIG. 11, it is possible to achieve a uniformly high, vibration suppression effect at any of the shown vibration frequencies. In the case of a continuous vibration, a vibration in the neighborhood of 10 Hz can only be suppressed to approximately $\frac{1}{40}$, as shown in FIG. 5, according to the first to third embodiments each of which utilizes only the phase correction. In contrast, according to the fourth embodiment, since the above-described correction of the gain deviation is added, it is possible to suppress such a vibration to $\frac{1}{100}$ or below. This is because both the phase deviation and the gain deviation are corrected.

(Fifth Embodiment)

Figure 12:
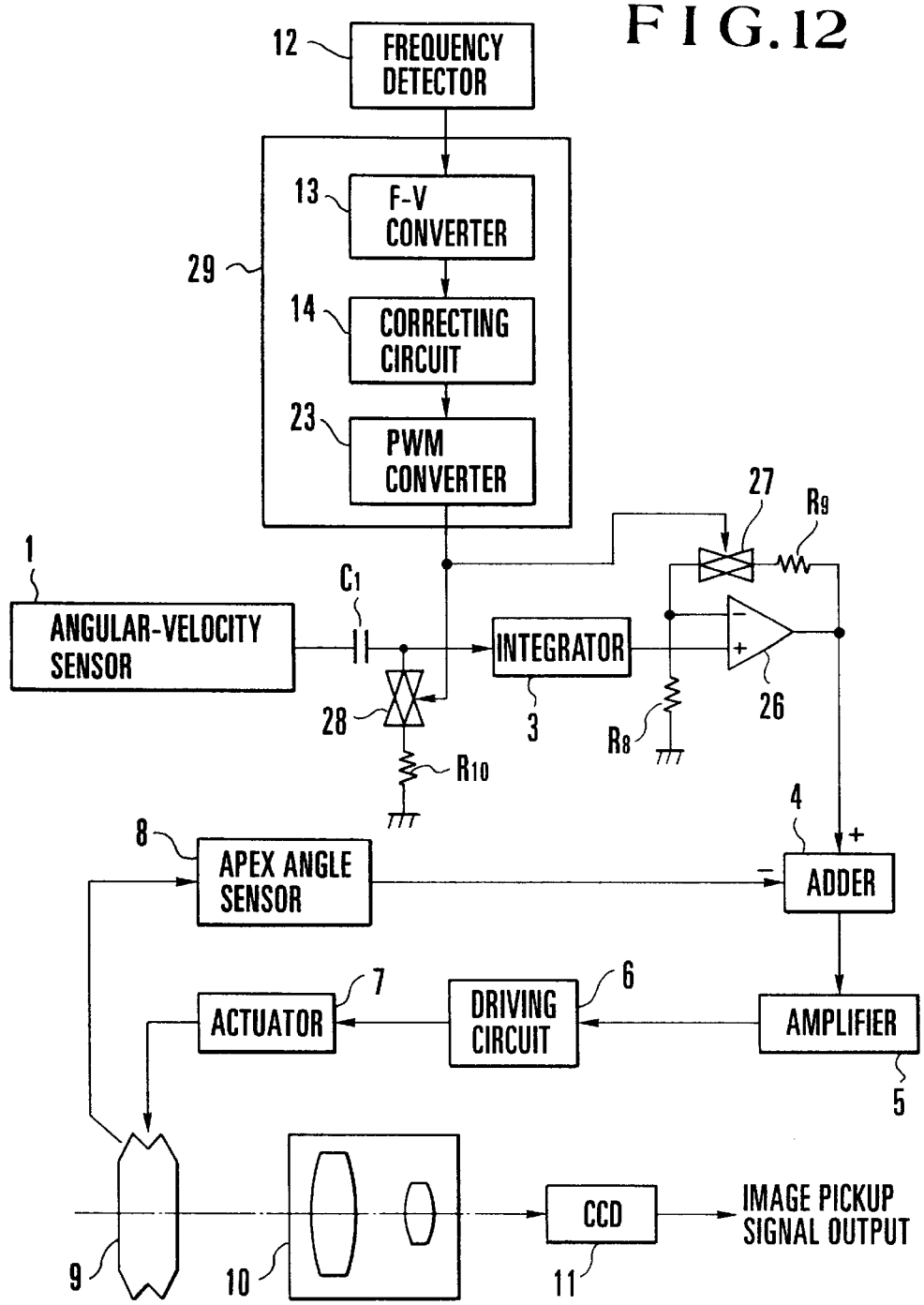
FIG. 12 is a block diagram showing a fifth embodiment of the image-shake correcting device according to the present invention.

FIG. 12 shows a fifth embodiment of the present invention.

The fifth embodiment differs from the fourth embodiment of FIG. 9 in the following respect. In the fourth embodiment, analog switches 27 and 28 are respectively used to alter frequency characteristics for correcting a phase deviation and a gain deviation (i.e., the resistance value of the resistor for setting the time constant of the HPF and the resistance value of the resistor for setting the gain of the variable gain amplifier). Duty ratios for use in on/off control of the respective analog switches 27 and 28 are placed under PWM control so that the resistance values can be varied.

The system itself used in the fifth embodiment is similar to that used in the fourth embodiment of FIG. 9. In the system, the phase characteristic of the HPF for cutting a direct-current component and the gain of the variable gain amplifier are varied according to a vibration frequency so that an optimum characteristic can be set for each vibration frequency.

Referring specifically to characteristic varying means, the fifth embodiment also adopts the above-described method of turning on and off each of the analog switches 27 and 28 under PWM control to control the values of their electric currents, thereby substantially varying the resistance values. This control method is as described previously in connection with FIG. 7.

The duty ratios of a PWM signal to be applied to the analog switch 28 for correcting a phase deviation corresponding to each frequency and the duty ratios of a PWM signal to be applied to the analog switch 27 for correcting a gain deviation corresponding to each frequency are beforehand obtained on the basis of the frequency characteristics of the angular-velocity sensor 1. If the duty ratios of the PWM signals for turning on and off the respective analog switches 28 and 27 are varied according to a vibration frequency detected by the frequency detector 12, the respective resistance values across resistors $R_{10}$ and $R_9$ vary according to the switching operations of the corresponding analog switches 28 and 27. By repeating the above-described operation, any phase deviation in the primary frequency range of the vibration can be eliminated so that it is possible to effect a satisfactory image-shake correction corresponding to the frequency of each vibration.

In the above-described arrangement, the F-V converter 13, the correcting circuit 14 and the PWM converter 23 may be formed by a microcomputer 29. The flow of the processing of inputting a vibration frequency into the microcomputer 29 and altering the duty ratio of each of the analog switches 28 and 27 in accordance with a PWM output, will be described below with reference to the flowchart shown in FIG. 13.

Figure 13:
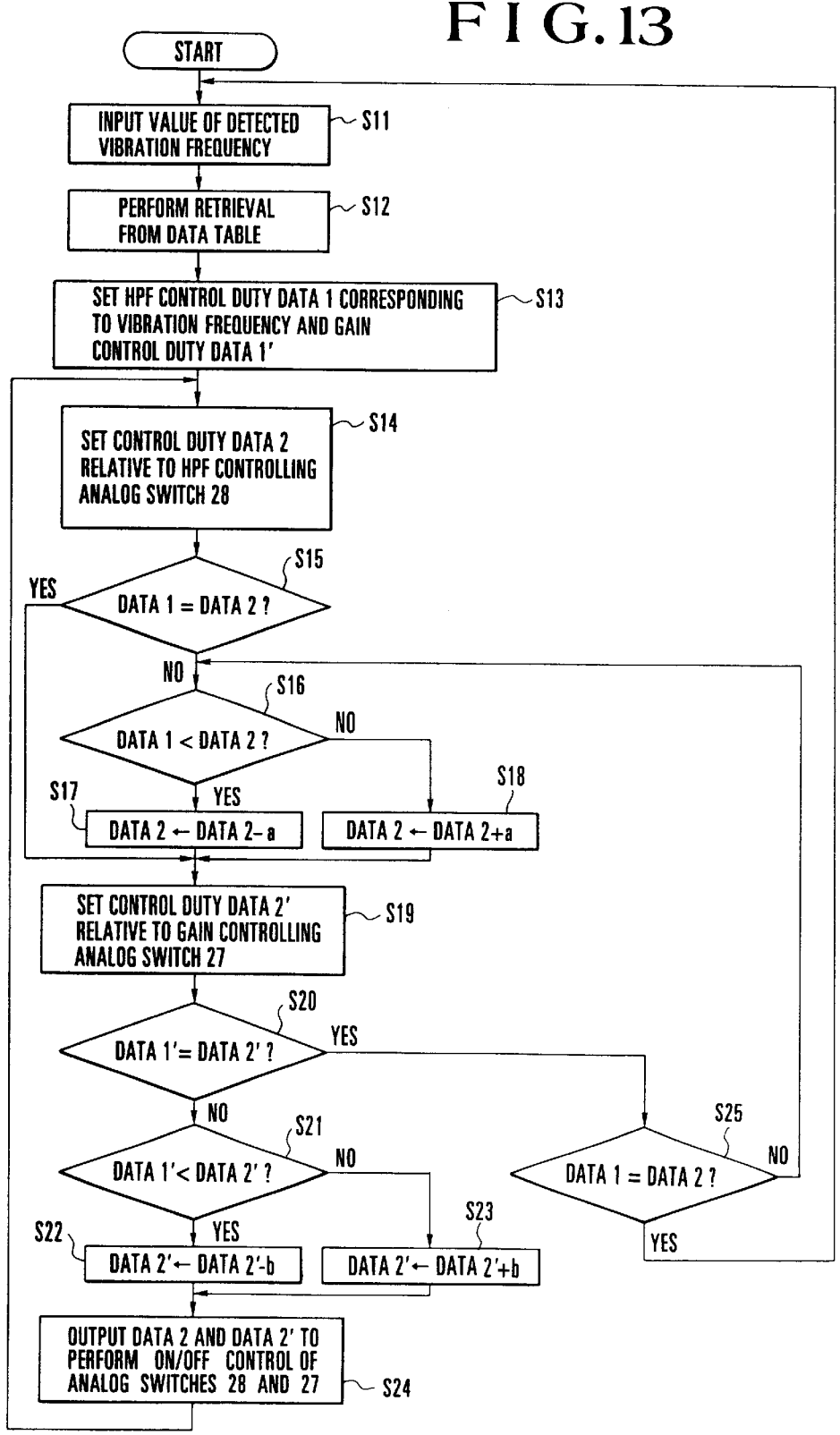
FIG. 13 is a flowchart which serves to explain the fifth embodiment of the image-shake correcting device according to the present invention.

Referring to FIG. 13, the value of a detected vibration frequency is inputted into the microcomputer 29 in Step S11, and the microcomputer 29 performs retrieval from a data table (refer to FIG. 14) which is beforehand set in the microcomputer 29, the relationships between vibration frequencies and the duty ratios for use in PWM control of the respective analog switches 28 and 27 being set on the data table. In Step S13, a duty ratio corresponding to the detected vibration frequency, which is used in on/off control of the phase controlling analog switch 28, is read and set as the duty data 1. Further, a duty ratio corresponding to the detected vibration frequency, which is used in on/off control of the gain controlling analog switch 27, is read and set as the duty data 1'.

In Step S14, the current duty outputted to each of the analog switches 28 and 27 is set as the duty data 2. In Step S15, a comparison is made between the value of the duty data 1 and the value of the duty data 2. If it is determined in Step S15 that both values are equal, the process proceeds to Step S19. If it is determined in Step S15 that both values differ, the process proceeds to Step S16, in which it is determined whether the duty data 1 is smaller than the duty data 2. If the duty data 1 is smaller than the duty data 2, the process proceeds to Step S17, in which the duty data 2 is decreased by the predetermined value "a". If the duty data 1 is not smaller than the duty data 2, the process proceeds to Step S18, in which the duty data 2 is increased by the predetermined value "a". In other words, the duty ratio is not immediately altered into the target value, but is increased or decreased in units of the predetermined value "a", thereby making the control stable and smooth.

In Step S19, the current duty outputted to each of the analog switches 28 and 27 is set as duty data 2'. In Step S20, a comparison is made between the value of the duty data 1' and the value of the duty data 2'. If it is determined in Step S20 that both values are equal, the process proceeds to Step S25, in which it is determined whether the duty data 1 and the duty data 2 for the analog switch 28 for phase correction are equal to each other. If the duty data 1 and the duty data 2 differ from each other, the process proceeds to Step S16. If the duty data 1 and the duty data 2 are equal to each other, the process proceeds to Step S11, in which information indicative of a newly detected vibration frequency is inputted into the microcomputer 29.

If it is determined in Step S20 that the value of the duty data 1' and that of the duty data 2' differ from each other, the process proceeds to Step S21, in which it is determined whether the duty data 1' is smaller than the duty data 2'. If the duty data 1' is smaller than the duty data 2', the process proceeds to Step S22, in which the duty data 2' is decreased by a predetermined value "b". If the duty data 1' is not smaller than the duty data 2', the process proceeds to Step S23, in which the duty data 2' is increased by the predetermined value "b". Thus, the duty ratio is progressively altered by the predetermined value "b".

In Step S24, the duty data 2 and the duty data 2', which indicate duties for PWM control of the corresponding analog switches 28 and 27, are respectively employed to actually execute on/off control of the analog switches 28 and 27. Then, the process returns to Step S14.

In the above-described process, if it is determined in Step, S20 that the duty data 1' and the duty data 2', both of which are gain correction data, are equal to each other, the process does not immediately come to an end and proceeds to Step S25, in which a comparison is made between the duty data 1 and the duty data 2, both of which are phase correction data. This processing is provided for again executing phase correction if no phase correction has yet been completed after the completion of gain correction.

The above-described process is cyclically repeated, and the control duty of each of the analog switches 28 and 27 is progressively altered. This is intended to prevent the problem that if the value of the control duty of each of the analog switches 28 and 27 is abruptly changed, the frequency characteristics of the system abruptly vary or a discontinuous motion of the system occurs.

FIG. 14 shows the structure of the data table, stored in the microcomputer 29, which shows the duty ratios for PWM control of the analog switches 28 and 27 in relation to individual vibration frequencies. As can be seen from FIG. 14, the value of a duty ratio for HPF control and the value of a duty ratio for gain control are set with respect to a vibration frequency f(Hz). The symbol "(%)" in FIG. 14 represents the on time of a drive pulse to be applied to each of the analog switches 28 and 27. Regarding the duty ratio for HPF control, as the vibration frequency becomes higher, the on time becomes longer, while the resistance value of the resistor $R_{10}$ of the HPF progressively decreases from its highest value toward the inherent value of the resistor $R_{10}$. Regarding the duty ratio for gain control, the duty ratio reaches its maximum at a predetermined frequency determined by the characteristics of the system, and decreases toward the opposite ends of the values of the duty ratio. This setting is intended to correct the frequency characteristics of the angular-velocity sensor in which the gain decreases from its maximum-value position toward the opposite ends.

(Sixth Embodiment)

Figure 15:
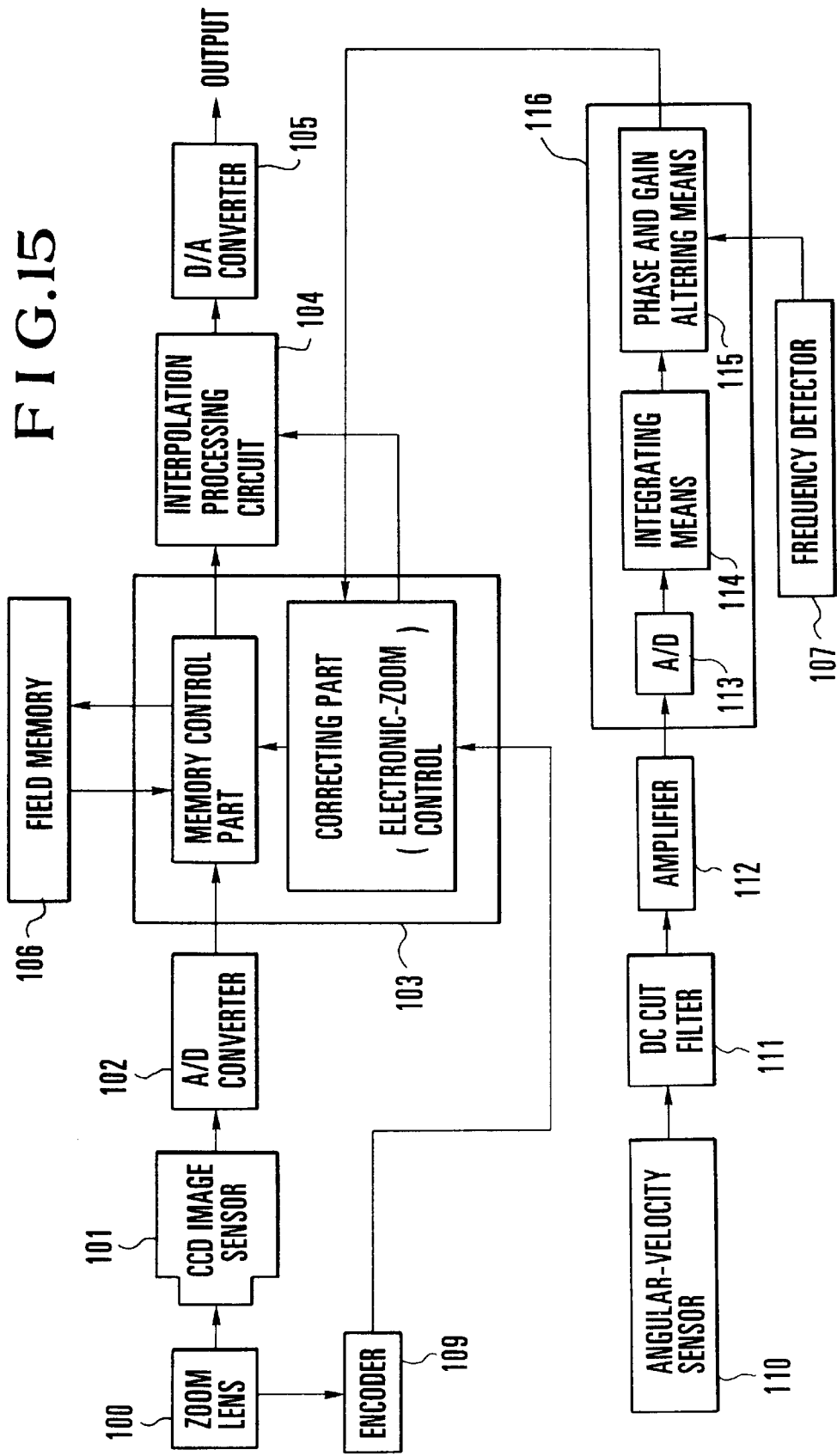
FIG. 15 is a block diagram showing a sixth embodiment of the image-shake correcting device according to the present invention.

FIG. 15 is a block diagram schematically showing a sixth embodiment of the image-shake correcting device according to the present invention.

The arrangement shown in FIG. 15 includes a zoom lens 100, an image pickup device (CCD image sensor) 101 for converting an optical image into an electrical signal, an A/D converter 102 for converting an image pickup signal outputted from the image pickup device 101 into a digital signal, and a system control circuit 103. The system control circuit 103 is made from a microcomputer and includes a memory control part and a correcting part. The memory control part performs the processing of writing and reading the digital image pickup signal outputted from the A/D converter 102 into and from a field memory 106. The memory control part also performs, during reading processing, image-shake correction by shifting the position of memory reading in the direction in which a movement of an image due to a vibration is cancelled, on the basis of an image-shake correction signal supplied from a vibration detecting system. When the memory control part is to shift the position of reading from the field memory 106, the correcting part corrects the amount of shifting of the position of memory reading on the basis of focal-length information (zoom magnification information) supplied from a zoom encoder 109. The correcting part performs another processing such as the electronic-zoom processing of enlarging an image indicated by read image information to correct the image so that the angle of view of the image coincides with a normal angle of view.

In brief, in the sixth embodiment of the image-shake correcting device according to the present invention, after an image signal outputted from an image pickup device has been stored in a memory, reading is performed of the portion of the image signal contained in a reading area defined in the memory. The reading area is selected to be smaller than the entire picture and is variable in the picture, so that image information whose image shake is substantially corrected is obtained by shifting the reading area in the direction in which the movement of the image due to a vibration of the apparatus is cancelled. Since the read image information represents an image having an angle of view smaller than the normal angle of view, the image is electronically enlarged up to the normal angle of view by electronic-zoom processing.

Thus, the system controlling circuit 103 outputs image information representative of the image whose movement due to the vibration has been corrected by the above-described processing and which has been subjected to the above-described enlargement processing. An interpolation processing circuit 104 is provided for calculating the number of pixels to be outputted during the image enlargement processing, i.e., how many pixels are to be outputted during the interval that one normal pixel is outputted, and interpolating between pixels having no information on the basis of adjacent-pixel information or the like. The output of the interpolation processing circuit 104 is supplied to a D/A converter 105. The supplied signal is converted into an analog signal by the D/A converter 105, and the analog signal is outputted to a recorder apparatus (not shown), a monitor display (not shown) or the like.

The vibration detecting system for detecting a vibration applied to the apparatus will be described below. As shown in FIG. 15, the vibration detecting system includes a frequency detector 107 for detecting the frequency of a vibration applied to the apparatus, the frequency detector 107 being similar to the frequency detector used in each of the aforesaid embodiments, an angular-velocity sensor 110 such as a vibration gyro, a DC cut filter 111 for eliminating the direct-current (drift) component of an angular-velocity signal outputted from the angular-velocity sensor 110, an amplifier 112 for amplifying the angular-velocity signal in accordance with a predetermined gain, an A/D converter 113, integrating means 114 for integrating the angular-velocity signal outputted from the A/D converter 113, and phase and gain altering means 115 for correcting a phase and a gain in accordance with the vibration frequency detected by the frequency detector 107. The A/D converter 113, the integrating means 114 and the phase and gain altering means 115 may also be formed by a microcomputer 116.

The operation of the sixth embodiment of the image-shake correcting device having the above-described arrangement will be described below.

An optical image formed by the zoom lens 100 is converted into an electrical signal by the image pickup device 101, and the image pickup signal outputted from the image pickup device 101 is converted into a digital image signal by the A/D converter 102. The digital image signal is written into the field memory 106 as an image signal for one field. On the basis of an image correction signal outputted from the phase and gain altering means 115 and the amount of movement of the image obtained from a zoom magnification provided by the zoom encoder 109, the position of reading of the image signal written into the field memory 106 is shifted in the direction in which the movement of the image is corrected as described above, and an image signal indicative of an image whose image shake is corrected is read from the field memory 106. The corrected image is subjected to enlargement processing and interpolation processing and the obtained image of normal angle of view is outputted.

In any of the embodiments described previously, since the HPF for cutting a DC component serves as phase correcting means, it is necessary to dispose the phase correcting means at a specific limited position. However, it is, of course, possible to arrange the phase correcting means separately from the HPF for cutting a DC component, and it is possible to achieve a similar image-shake correction effect even in the case of a digital signal formed by A/D conversion. The phase and gain altering means 115 is intended to realize this arrangement.

Figure 19:
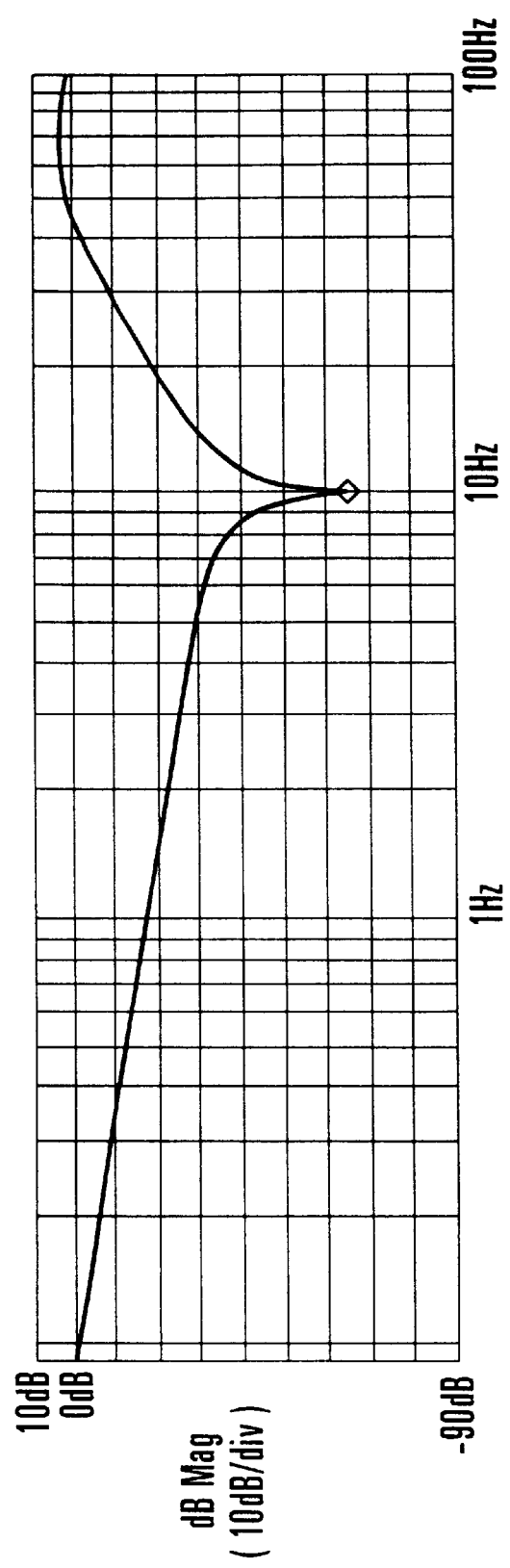
FIG. 19 is a frequency characteristic chart showing the vibration suppression effect obtained in the sixth embodiment.

FIGS. 18(a) and 18(b) are gain and phase characteristic charts each showing the basic characteristic of the angular-velocity sensor 110, the characteristic of the phase and gain altering means 115, and an ideally corrected characteristic. FIG. 19 is a characteristic chart showing a vibration suppression effect obtained by effecting the respective corrections shown in FIGS. 18(a) and 18(b). FIGS. 18(a), 18(b) and 19 show only characteristics relative to a vibration of frequency 10 Hz for the sake of convenience of explanation. In practice, correction characteristics are prepared for each vibration frequency, and a suitable correction characteristic is selected according to each vibration frequency in a manner similar to that used in each of the previously described embodiments.

Referring to FIGS. 18(a) and 18(b), the characteristic curve shown at (a) represents the basic characteristic of the angular-velocity sensor 110, and if the greatest effect is to be achieved at the vibration frequency of 10 Hz with respect to the basic characteristic (a) of the angular-velocity sensor 110, the phase of the output signal of the angular-velocity sensor 110 is made to advance by 7.5 degrees so that the phase angle is made 0 degrees, and the gain of the signal is adjusted to 0 dB at the phase angle of 0 degrees. More specifically, by arranging a digital filter capable of realizing a characteristic (b) with respect to the characteristic (a) and connecting the digital filter (the characteristic (b)) in series with the characteristic (a) (the angular-velocity sensor 110), it is possible to obtain a characteristic (c) in which the characteristics (a) and (b) are combined. By using the characteristic (c), it is possible to achieve a vibration suppression effect exceeding −60 dB at the vibration frequency of 10 Hz as shown in FIG. 19.

Figure 16:
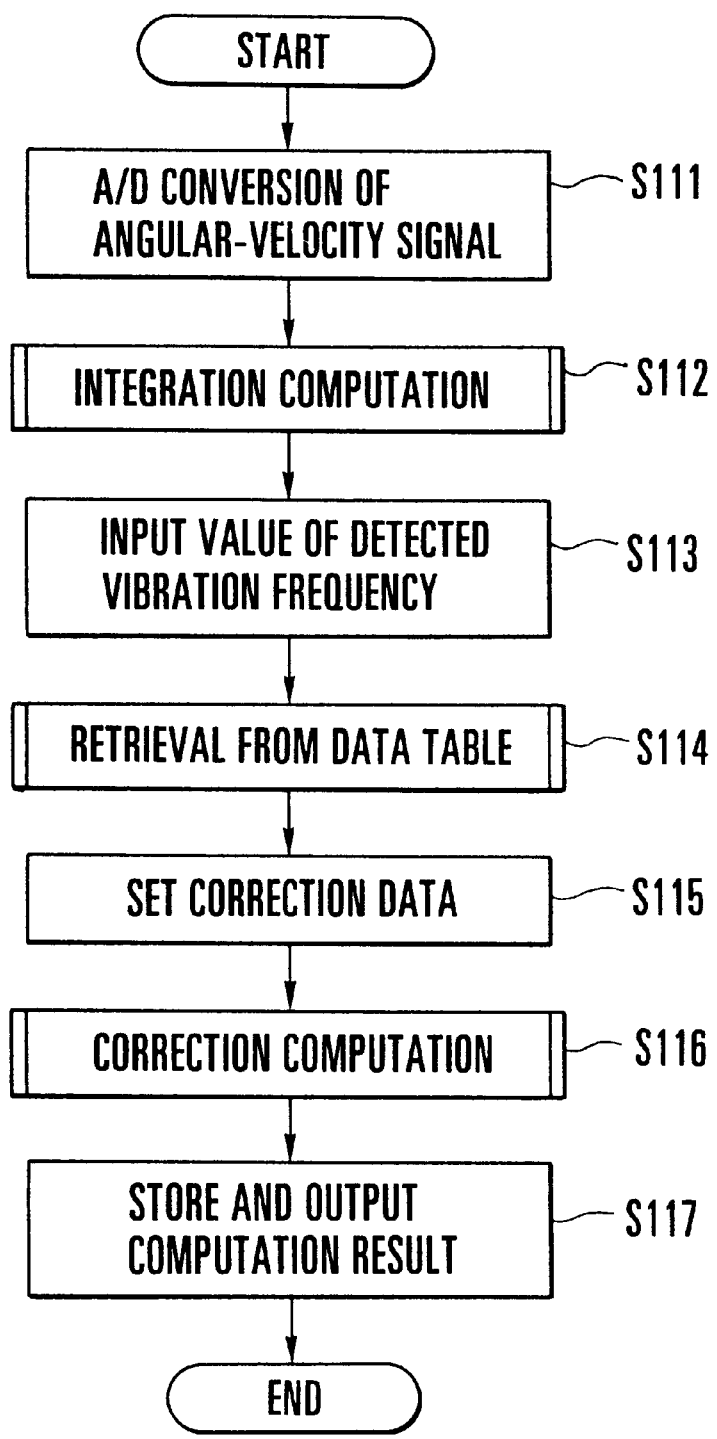
FIG. 16 is a flowchart which serves to explain the sixth embodiment of the image-shake correcting device according to the present invention.

FIG. 16 is a flowchart showing one example of the processing executed by the microcomputer 116, shown in FIG. 15, which includes the A/D converter 113, the integrating means 114 and the phase and gain altering means 115.

Referring to FIG. 16, when the process is started, an angular-velocity signal outputted from the angular-velocity sensor 110 is subjected to A/D conversion in Step S111, and an integration computation is performed in Step S112. In Step S113, a vibration frequency is inputted from the frequency detector 107 into the microcomputer 116, and data indicative of a constant for the digital filter or the like is retrieved in Step S114. In Step S115, the retrieved constant data is set in the digital filter. In Step S116, a correction computation is performed by using the digital filter in which the constant data has been set in Step S115. In Step S117, the result of the correction computation is stored in the microcomputer 116 and is simultaneously outputted into the correcting part of the system controlling circuit 103 for performing image-shake correction utilizing the aforesaid image processing. The microcomputer 116 performs a filtering computation on the basis of the stored constant.

The image correcting system is controlled on the basis of the thus-obtained image-shake correction signal, so that it is possible to perform optimum image-shake correction according to the vibration frequency (setting of an optimum amount of shifting of the position of memory reading).

One example of the digital filter using a primary IIR filter is shown in FIG. 17, and the digital filter has the arrangement and characteristics shown in FIG. 17. The digital filter forms the image-shake correction characteristic curves (b) shown in FIGS. 18(a) and 18(b), respectively, and the characteristic of the angular-velocity sensor 110 is corrected to provide an ideal characteristic shown as the characteristic curve (c). The constants of the respective constituent parts shown in FIG. 17 and computational expressions using the constants are as follows:

$$u_0 = a_0 \cdot w_0 + a_1 \cdot w_1$$

$$w_0 = e_0 + a_2 \cdot w_1$$

where $w_1 = w_0$ ($w_1$ is $w_0$ obtained one sampling period before), $e_0$=input, $u_0$=output, and $a_0$, $a_1$ and $a_2$: filter coefficients.

By changing the values of the filter coefficients $a_0$, $a_1$ and $a_2$, it is possible to set the frequency characteristics. Accordingly, data indicative of the filter coefficients $a_0$, $a_1$ and $a_2$ corresponding to different vibration frequencies are prepared as a table, and if a vibration is detected, a filter coefficient according to the vibration frequency of the detected vibration is read from the table to perform the computation using the aforesaid IIR filter.

In the case of a system having a particular frequency characteristic, it may also be preferable to use a secondary filter. Since the number of set values of the filter coefficients merely increases, it is possible to easily achieve an arrangement using the secondary filter.

As described above, even if a variation occurs in the characteristics of the vibration detecting means or the image correcting system, it is possible to cope with the variation by beforehand measuring their frequency characteristics and setting an optimum correction value for the phase and gain altering means.

As described above, a phase advancing (delaying) element and gain altering means are connected in series with each other in an open system between angular-velocity detecting means and the image correcting system so that the above-described correction of the phase deviation and the gain deviation is effected.

(Seventh Embodiment)

Figure 20:
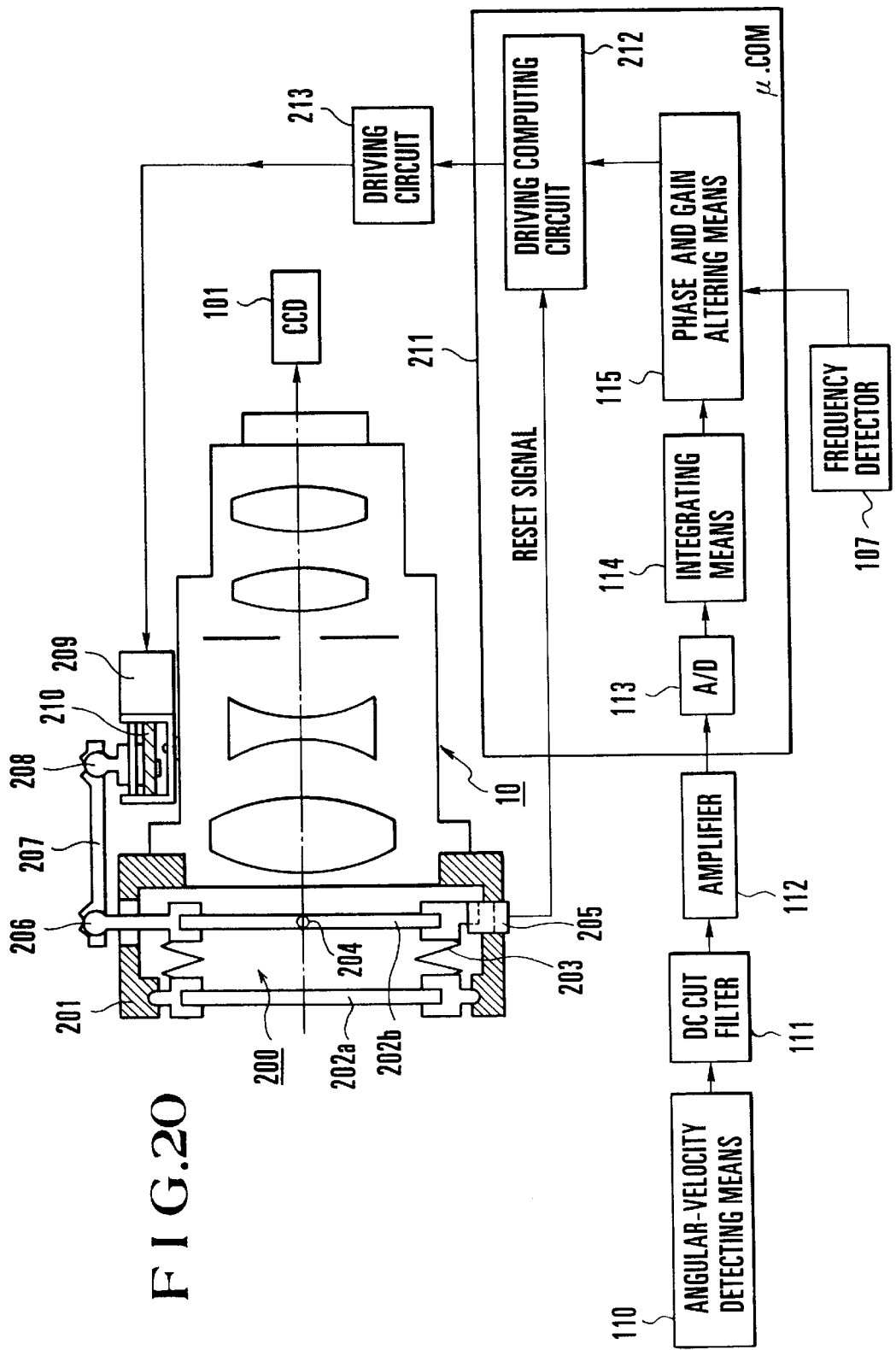
FIG. 20 is a block diagram showing a seventh embodiment of the image-shake correcting device according to the present invention.

FIG. 20 is a block diagram showing a seventh embodiment of the present invention. The arrangement and operation of an angular-velocity detecting system including the angular-velocity detecting means 110, the DC cut filter 111, . . . , and the phase and gain altering means 115, as well as the arrangement and operation of the frequency detector 107 are similar to those explained above in connection with the sixth embodiment, and description thereof is omitted.

In the seventh embodiment, the image correcting system includes a VAP whose apex angle can be varied by a stepping motor mechanically coupled to the VAP. An image-shake correcting system for driving the VAP adopts a control system based on open-loop control.

Referring to FIG. 20, a VAP 200 is attached to the front of the lens unit (lens barrel) 10 by a supporting frame 201. Two parallel transparent plates 202a and 202b are supported by the supporting frame 201, and the space between the transparent plates 202a and 202b is sealed around the external circumference thereof by a sealing material 203. A material of high refractive index is hermetically enclosed in the sealed space between the transparent plates 202a and 202b. The transparent plate 202b located on the lens side is supported turnably about an axis 204 in such a manner that the apex angle of the VAP 200 can be varied. In the following description of the seventh embodiment as well, explanation of a supporting mechanism and a driving mechanism relative to an axis perpendicular to the axis 204 is omitted for the sake of simplicity.

The movable, transparent plate 202b is provided with a spherical engagement part 206, and forms a universal joint in cooperation with one end of a connecting member 207 so that the transparent plate 202b can be made to turn about the axis 204 in accordance with a movement of the connecting member 207.

The other end of the connecting member 207 forms a universal joint by being coupled to a spherical engagement part 208 of a moving part which is arranged to be moved by a lead screw 210 formed on the rotating shaft of a stepping motor 209 fixed to the lens barrel 10. In this arrangement, the apex angle of the VAP 200 can be varied by driving the driving motor 209.

In a microcomputer 211 which includes the A/D converter 113, the integrating means 114 and the phase and gain altering means 115, there is also provided a driving computing circuit 212 for converting an image-shake correction signal outputted from the phase and gain altering means 115 into a signal indicative of the number of driving steps of the stepping motor 209. The signal indicative of the number of driving steps of the stepping motor 209, which is outputted from the driving computing circuit 212, is supplied to a driving circuit 213 for outputting a driving pulse to actually drive the stepping motor 209, whereby the stepping motor 209 is driven. A reset sensor 205 is provided for detecting the initial position of the VAP 200, i.e., the position in which the transparent plate 202b and the transparent plate 202a are parallel to each other, outputting a reset signal, and resetting a counter provided in the driving computing circuit 212, the aforesaid number of driving steps being set in the counter.

Even if the image-shake correcting system is formed as an open-loop correction system using the stepping motor in the above-described manner, it is possible to achieve an image-shake correcting function similar to that achieved by the sixth embodiment by converting an angular-displacement signal indicative of a vibration frequency characteristic subjected to phase and gain corrections into a signal indicative of the number of driving pulses of the stepping motor.

As described above, according to the above-described first to seventh embodiments of the image-shake correcting device according to the present invention, since the frequency characteristics of the image-shake correcting means are altered according to the frequency range of a vibration occurring during photography, it is possible to execute optimum image-shake correction conforming to the condition and state of the photography at all times.

Further, since it is possible to achieve a maximum correction effect over the frequency range of vibrations applied to the photographic apparatus including the image-shake correcting means, it is possible to achieve a remarkable effect in eliminating the adverse influence of an applied vibration having a specific frequency distribution.

An eighth embodiment of the present invention will be described below. Each of the above-described embodiments is arranged to detect the center frequency of a vibration applied to the photographic apparatus including the image-shake correcting device, vary a gain characteristic and a phase characteristic in accordance with the detected center frequency, and correct a gain deviation and a phase deviation at the center frequency of the vibration. However, since frequency detecting means is independently prepared outside the device, any of the above-described embodiments still contains drawbacks which are to be solved to simplify the adjustment and the arrangement of the image-shake correcting device.

According to the eighth embodiment which will be described below, there is an image-shake correcting device which comprises first detecting means for detecting a vibration of the photographic apparatus, correcting means for correcting a movement of an image due to the vibration, first controlling means for controlling the correcting means on the basis of an output of the first detecting means and driving the correcting means in a direction in which the movement of the image is corrected, second detecting means for detecting a frequency and an amplitude of the vibration from the output of the first detecting means, and second controlling means for controlling a characteristic of the first controlling means on the basis of an output of the second detecting means.

Figure 21:
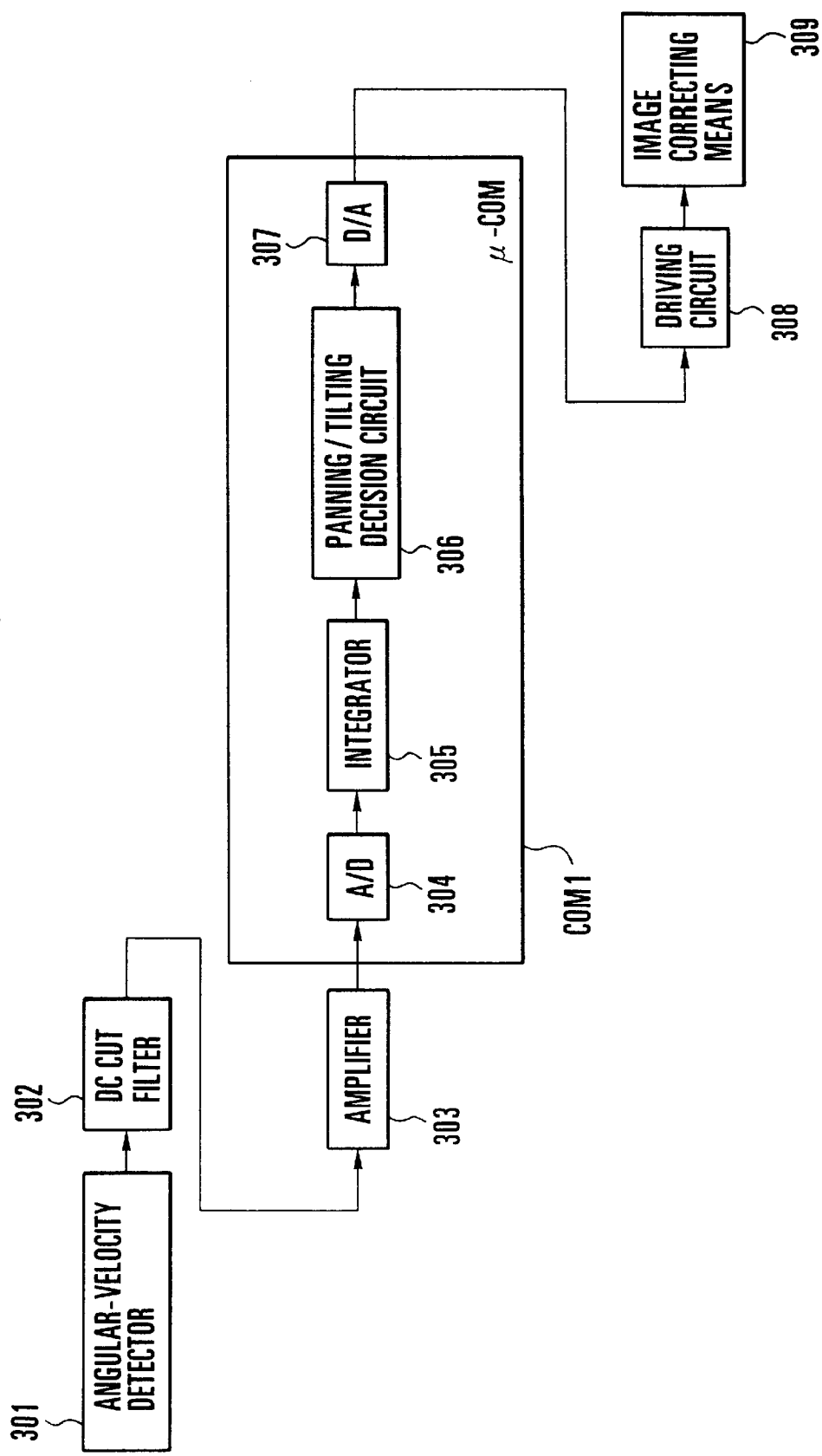
FIG. 21 is a block diagram which serves to explain an eighth embodiment of the present invention, and shows the basic arrangement of an image-shake correcting device.

FIG. 21 shows the basic arrangement of the image-shake correcting device.

The image-shake correcting device shown in FIG. 21 includes an angular-velocity detector 301 made from an angular-velocity sensor, such as a vibration gyro, and provided in a photographic apparatus such as a camera, and a DC cut filter 302 for eliminating the direct-current component of a velocity signal outputted from the angular-velocity detector 301 and passing only an alternating-current component, i.e., only a vibration component. The DC cut filter 302 may be a high-pass filter (hereinafter referred to as the "HPF") for eliminating a signal of arbitrary frequency band. The image-shake correcting device shown in FIG. 21 also includes an amplifier 303 for amplifying an angular-velocity signal outputted from the DC cut filter 302 up to a predetermined level, an A/D converter 304 for converting the angular-velocity signal outputted from the amplifier 303 into a digital signal, an integrator 305 for integrating the output of the A/D converter 304 and outputting an angular-displacement signal, a panning/tilting decision circuit 306 for making a decision as to panning and tilting, on the basis of the integral signal of the angular-velocity signal outputted from the integrator 305, i.e., the angular-displacement signal, and a D/A converter 307 for converting the output of the panning/tilting decision circuit 306 into an analog signal or a pulse signal such as a PWM signal and outputting the analog signal or the pulse signal. The A/D converter 304, the integrator 305, the panning/tilting decision circuit 306 and the D/A converter 307 may be formed by, for example, a microcomputer COM1. The image-shake correcting device shown in FIG. 21 also includes a driving circuit 308 and image correcting means 309 provided at the next stage, and the driving circuit 308 drives the image correcting means 309 on the basis of a displacement signal outputted from the microcomputer COM1 so that the image correcting means 309 is made to suppress an image shake. The image correcting means 309 may utilize, for example, optical correcting means for cancelling an image shake by displacing an optical axis or electronic correcting means for cancelling an image shake by electronically shifting the position of image reading from a memory in which an image is stored.

If a vibration of constant amplitude is applied to an apparatus, such as a camera, which is provided with an image-shake correcting device using an existing angular-velocity sensor, the frequency characteristics of a vibration component signal provided at the image correcting means 309 are as shown in FIGS. 2(a) and 2(b). As stated previously in connection with the embodiments described previously, referring to the gain and phase characteristics at 10 Hz, the gain level is approximately 0 dB, while the phase angle deviates by approximately 7.5 degrees. Because of the presence of this phase deviation, the applied vibration can only be suppressed to approximately ⅛ at 10 Hz with respect to approximately ¹⁄₁₀₀ or below at 3 Hz. This problem can be solved by any of the first to seventh embodiments described previously.

A primary feature of the eighth embodiment resides in an arrangement in which the primary frequency range of a vibration occurring during photography is detected from an output signal of image-shake detecting means which is used for vibration detection and the detected vibration frequency can be used to execute control so that optimum image-shake correction conforming to each individual photographic condition and environment can be effected.

Another feature of the eighth embodiment is that since a vibration frequency can be detected by using the angular-velocity signal outputted from the angular-velocity detecting means, it is possible to simplify the arrangement, adjustment and control of the image-shake correcting device. A further feature is that since the angular-velocity signal and an angular-displacement signal obtained by integrating the angular-velocity signal are simultaneously employed, it is possible to improve a frequency detecting capability.

(Eighth Embodiment)

Figure 22:
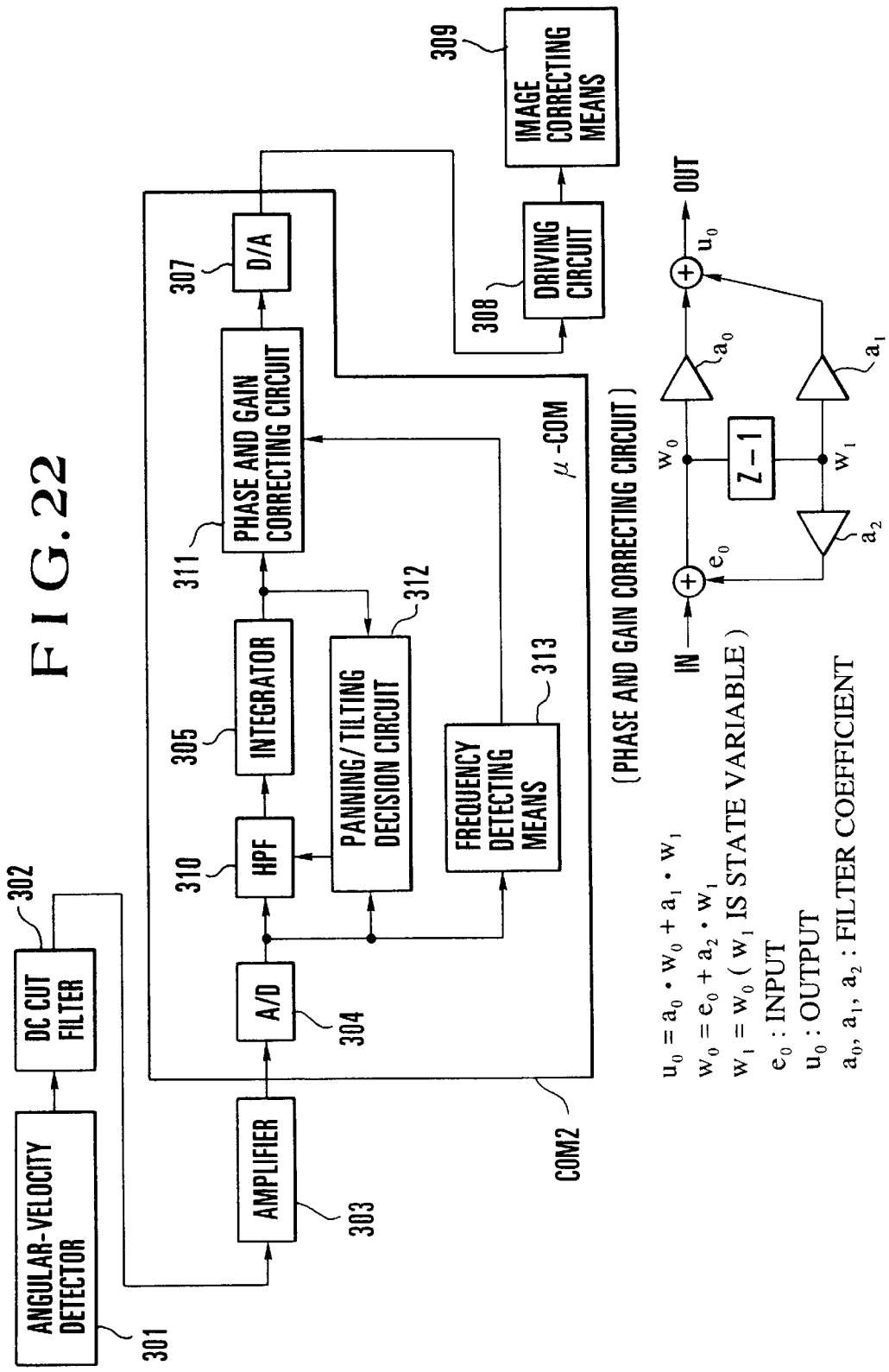
FIG. 22 is a block diagram showing the eighth embodiment of the image-shake correcting device according to the present invention.

FIG. 22 is a block diagram showing the essential arrangement of the eighth embodiment of the image-shake correcting device according to the present invention. In FIG. 22, identical reference numerals are used to denote constituent parts substantially identical to those of the device shown in FIG. 21, and detailed description thereof is omitted.

The eighth embodiment shown in FIG. 22 is identical to the device shown in FIG. 21 in respect of the angular-velocity detecting means 301, such as a vibration gyro, provided in the photographic apparatus such as a camera, the DC cut filter (or HPF) 302 for eliminating the direct-current component of an angular-velocity signal outputted from the angular-velocity detecting means 301, the amplifier 303 for amplifying the angular-velocity signal up to a predetermined level, the driving circuit 308 and the image correcting means 309. The difference between the eighth embodiment and the aforesaid device resides in the internal arrangement of a microcomputer COM2 for providing control over the entire device. In the eighth embodiment, a variable angle prism (VAP) or a memory control system, which will be described later, is employed as the image correcting means 309.

The internal arrangement of the microcomputer COM2 includes the A/D converter 304 for converting an angular-velocity signal outputted from the amplifier 303 into a digital signal, an HPF 310 having a function capable of varying its characteristic within an arbitrary frequency range, the integrator 305 for integrating a signal containing a predetermined frequency component extracted by the HPF 310 and finding an angular-displacement signal corresponding to the frequency component, a phase and gain correcting circuit 311 for correcting the phase and gain of an integral output signal outputted from the integrator 305, i.e., the angular-displacement signal, in accordance with frequency detecting means 313 which will be described later, and a D/A converter 307 for converting the output signal of the phase and gain correcting circuit 311 into an analog signal or a pulse output, such as a PWM signal, and outputting the analog signal or the pulse signal.

A panning/tilting decision circuit 312 is provided for making a decision as to panning and tilting as well as the state of photography on the basis of the angular-velocity signal outputted from the A/D converter 304 and the angular-displacement signal outputted from the integrator 305 and altering the characteristics of the HPF 310 on the basis of the result of the decision.

The panning/tilting decision circuit 312 operates in the following manner. The panning/tilting decision circuit 312 receives an angular-velocity signal (indicative of the presence or absence of a vibration) outputted from the A/D converter 304 and an angular-displacement signal outputted from the panning/tilting decision circuit 312. If the angular velocity is constant and the angular-displacement signal obtained by integrating the angular-velocity signal shows a monotonous increase, the panning/tilting decision circuit 312 determines that panning or tilting has occurred. In this case, the panning/tilting decision circuit 312 shifts the low-frequency cut-off frequency of the HPF 310 toward a higher-frequency side, thereby altering the characteristics of the HPF 310 to prevent the image-signal correcting system from responding to a vibration of low frequency.

If panning or tilting is detected, the VAP is progressively centered toward the center of its moving range. During this time as well, detection of the angular-velocity signal and the angular-displacement signal is continued, and when the panning or tilting comes to an end, the operation of lowering the low-frequency cut-off frequency of the HPF 310 and extending an image-shake correction range is performed.

The frequency detecting means 313 is provided for detecting a vibration applied to the apparatus, on the basis of the angular-velocity signal outputted from the A/D converter 304, and controlling the characteristic of the phase and gain correcting circuit 311 in accordance with the frequency of the detected vibration.

The driving circuit 308 and the image correcting means 309 which substantially serve to correct an image shake in accordance with a control signal outputted from the microcomputer COM2 will be illustratively described with reference to the examples shown in FIGS. 28, 30 and 34.

Figure 28:
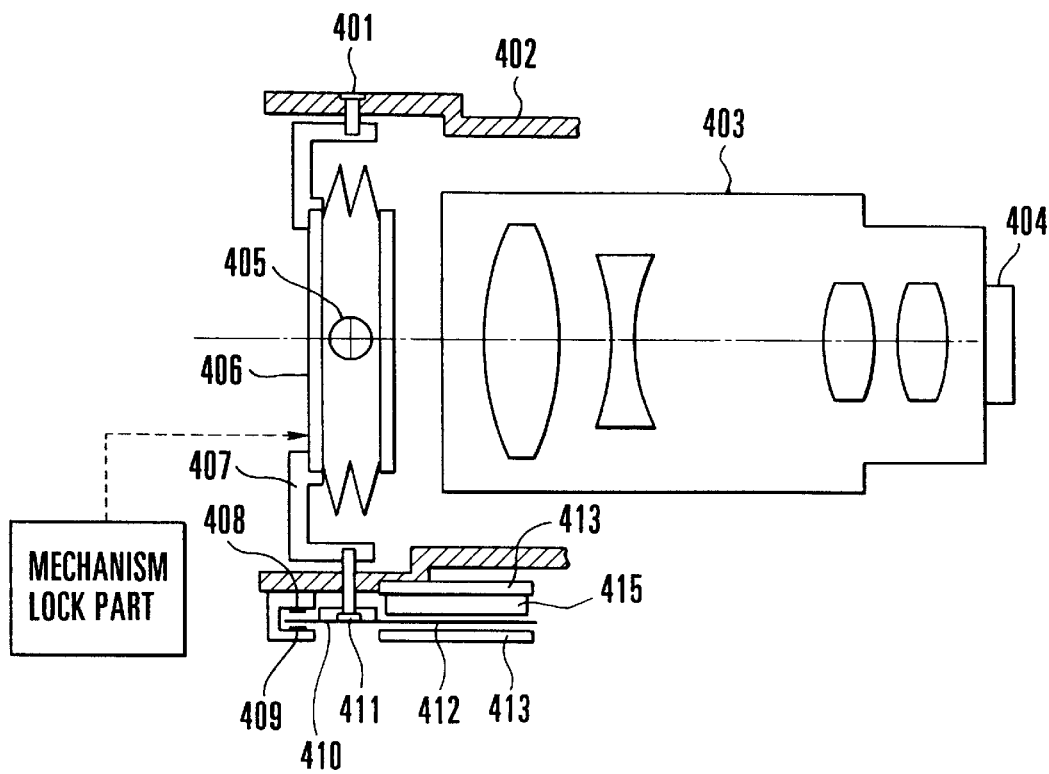
FIG. 28 is a diagram showing an example in which a VAP is employed as image-shake correcting means and a voice-coil type actuator is employed as a driving system.

In the example shown in FIG. 28, a VAP 406 is employed and a voice coil is used as a driving system, and a control system is arranged to constitute a closed loop in which an encoder detects an angular displacement and the detected angular displacement is fed back to the driving system, thereby controlling the amount of control.

Figure 32:
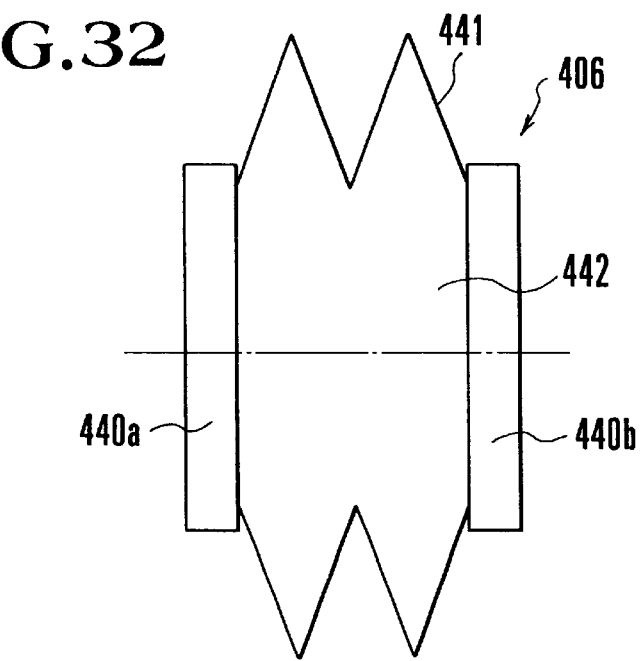
FIG. 32 is a view which serves to explain the arrangement and operation of the VAP of FIG. 28 or 30.

The VAP 406 will first be described in detail with reference to FIG. 32. As shown, the VAP 406 includes two transparent parallel plates 440a and 440b which are opposed to each other, a transparent elastic material or inactive liquid 442 having a high refractive index (n: refractive index) which is charged into the space defined between the transparent parallel plates 440a and 440b, and a sealing material 441, such as a resin film, which elastically seals the transparent parallel plates 440a and 440b around the outer circumference thereof. The transparent parallel plates 440a and 440b are swingably supported. By swinging the transparent parallel plates 440a and 440b, the optical axis is displaced to correct an image shake.

Figure 33:
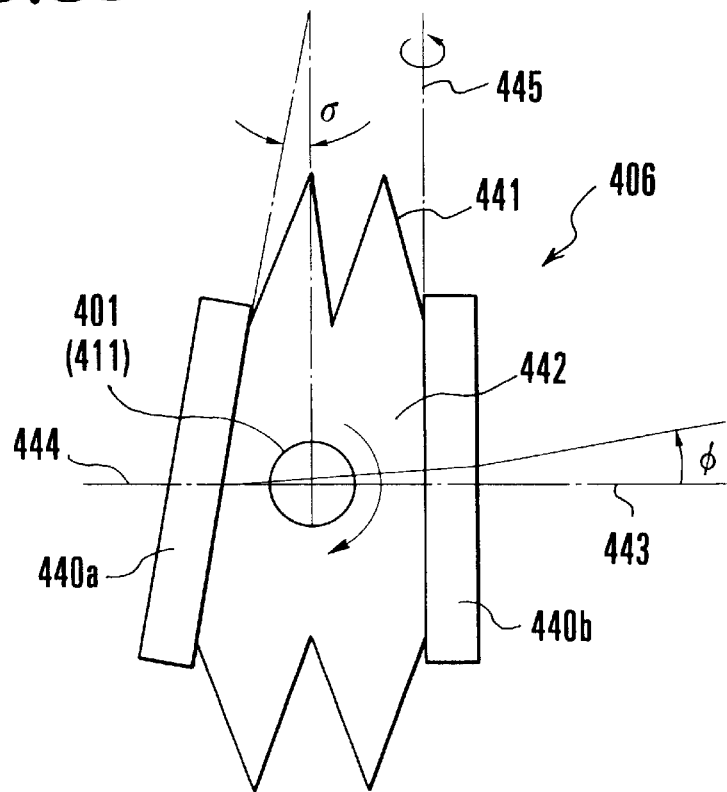
FIG. 33 is a view which serves to explain the arrangement and operation of the VAP of FIG. 28 or 30.

FIG. 33 is a view showing the state of passage of an incident light flux 444 through the VAP 406 when the transparent parallel plate 440a is turned about a swinging shaft 401 (411) by an angle σ. As shown in FIG. 33, the light flux 444 which enters the VAP 406 along an optical axis 443 is made to exit from the VAP 406 in the state of being deflected by an angle $\phi=(n-1)\sigma$ in accordance with a principle similar to the principle of a wedge-shaped prism. In other words, the optical axis 443 is made eccentric (deflected) by the angle $\phi$.

Referring back to FIG. 28, the above-described VAP 406 is fixed to a lens barrel 402 by means of a holding frame 407 in such a manner that the VAP 406 can turn about the shafts 401 and 411.

In the example shown in FIG. 28, a yoke 413, a magnet 415 and a coil 412 constitute a voice-coil type of actuator which is arranged to vary the apex angle of the VAP 406 about the shaft 401 (411) when an electric current is made to flow in the coil 412. A slit 410 is used for detection of a displacement of the VAP 406, and displaces its position while turning together with the holding frame 407, i.e., the VAP 406, coaxially to the turning shaft 411. A light emitting diode 408 is provided for detecting the position of the slit 410. A PSD (position sensing detector) 409 and the light emitting diode 408 constitute an encoder for detecting an angular displacement of the apex angle of the VAP 406 by detecting a displacement of the slit 410.

Then, the light flux 444, the angle of incidence of which has been changed by the VAP 406, is focused on an image pickup surface of an image pickup device 404.

Incidentally, in FIG. 28, reference numeral 405 denotes another turning axis perpendicular to a turning axis formed by the shafts 401 and 411 of the holding frame 407. Detailed description of the turning axis 405 is omitted herein for the sake of simplicity.

The basic arrangement and operation of a control circuit for controlling the driving of the VAP 406 will be described below with reference to the block diagram shown in FIG. 29.

Figure 29:
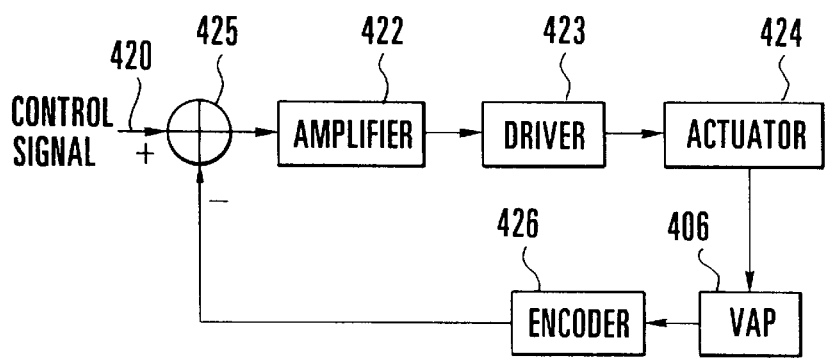
FIG. 29 is a block diagram showing a driving circuit for an image-shake correcting means using the VAP of FIG. 28.

The arrangement shown in FIG. 29 includes the VAP 406, an amplifier 422, a driver 423 for driving an actuator 424, the voice-coil type actuator 424 for driving the VAP 406, an encoder 426 for detecting a displacement of the apex angle of the VAP 406, and an adder 425 for performing an opposite-polarity addition of a control signal 420 for correction of an image shake, outputted from the microcomputer COM2, to the output signal of the angular-displacement encoder 426. The control system operates so that the control signal 420 for correction of an image shake, outputted from the microcomputer COM2, is made equivalent to the output signal of the angular-displacement encoder 426. Accordingly, since the VAP 406 is driven so that the control signal 420 and the output of the encoder 426 are made to coincide with each other, the VAP 406 is controlled to move to a position specified by the microcomputer COM2.

Figure 30:
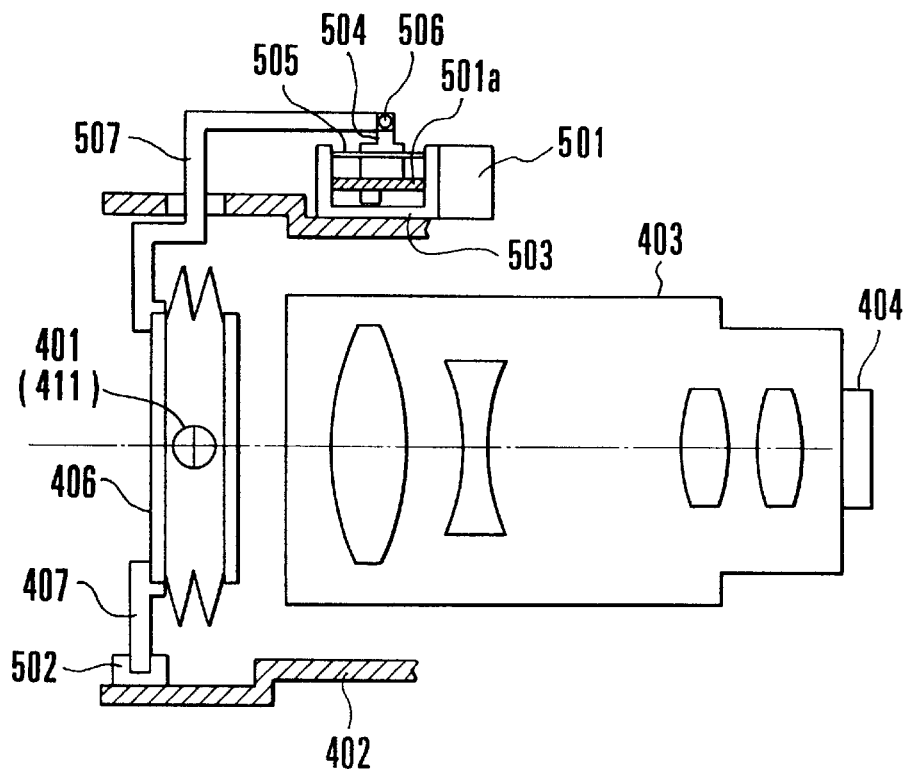
FIG. 30 is a diagram showing an example in which the VAP is employed as image-shake correcting means and a stepping motor is employed as a driving system.

FIG. 30 shows another example of the image-shake correcting means having an arrangement in which the VAP 406 is driven not by the aforesaid voice-coil type actuator 424 but by a stepping motor.

In the arrangement shown in FIG. 30, the VAP 406 is driven by a stepping motor 501 via the holding frame 407 so that it turns about the turning shaft 401 (411). More specifically, the stepping motor 501 whose rotating shaft is provided with a lead screw 501a is disposed on a supporting frame 503 mounted on the lens barrel 402. A carrier 504 is arranged to be capable of moving along the optical axis by being guided by a guide shaft 505 of the supporting frame 503. The carrier 504 is meshed with the lead screw 501a at all times and is turnably connected via a turning shaft 506 to a connecting rod 507 fixed to the supporting frame 503. When the stepping motor 501 is driven, the carrier 504 is moved along the optical axis to turn the holding frame 407 about the turning shafts 401 and 411 via the connecting rod 507, thereby driving the VAP 406. A reset sensor 502 is provided for detecting the reference position of the VAP 406. Although a similar driving mechanism is provided with respect to the turning axis 405, description thereof is omitted for the sake of simplicity.

Figure 31:
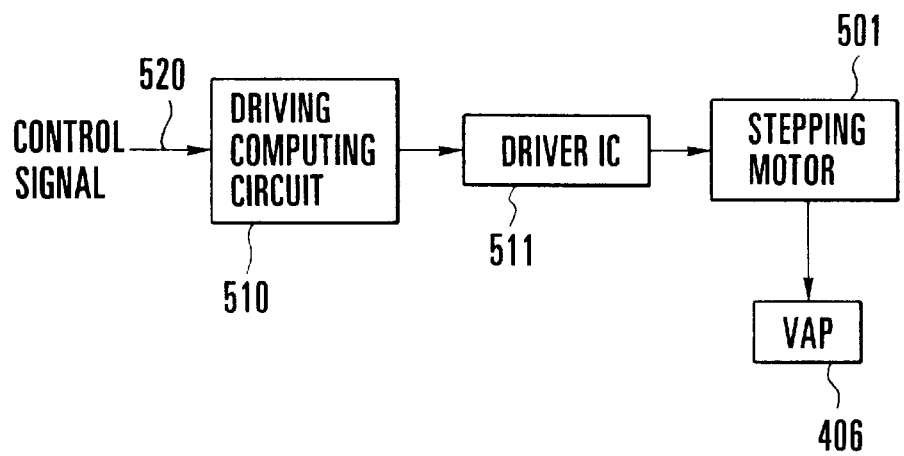
FIG. 31 is a block diagram showing a driving circuit for an image-shake correcting means using the VAP of FIG. 30.

FIG. 31 is a block diagram showing a circuit arrangement for providing driving control over the system of FIG. 30.

Referring to FIG. 31, a control signal 520 outputted from the microcomputer COM2 is converted into a driving signal for driving the VAP 406 by a driving computation performed by a driving computing circuit 510. The driving signal is outputted to a driver IC 511. The driver IC 511 drives the stepping motor 501 in response to the driving signal, so that the apex angle of the VAP 406 is varied.

Figure 34:
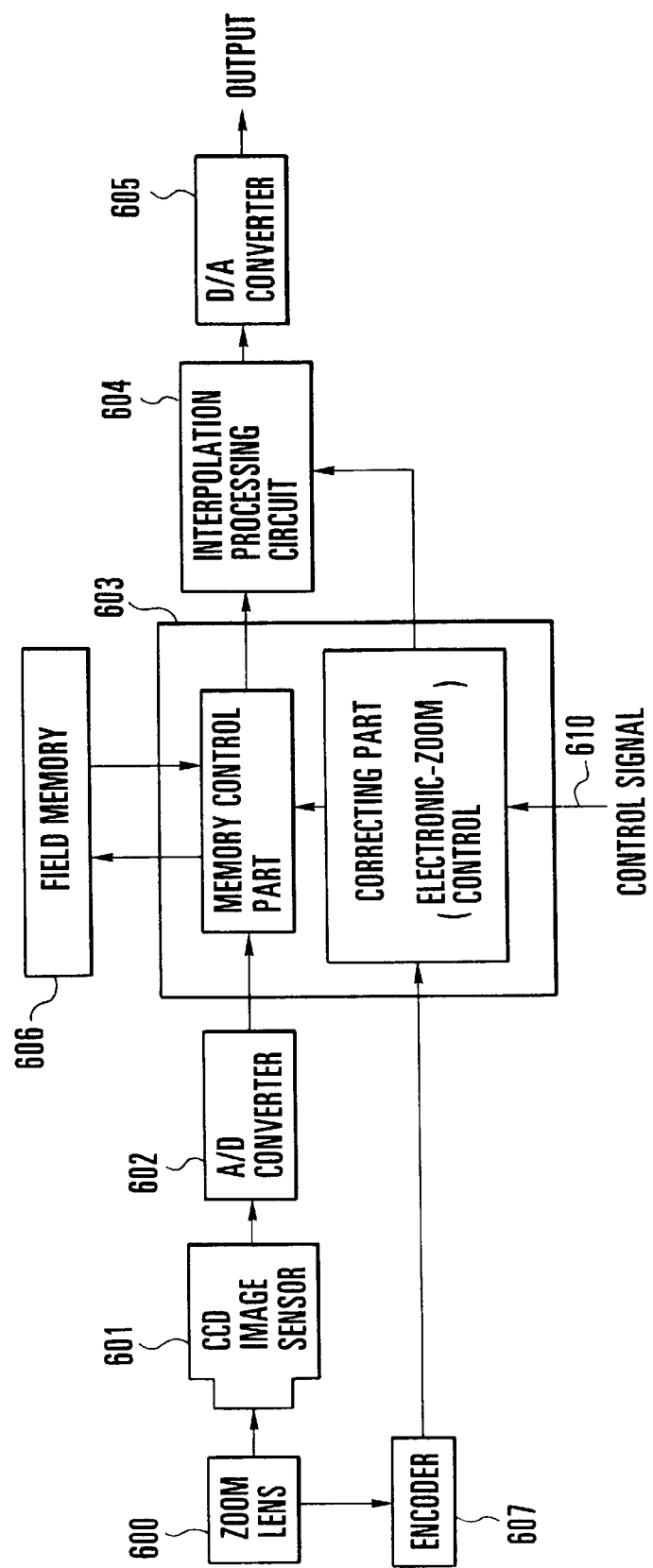
FIG. 34 is a block diagram showing an example in which a memory control system for electronically performing image-shake correction is employed as image-shake correcting means.

FIG. 34 shows a further example of the image-shake correcting means. The image-shake correcting means shown in FIG. 34 includes a memory control system which is arranged in the following manner. When image information is stored in a memory, the area of an image to be cut out from the entire image represented by the image information stored in the memory is selected so that the size of the area is made smaller than the entire size of the stored image, and the position (area) of the image to be cut out is shifted within the memory in the direction in which a movement of the image is cancelled, thereby correcting an image shake. An image signal representative of the cut-out image is subjected to enlargement processing for correcting the picture size of the cut-out image, and the image whose image shake is corrected is outputted. The feature of the above-described memory control system is that an image shake can be electronically corrected without the use of an optical correcting mechanism such as a VAP.

The example shown in FIG. 34 includes a zoom lens 600, an image pickup device (such as a CCD image sensor) 601 for converting an optical image into an electrical signal, an A/D converter 602, and an image processing circuit 603. The image processing circuit 603 performs the image-shake correcting processing of reducing the image shake component of an image pickup signal in accordance with a control signal (an image-shake correction signal) 610 inputted from the microcomputer COM2. The image processing circuit 603 further performs the enlargement processing of enlarging an image read from the field memory 606, thereby performing so-called electronic zoom to convert the size of the read image into a normal picture size. The image processing circuit 603 may be realized by a microcomputer.

An interpolation processing circuit 604 is provided for producing one pixel signal for interpolation purpose from image information about two or more adjacent pixels on the basis of zoom information when electronic zoom is to be executed for correcting the image read from the field memory 606 so that the angle of view of thereof coincides with the normal angle of view. A well-known interpolation method may be employed; for example, it is possible to interpolate between adjacent pixels on the basis of the average value of the adjacent pixels. The example shown in FIG. 34 also includes a D/A converter 605 and an encoder 607 for detecting the zoom ratio of the zoom lens 600.

The operation of the shown example will be described below. An optical image formed by the zoom lens 600 is converted into an electrical signal by the image pickup device 601, and the electrical signal is outputted from the image pickup device 601 as an image pickup signal. The image pickup signal is converted into a digital image signal by the A/D converter 602, and the digital image signal is written into the field memory 606 as image information for one field by a memory control part of the image processing circuit 603. At this time, the position of an image to be cut out from the image signal stored in the field memory 606, i.e., an image area to be read from the field memory 606 and the position of the image area within the field memory 606, are determined on the basis of the image-shake correction signal 610 inputted from the microcomputer COM2 and the zoom information inputted from the encoder 607.

Then, the image signal read from the field memory 606 is supplied to the interpolation processing circuit 604. To convert the scanning width, i.e., the angle of view, of an output image into an original size in accordance with the cut-out size of the image, the interpolation processing circuit 604 calculates how many pixels are to be outputted during the interval that one normal pixel is outputted, and performs interpolation processing on pixels having no information. The signal outputted from the interpolation processing circuit 604 is converted into an analog signal by the D/A converter 605, and the analog signal is outputted from the D/A converter 605.

The examples of the image-shake correcting means for correcting an image shake are as described above.

Figure 23:
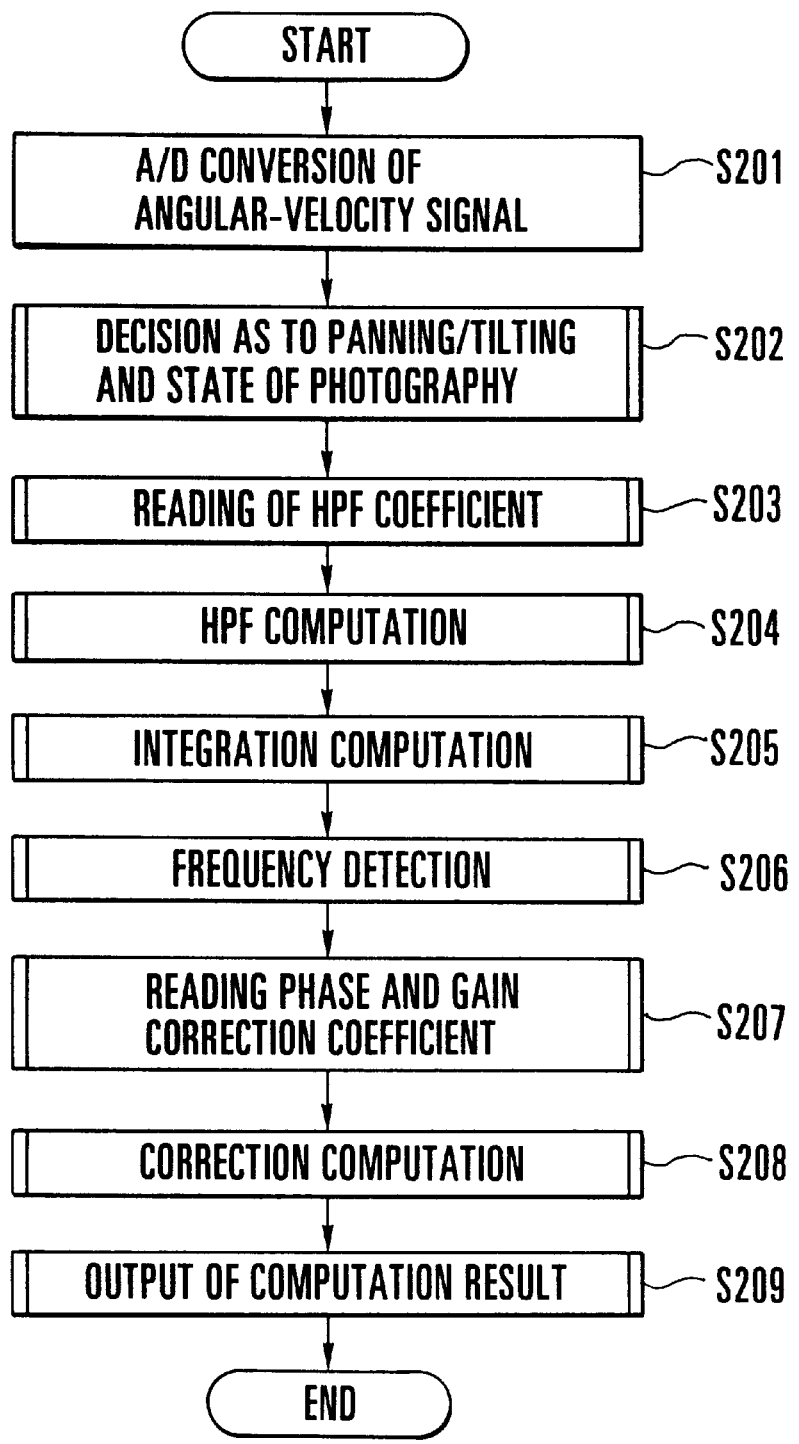
FIG. 23 is a flowchart which serves to explain a control operation executed in the eighth embodiment.

The processing operation of the microcomputer COM2 used in the embodiment shown in FIG. 22 will be described below with reference to the flowchart of FIG. 23. Referring to FIG. 23, when control is started, the process proceeds to Step S201, in which an angular-velocity signal supplied from the angular-velocity detector 301 is converted into a digital signal by the A/D converter 304, the direct-current component of the angular-velocity signal being eliminated by the DC cut filter 302 and the angular-velocity signal being amplified to a predetermined level by the amplifier 303. The digital signal is inputted into the microcomputer COM2.

In Step S202, a predetermined high-frequency component extracted from the angular-velocity signal by the HPF 310 is integrated by the integrator 305 to prepare an angular-displacement signal, and a decision is made as to panning and tilting as well as the state of photography on the basis of the angular-velocity signal.

In Step S203, in accordance with the result of the decision, a coefficient for setting the characteristic of the HPF 310 in the previously-described manner is read from a table (not shown) which is prepared in the microcomputer COM2. More specifically, if the HPF 310 is formed by a digital filter, it is possible to vary the characteristic of the HPF 310 as required, by reading a predetermined coefficient from the table on which coefficients are stored and setting the predetermined coefficient in the HPF 310. The coefficients corresponding to panning and tilting as well as the state of photography are values obtained from experience.

In Step S204, the characteristic of the HPF 310 is set by performing a computation on the basis of the coefficient. In Step S205, the signal outputted from the HPF 310 is converted into an angular-displacement signal (vibration signal) by an integration computation performed by the integrator 305.

In Step S206, the frequency detecting means 313 performs a computation on the angular-velocity signal outputted from the A/D converter 304, thereby detecting the center frequency of the detected vibration. In Step S207, a correction coefficient for the phase and gain correcting circuit 311 according to the center frequency of the vibration obtained in Step S206 is read from the table (not shown) which is prepared in the microcomputer COM2.

The phase and gain correcting circuit 311 serves to compensate for degradation of an image-shake correction characteristic due to a phase delay of the image-shake correcting system. The phase and gain correcting circuit 311 includes a phase advancing element and is formed by a digital filter as will be described later, and reads a correction coefficient for the digital filter from the table and sets phase and gain correction characteristics corresponding to the frequency of the vibration.

In Step S208, a correction computation is performed by using the coefficient obtained in Step S207. In Step S209, the result of the correction computation, i.e., a corrected angular-velocity signal, is converted into an analog signal by the D/A converter 307 or into a pulse signal such as a PWM signal, and the analog signal or the pulse signal is outputted from the microcomputer COM2.

Since a digital filter or the like is used for each of the HPF 310, the integrator 305 and the phase and gain correcting circuit 311, it is necessary to employ a comparatively high sampling frequency (for example, approximately 1 kHz). In contrast, the panning/tilting decision circuit 312 for making a decision as to panning and tilting as well as the state of photography and the frequency detecting means 313 only needs to perform processing of comparatively low sampling frequency (for example, approximately 100 Hz). In other words, it is possible to alter the sampling frequency in accordance with the status of photography.

The frequency detecting means 313 using the angular-velocity signal of FIG. 22 is arranged, for example, in the following manner. A threshold is set at or near the center of the angular-velocity signal, so that detection can be performed on the basis of either the time during which the angular-velocity signal crosses the center or the number of times by which the angular-velocity signal crosses the center. However, this method depends on the stability of a direct-current signal. In other words, if a user performs photography while holding a camera by the hand or the like, a low-frequency component is contained in a vibration frequency to a great extent, so that it is difficult to accurately detect a vibration frequency.

Accordingly, in the eighth embodiment, detection of a vibration frequency is performed on the basis of an increase and a decrease in an angular-velocity signal per sampling period. In other words, one pair of an increase and a decrease in an angular-velocity signal is regarded as one vibration, and a vibration frequency is found on the basis of the number of pairs detected in a predetermined time. This method makes it possible to detect a vibration of 1 Hz for one second and a vibration of 0.5 Hz for two seconds.

Figure 24:
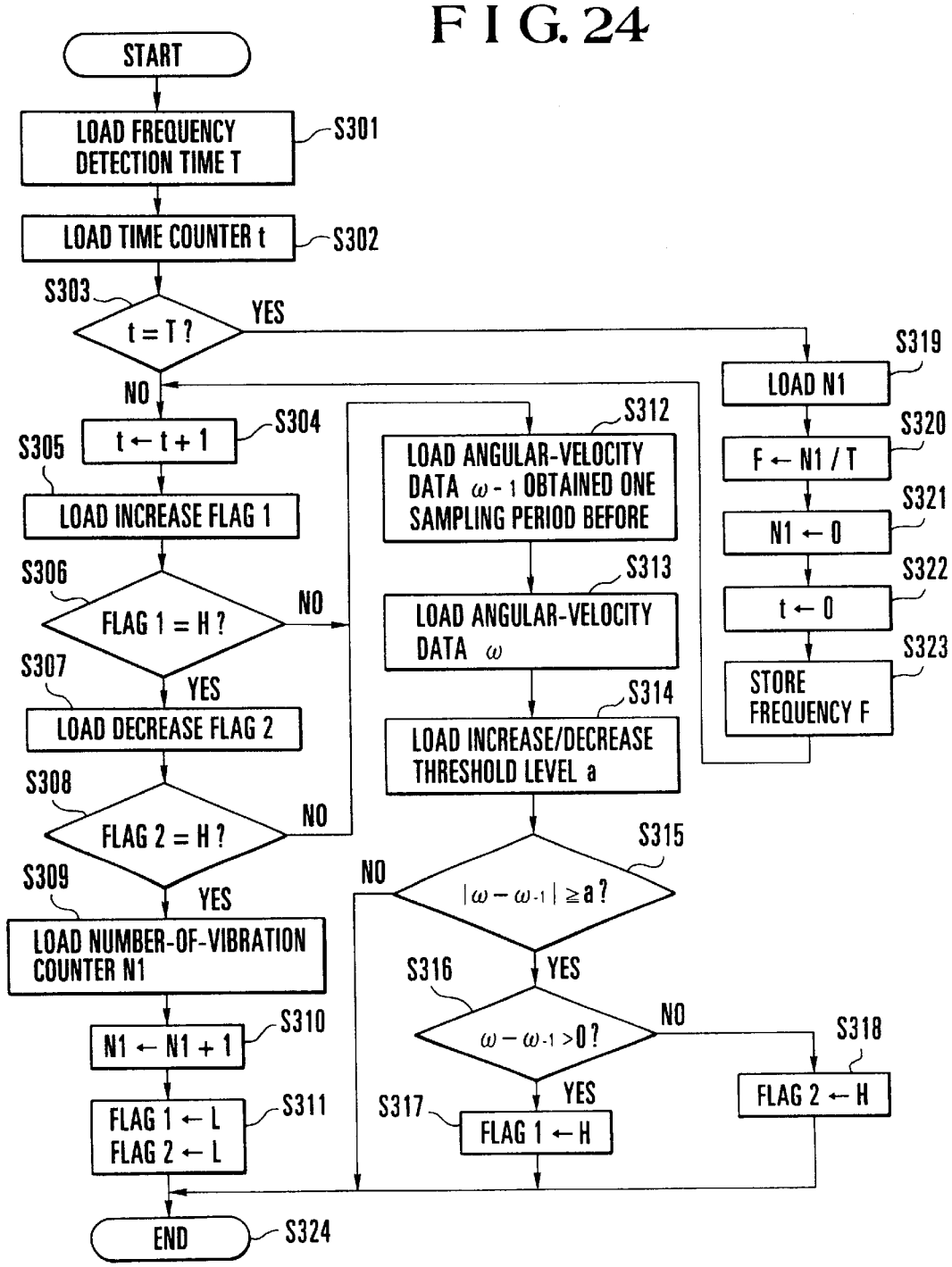
FIG. 24 is a flowchart which serves to explain a vibration frequency detecting operation executed in the eighth embodiment.

One example of the method and operation executed by the frequency detecting means 313 according to the eighth embodiment will be described below with reference to the flowchart of FIG. 24. Processing which will be described below is performed once for each predetermined time.

In Step S301, reading (loading) of a frequency detection time T is performed. In Step S302, reading (loading) of a time counter t is performed, i.e., a counting operation of the time counter t is started. In Step S302, a comparison is made between the frequency detection time T and the count value of the time counter t, and it is determined whether the count value of the timer counter t has reached the predetermined time (frequency detection time) T. If the count value of the time counter t reaches the predetermined time T, the process proceeds to Step S319. If the count value of the time counter t has not yet reached the predetermined time T, the process proceeds to Step S304.

In Step S304, "1" is added to the count value of the time counter t. Accordingly, this upward counting of "1" coincides with the processing time required for the processing shown in the flowchart of FIG. 24 to be executed once.

In Step S305, an increase flag 1 is loaded which indicates whether an increase in the angular-velocity signal has previously occurred. If the increase has previously occurred, this increase flag 1 is set to its H level. If no increase has increased in the past, the increase flag 1 is set to its L level.

In Step S306, it is determined whether an increase in the angular-velocity signal has previously occurred, on the basis of the flag 1. If the flag 1 is at the H level, it is determined that an increase has occurred in the past, and the process proceeds to Step S307. If the flag 1 is at the L level, it is determined that an increase has not occurred in the past, the process proceeds to Step S312.

If it is determined in Step S306 that an increase in the angular-velocity signal has previously occurred, a decrease flag 2 which indicates whether a decrease has previously occurred is loaded in Step S307. If it is determined that a decrease has previously occurred, the decrease flag 2 is set to its H level, while if it is determined that no decrease has previously occurred, the decrease flag 2 is set to its L level.

In Step S308, it is determined on the basis of the decrease flag 2 whether a decrease has previously occurred. If the decrease flag 2 is at the H level, i.e., if it is determined that a decrease has previously occurred, the process proceeds to Step S309. If the decrease flag 2 is at the L level, i.e., if it is determined that no decrease has occurred in the past, the process proceeds to Step S312.

In Step S309, a number-of-vibration counter N1 for counting the number of vibrations is loaded. In Step S310, "1" is added to the count value of the number-of-vibration counter N1, and the process proceeds to Step S311. In Step S311, the increase flag 1 and the decrease flag 2 are reset, and the process proceeds to Step S324, in which the process is brought to an end.

If it is determined in Step S306 that the increase flag 1 is not at the H level and if it is determined in Step S308 that the decrease flag 2 is not at the H level, i.e., if neither an increase nor a decrease has occurred in the past, the process proceeds to Step S312, in which angular-velocity data ω−1 obtained one sampling period before (during the previous processing) is loaded. The process proceeds to Step S313, in which the current angular-velocity data ω detected by the angular-velocity detector 301 is loaded.

In Step S314, loading is performed of a threshold level "a" on the basis of which it is determined whether an increase or a decrease has occurred in angular-velocity data within one sampling period. It is possible to set a value corresponding to the frequency and amplitude of a vibration on the basis of the threshold level "a" and the sampling period.

In Step S315, the absolute value of the amount of variation of the angular-velocity data within one sampling period is compared with the threshold level "a". If it is determined that the absolute value has not reached the threshold level "a", the process proceeds to Step S324, in which the process is brought to an end. If it is determined that the absolute value has reached the threshold level "a" (if the absolute value of the amount of variation is not less than the threshold level "a"), the process proceeds to Step S316, in which it is determined whether the amount of variation of the angular velocity is positive (an increase) or negative (a decrease). If it is positive, the process proceeds to Step S317, in which the increase flag 1 is set to the H level. If it is not positive (if a decrease occurs in the amount of variation of the angular velocity), the process proceeds to Step S318, in which the decrease flag 2 is set to the H level. Then, the process proceeds to Step S324.

If it is determined in Step S303 that the count value of the time counter t has reached the frequency detection time T, the process proceeds to Step S319, in which the number-of-vibration counter N1 is loaded. In Step S320, the number of vibrations, "N1", is divided by the frequency detection time T to obtain the number of vibrations (a vibration frequency F) per unit time (1 second).

In Step S321, the number-of-vibration counter N1 is cleared. In Step S322, the time counter t is cleared. In Step S323, the vibration frequency F is stored in a predetermined storage area, and the process proceeds to Step S304. The subsequent operations are as described previously.

As described above, since one pair of an increase and a decrease in the angular-velocity signal is regarded as one vibration, it is possible to easily realize detection of a vibration frequency from which a vibration component of low frequency (for example, 1 Hz or below) is eliminated. Further, by setting the threshold level "a", it is possible to eliminate the influence of a noise component. In addition, the above-described processing is easily realized because a microcomputer is employed.

It is to be noted that in the above-described system, it is possible to vary the accuracy of detection by altering the setting of the frequency detection time T. For example, if the frequency detection time T is set to 1 second, a resolution of 1 Hz is selected, and, in the case of 2 seconds, a resolution of 0.5 Hz is selected.

Accordingly, it is possible to realize the accuracy of detection corresponding to a detected frequency by altering the frequency detection time T in accordance with the detected vibration frequency F. For example, if the detected vibration frequency F is 10 Hz or below, the frequency detection time T is set to T=2 seconds so that detection is performed with an accuracy of 0.5 Hz. If the detected vibration frequency F is 10 Hz or above, the frequency detection time T is set to T=1 second so that detection is performed with an accuracy of 1 Hz. In this manner, it is possible to reduce the time required to detect a vibration frequency.

In this system, even if a low-frequency vibration and a high-frequency vibration occur at the same time, it is possible to take out the high-frequency vibration.

The range of vibration frequencies which can be corrected by the above-described image-shake correcting device is normally on the order of 1 Hz to 15 Hz in the case of a camera shake which is caused by a hand of a user during photography. It has also been discovered that the frequencies of a vibration of comparatively large amplitude are distributed within a comparatively narrow frequency range (frequency range) according to the degree of skill of a photographer and the state of photography. For example, if the photographer performs photography in a still state, a vibration of approximately 3 Hz to 5 Hz exhibits a large amplitude, while if the photographer performs photography in a running vehicle, a vibration of approximately 6 Hz to 10 Hz exhibits a large amplitude. In the case of photography using a tripod, a vibration of high frequency tends to distinctly appear and the components of the vibration are distributed up to 20 Hz to 30 Hz or more.

The above-described embodiment has the following advantages. One advantage is that since the center frequency of a vibration is detected, it is possible to provide one item which is useful in making a decision as to the state of photography.

Another advantage is that it is possible to achieve optimum correction according to the degree of skill of a photographer, the state of photography or the like by combining the above-described embodiment with the previously-described phase and gain correcting means.

It is assumed here that the state in which an image shake is substantially corrected means that a residual vibration component is suppressed to −30 dB or below. This assumption is based on the fact that since the focal length of a photographic apparatus greatly influences an image-shake correction effect, for example, if the focal length doubles, it is impossible to achieve an equivalent effect in the obtained image if the vibration suppression effect is not doubled.

However, even with a total image-shake suppressing effect realized by the system including a vibration sensor for detecting a vibration and an image-shake correcting system, at the present, the amount of a residual vibration remaining after an image shake has been corrected can only be suppressed to −30 dB within a narrow frequency range compared to the frequency range of a vibration to be corrected (for example, 1 Hz to 15 Hz).

As a specific example, it is assumed that the frequency characteristics obtained by the image-shake correcting means shown in FIG. 28 and the existing angular-velocity sensor are as shown in FIGS. 25(a) and 25(b).

FIGS. 25(a) and 25(b) show the frequency characteristics of the image-shake correcting system relative to an input of a vibration of sinusoidal waveform which is applied to the vibration sensor 1 which constitutes the angular-velocity detecting means of FIG. 22. FIG. 25(a) shows a gain characteristic, and FIG. 25(b) shows a phase characteristic. The vertical axes of FIGS. 25(a) and 25(b) represent "gain" and "phase", respectively, and the horizontal axes of FIGS. 25(a) and 25(b) represent "frequency" (1 Hz to 50 Hz).

In each of FIGS. 25(a) and 25(b), a characteristic 1 represents the gain or phase characteristic of frequency range 1 Hz to 50 Hz. Referring to the characteristic 1 in the phase characteristic chart of FIG. 25(b), the phase of the characteristic 1 coincides with the phase of a vibration at 3 Hz. As the frequency is lower, the advance of the phase of the characteristic 1 increases by the influence of the HPF 310 (cut-off frequency: 0.06 Hz) or the integrator 305 (cut-off frequency: 0.07 Hz). As the frequency is higher, the delay of the phase of the characteristic 1 increases by the influence of the angular-velocity detecting means 301 and the image correcting means 309. The gain is approximately constant in the frequency range 1 Hz to 10 Hz.

Figure 27:
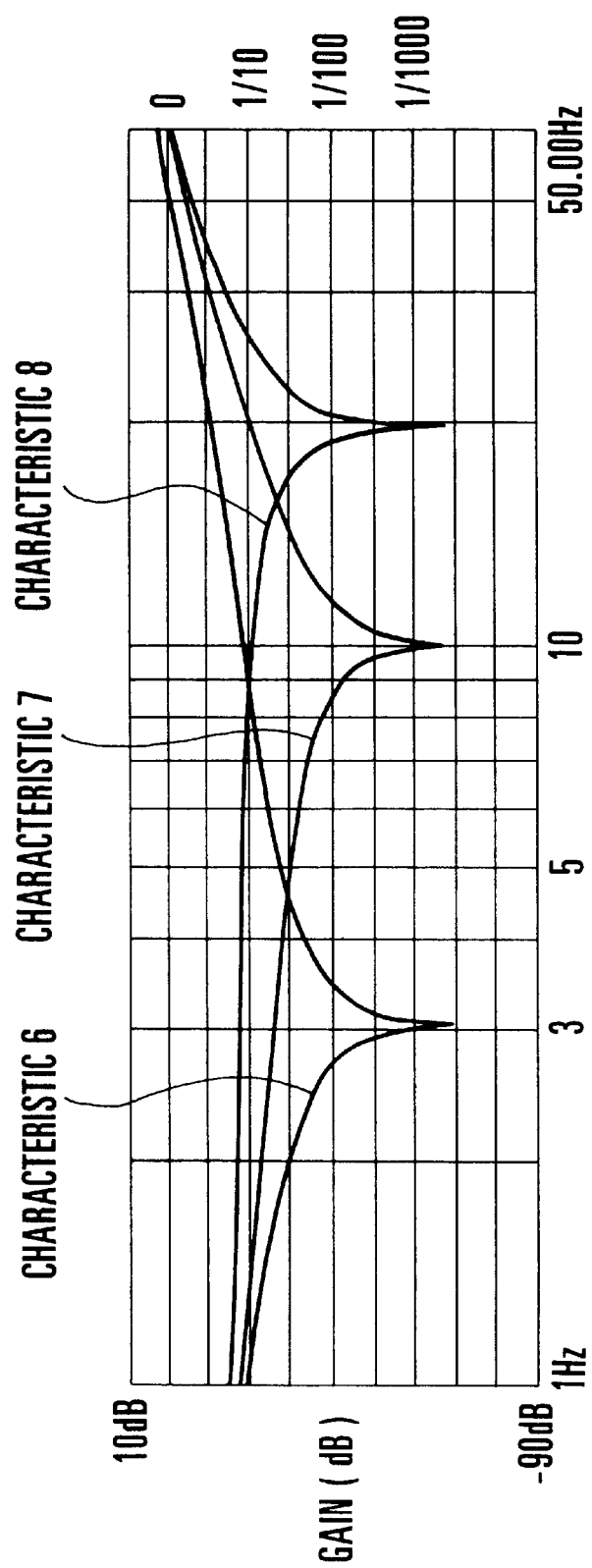
FIG. 27 is a frequency characteristic chart showing the vibration suppression characteristic of the image-shake correcting device according to the present invention.

The vibration suppression effect obtained on the basis of the characteristics 1 is shown in FIG. 27 as a characteristic 6. FIG. 27 shows the effect of correction (vertical axis, dB) relative to a frequency (horizontal axis). As can be seen from FIG. 27, it is possible to achieve the best correction at 3 Hz at which the phases coincide with each other, and a vibration suppression effect of −30 dB is approximately achieved at 2 Hz to 4 Hz. However, the vibration suppression effect obtained at 10 Hz is only −18 dB.

In other words, the vibration suppression effect is lowered by such phase deviation.

If a characteristic having a phase advancing element represented by the following transfer function is connected in series to correct the phase delay of the characteristic 1, it is possible to correct the phase by using a predetermined frequency:

$$H(S)=a(S+z) \quad (1)$$

In this method, the phase is made to advance by using the predetermined frequency which is set to a frequency higher than the frequency range of a vibration to be suppressed. This is performed by the phase and gain correcting circuit 311.

For example, referring to the characteristic 1, a phase delay of approximately 7.5 degrees occurs at 10 Hz of the characteristic 1. Accordingly, if a phase is advanced by 7.5 degrees at 10 Hz, it is possible to correct the phase delay so that a satisfactory, vibration suppression effect can be obtained.

The characteristic 2 shown in FIG. 25(b) is obtained by correcting the phase delay at 10 Hz of the characteristic 1 (by making the phases coincident and making the gains coincident). This phase correction can be set from z(=0) in the equation (1).

Also, the threshold level "a" is adjusted so that the gain becomes 0 dB at 10 Hz. If this adjustment is effected by the phase and gain correcting circuit 311, the characteristic 1 can be altered into a characteristic 5, whereby a characteristic 7 having a vibration suppression effect can be obtained. It will be understood from the characteristic 7 that the best correction effect can be obtained at or near 10 Hz. Incidentally, the characteristic 7 represents a residual vibration component expressed by:

$$20 \text{ Log}(OUT/IN)) \quad (2)$$

OUT: residual vibration component after vibration correction

IN: amount of vibration

In the case of 20 Hz as well, it is possible to obtain the characteristic 5 from the characteristic 1 by realizing the characteristic 4 by the phase and gain correcting circuit 311. A characteristic 8 represents a vibration suppression effect realized by the characteristic 5, and the best vibration suppression effect is obtained at or near 20 Hz.

It is to be noted that if a digital filter is employed to realize the characteristic of the equation (1) in the phase and gain correcting circuit 311, it is possible to set a desired characteristic by altering a coefficient of the digital filter (refer to FIG. 22). Accordingly, the digital filter is suitable for control using a microcomputer. If a primary IIR filter is employed as the digital filter, the digital filter can be realized by the following computations:

$u_0 = a_0 \cdot w_0 + a_1 \cdot w_1$ $w_0 = e_0 + a_2 \cdot w_1$ $w_{1=w0}$ ($w_1$: state variable)

$e_0$: input $u_0$: output $a_0$, $a_1$, $a_2$: filter coefficient

By altering the value of each of the filter coefficients $a_0$, $a_1$ and $a_2$, it is possible to set a desired frequency characteristic. Accordingly, data indicative of the filter coefficients $a_0$, $a_1$ and $a_2$ corresponding to different vibration frequencies are prepared as a table, and a computation on the aforesaid IIR filter is performed by using a filter coefficient obtained from the table.

According to the above-described eighth embodiment, the center frequency of a vibration is detected by the frequency detecting means 313 on the basis of an angular-velocity signal outputted from the angular-velocity detecting means 311, and the filter characteristic of each digital filter of the phase and gain correcting circuit 311 can be varied so that a control system can be subjected to phase advancing compensation which makes the phase and the gain of the entire control system 0 degrees and 0 dB, respectively, at the center frequency of the vibration, i.e., which can realize the best vibration suppression characteristic. Accordingly, it is possible to achieve the best vibration suppression effect at any vibration frequency at any time.

It is only necessary to read and set the filter coefficients stored on the data table in the microcomputer so that the characteristic of each of the digital filters which constitute the phase and gain correcting circuit 311 can exhibit a frequency characteristic corresponding to each vibration frequency. Accordingly, it is possible to provide image-shake correcting device whose arrangement and control are simplified and which is particularly suitable for control using a microcomputer.

If a photographer performs photography while holding, for example, a video movie camera by the hand, a camera shake is distributed in a comparatively wide frequency range. However, a vibration of comparatively large amplitude is distributed in a comparatively narrow frequency range in accordance with the degree of skill of the photographer and the state of the photography. Accordingly, if it is possible to provide an arrangement capable of achieving the best correction effect in the center frequency range of such a vibration, it is possible to effect optimum correction corresponding to the degree of skill of the photographer and the state of the photography (whether the photography is being performed with the camera held by the hand, whether the photography is being performed with the camera mounted on a tripod, whether the photography is being performed in a running vehicle, and so on).

(Ninth Embodiment)

Figure 35:
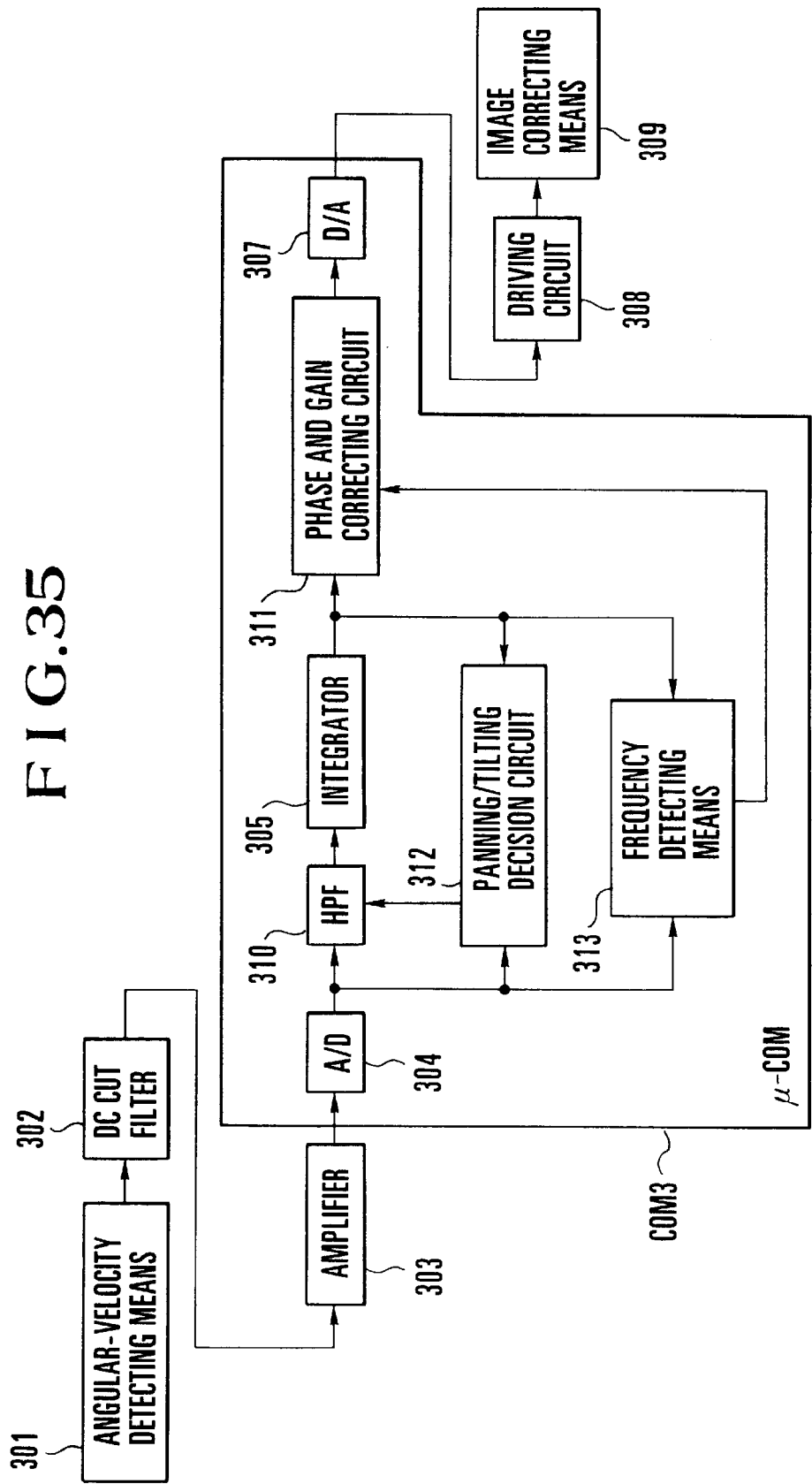
FIG. 35 is a block diagram showing the arrangement of a ninth embodiment of the image-shake correcting device according to the present invention.

A ninth embodiment of the present invention will be described below with reference to FIG. 35. The circuit arrangement of an image-shake correcting device according to the ninth embodiment differs from that shown in FIG. 22 in respect of the internal processing executed by a microcomputer. Specifically, the output signal of the integrator 305 of the microcomputer COM3 shown in FIG. 35 is inputted into the frequency detecting means 313 and the input is used for computation purpose. The arrangement of the other constituent elements (inside and outside of the microcomputer COM3) is similar to that shown in FIG. 22, and description thereof is omitted.

In general, in the case of an angular-velocity signal of low frequency, the level of gain lowers and hence the sensitivity and accuracy of detection decrease. For this reason, according to the ninth embodiment, the capability to detect a vibration in a low-frequency range is improved by utilizing the integral output of the integrator 305, i.e., an angular-displacement signal. The ninth embodiment adopts a method identical to the above-described frequency detection method using the angular-velocity signal according to the eighth embodiment, and frequency detection is performed by using the angular-displacement signal outputted from the integrator 305.

If the angular-velocity signal is used in the system according to the eighth embodiment, the detection capability in the low-frequency range may be limited in relation to the dynamic range of an input signal. For this reason, in the ninth embodiment, the frequency detection using the angular-displacement signal is performed to improve the detection capability in the low-frequency range.

In general, in the case of an angular-velocity signal having a constant amplitude, as its frequency becomes higher, the magnitude of the angular-velocity signal increases. However, the level of gain does not increase beyond a certain limited value in relation to the arrangement of the system. As a result, it is impossible to obtain a signal of sufficient magnitude in the low-frequency range, so that the detection capability is limited.

In contrast, since the angular-displacement signal is an integral signal, as long as the amplitude of a vibration is constant, the amplitude of the angular-displacement signal is naturally constant irrespective of the frequency of the vibration. Accordingly, the angular-displacement signal is suitable for the detection of the frequency of a vibration of comparatively low frequency. However, as the frequency of a vibration becomes higher, the amplitude of the vibration becomes smaller, so that it is difficult to detect the vibration in a high-frequency range.

In the ninth embodiment, to detect a vibration, the superior portions of the detection characteristics of the respective angular-velocity and angular-displacement signals are employed on the basis of the above-described characteristics of both signals. Accordingly, it is possible to improve the accuracy of detection over the entire frequency range of from the low-frequency range to the high-frequency range.

In the arrangement according to the ninth embodiment, it is preferable that the angular-displacement signal outputted from the integrator 305 be exclusively used for detection of a vibration in the low-frequency range, and that the sampling period of the angular-displacement signal be delayed with respect to the sampling period of the angular-velocity signal.

Finally, the larger one is selected between both detected vibrations.

(Tenth Embodiment)

Figure 36:
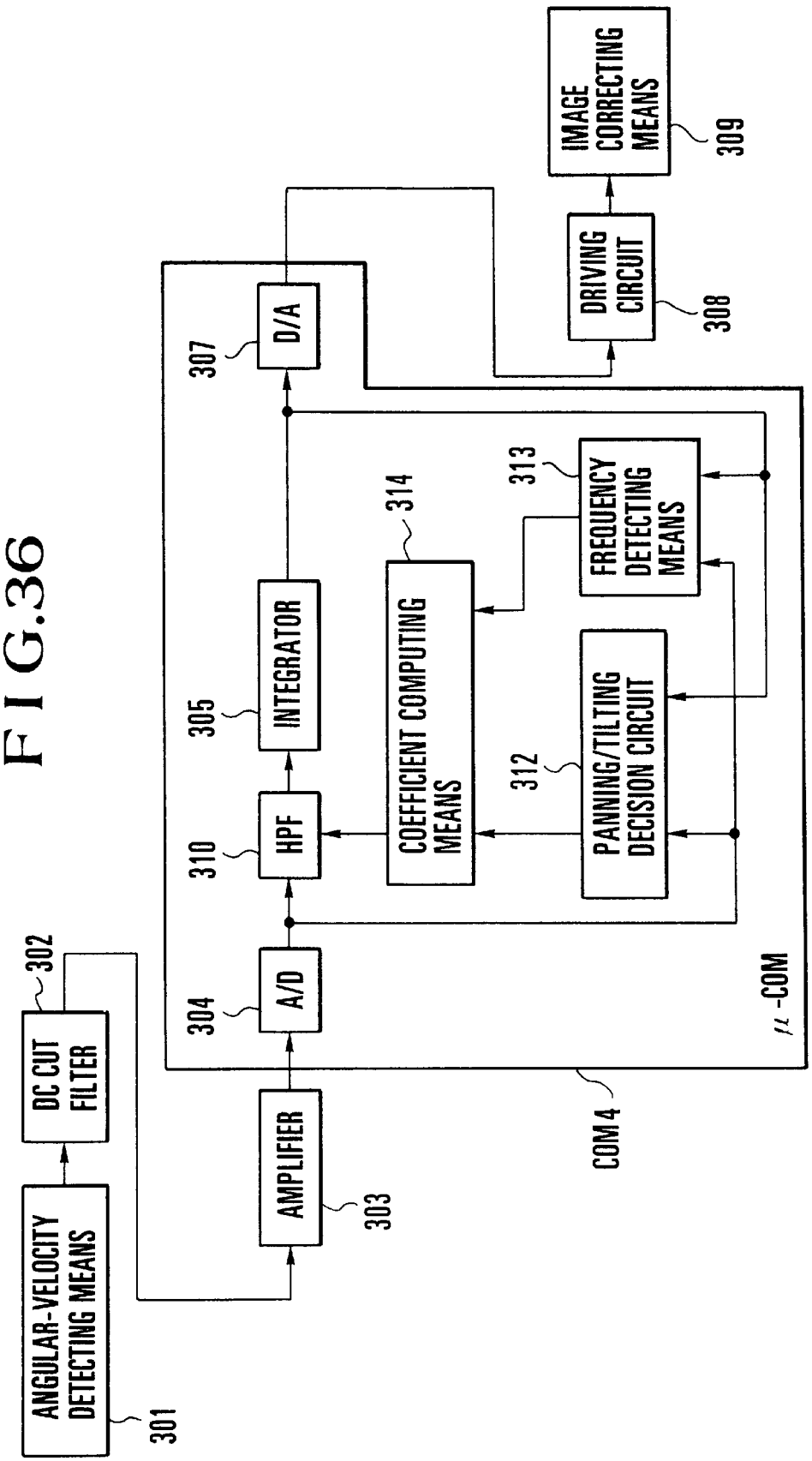
FIG. 36 is a block diagram showing the arrangement of a tenth embodiment of the image-shake correcting device according to the present invention.

FIG. 36 shows a tenth embodiment of the present invention. The tenth embodiment is arranged in such a manner that the HPF 310 serves as panning processing means and the phase and gain correcting circuit 311 shown in FIG. 35. The tenth embodiment has the following features: it is not necessary to independently provide the phase and gain correcting circuit 311; and since the frequency of a vibration lower than the center frequency thereof is cut off, operability is improved (the lower the vibration suppression capability of the image-shake correcting device in a low-frequency range, the higher the tracking capability of the image-shake correcting device with respect to a vibration of a camera or the like, so that the higher the cut-off frequency, the higher the operability). In other words, a vibration is subjected to sufficient image-shake correction at its center frequency, and if the center frequency of the vibration is high, the cut-off frequency of low frequency which is used by the HPF is made higher, whereby the operability is improved.

The processing operation of a microcomputer COM4 used in the tenth embodiment will be described below with reference to the flowchart of FIG. 37.

Figure 37:
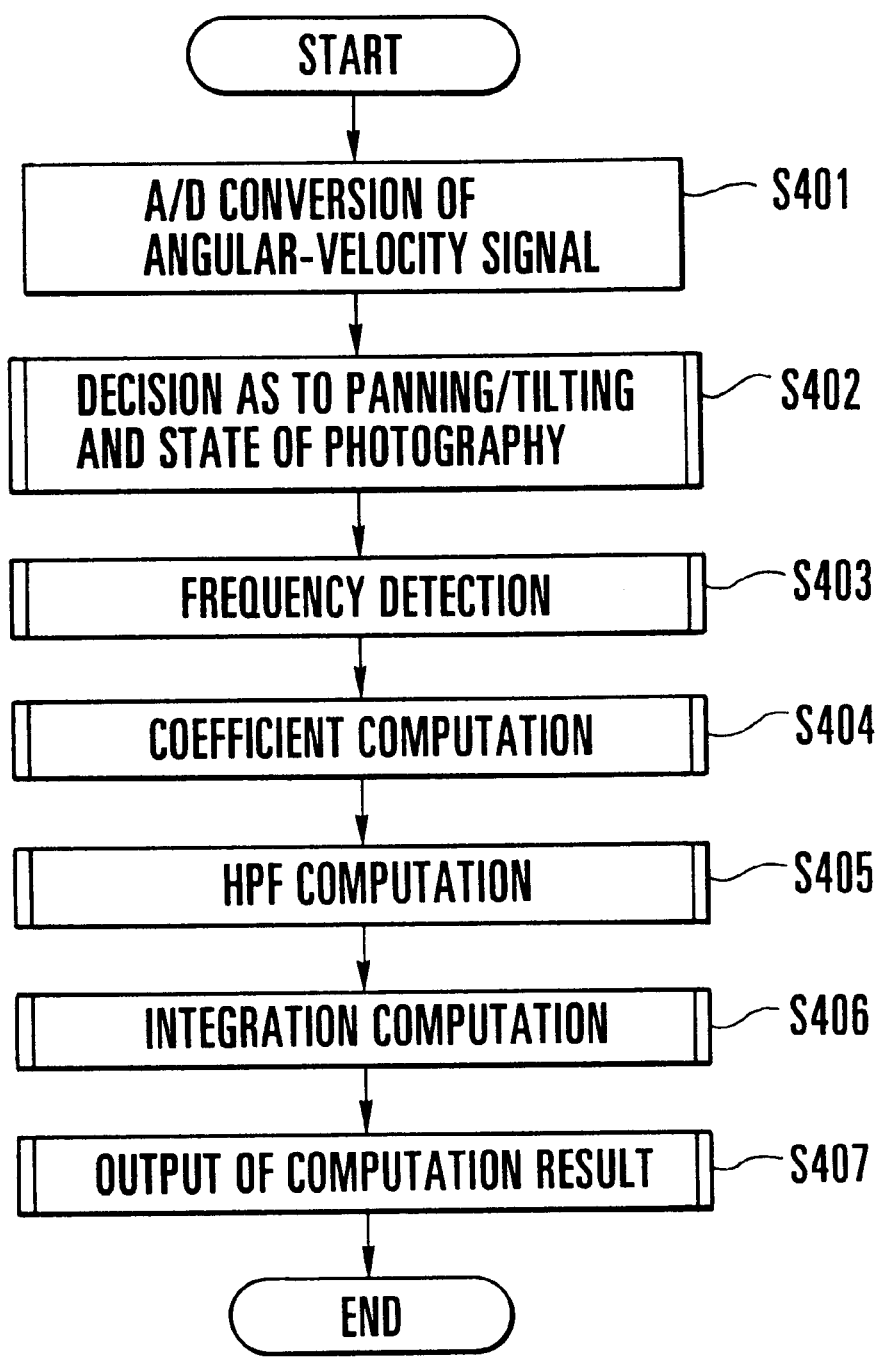
FIG. 37 is a flowchart which serves to explain the operation of the tenth embodiment of the present invention.

Referring to FIG. 37, when the process is started, the process proceeds to Step S401, in which an angular-velocity signal which is supplied from the angular-velocity detector 301 via the DC cut filter 302 and the amplifier 303 is converted into a digital signal by the A/D converter 304. The digital signal is inputted into the microcomputer COM4. In Step S402, a decision is made as to panning and tilting as well as the state of photography in a manner similar to that used in the ninth embodiment, on the basis of the angular-velocity signal and the angular-displacement signal. On the basis of a variation in a vibration, a decision is made as to whether the photography is being performed with the camera held by the hand, whether the photography is being performed in a running vehicle, and so on. If the angular-velocity signal is constant and the angular-displacement monotonously increases, a decision is made as to panning and tilting.

In Step S403, the center frequency of the vibration is obtained by performing a computation on the angular-velocity signal. In Step S404, a characteristic coefficient for setting the characteristic of the HPF 310 is read on the basis of the result of the decision as to panning and tilting as well as the state of photography and the result of the detection of the center frequency of the vibration.

Various methods of determining the characteristic coefficient are available in Step S403. For example, retrieval from a data table may be performed on the basis of the values of the results of both decisions, or the characteristics indicated by individual characteristic coefficients are compared, and a frequency coefficient indicative of a higher cut-off frequency may be set. Basically, control is performed so that, during panning or tilting, the cut-off frequency of the HPF is shifted toward a high-frequency side with respect to the cut-off frequency of the HPF obtained from the result of the detection of the center frequency of the vibration.

The coefficients corresponding to panning and tilting as well as the state of photography are values obtained from experience.

In Step S405, a computation on the frequency characteristic of the HPF 310 is performed on the basis of the aforesaid characteristic coefficient. In Step S406, the output signal of the HPF 310 is converted into an angular-displacement signal (image-shake correction signal) by an integration computation performed by the integrator 305.

In Step S407, the result of the integration computation, i.e., the corrected angular-displacement signal is converted into an analog signal by the D/A converter 307 or into a pulse signal such as a PWM signal, and the analog signal or the pulse signal is outputted from the microcomputer COM4. The output of the microcomputer COM4 is supplied to the driving circuit 308 and the image correcting means 309 is driven to operate in the direction in which the image shake is corrected, thereby effecting an image-shake correcting operation.

(Eleventh Embodiment)

According to how is the characteristic of the angular-velocity detecting means or the image correcting system or how the angular-velocity detecting means and the image correcting system are combined with each other, the image-shake correction may have the opposite effect on the frequency characteristics of the entire system within a particular frequency range, for example, 30 Hz or above.

This frequency range is determined by the limits of the detection characteristics of an angular-velocity sensor which constitutes the angular-velocity detecting means and the correction limits of the image-shake correcting means, such as a VAP. As the frequency of a vibration becomes higher, it becomes difficult for a vibration detecting system and the image correcting system to track the vibration without any delay, and a phase delay increases. At a particular frequency, the phase of the vibration and the driving phase of the VAP coincide with each other, so that the vibration may be amplified.

According to the eleventh embodiment, to prevent occurrence of the aforesaid opposite effect, the operation of the image correcting system is stopped if a frequency within the frequency range in which the image-shake correction has the opposite effect is detected by the frequency detecting means 313.

In the eleventh embodiment, the circuit arrangement shown in FIG. 22 may be employed. If the frequency detecting means 313 detects the above-described frequency range, the microcomputer COM2 computes an inhibit signal and outputs the inhibit signal to the driving circuit 308 so that the driving circuit 308 holds the correcting system, such as the VAP, at the center point of the image-shake correction range thereof.

The processing operation of the microcomputer COM2 according to the eleventh embodiment will be described below with reference to the flowchart of FIG. 38. In the following flowchart, it is assumed that the image-shake correction provides the opposite effect at 30 Hz or above.

Figure 38:
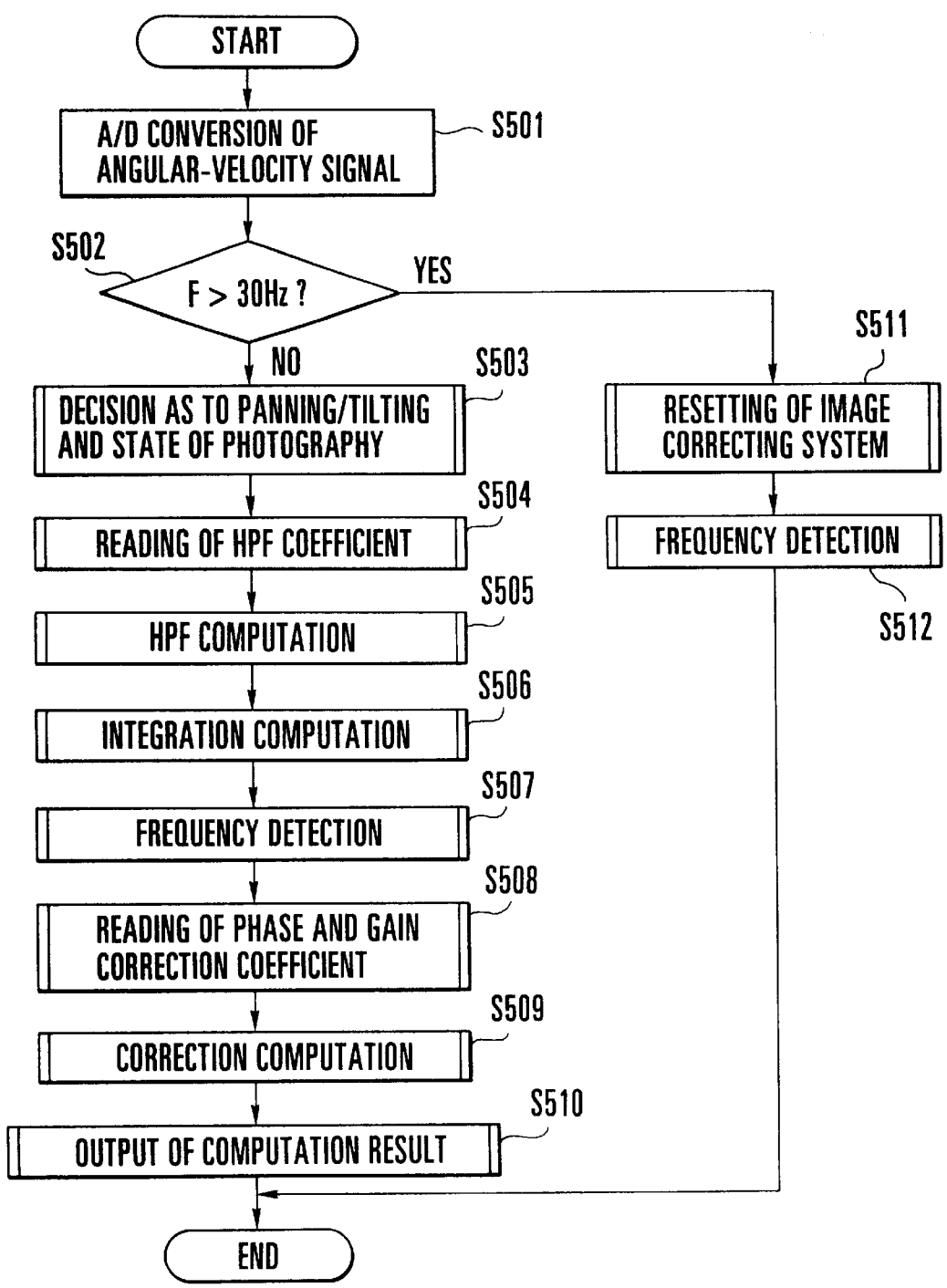
FIG. 38 is a flowchart showing an eleventh embodiment of the image-shake correcting device according to the present invention.

Referring to FIG. 38, when control is started, the process proceeds to Step S501, in which an angular-velocity signal supplied from the angular-velocity detector 301 via the DC cut filter 302 and the amplifier 303 is converted into a digital signal by the A/D converter 304, and the digital signal is inputted into the microcomputer COM2.

If it is determined in Step S502 that the frequency of a vibration has reached 30 Hz, the process proceeds to Step S511. If the frequency of the vibration has not reached 30 Hz, the process proceeds to Step S503.

In Step S503, a decision is made as to panning and tilting as well as the state of photography, on the basis of the angular-velocity signal and the angular-displacement signal. In Step S504, a characteristic coefficient for setting the characteristic of the HPF 310 is read on the basis of the result of the decision. Incidentally, the coefficients corresponding to panning and tilting as well as the state of photography are values obtained from experience.

In Step S505, a computation on the frequency characteristic of the HPF 310 is performed on the basis of the aforesaid characteristic coefficient. In Step S506, the output signal of the HPF 310 is converted into an angular-displacement signal (image-shake correction signal) by an integration computation performed by the integrator 305. In Step S507, the center frequency of the vibration is detected by performing a computation on the angular-velocity signal.

In Step S508, coefficients for phase and gain correction corresponding to the vibration frequency obtained in Step S507 are read. In Step S509, a correction computation is performed on the basis of the coefficients obtained in Step S508.

In Step S510, the obtained result of the computation, i.e., a corrected angular-displacement signal, is converted into an analog signal by the D/A converter 307 and into a pulse signal such as a PWM signal. The analog signal or the pulse signal is outputted from the microcomputer COM2 to the driving circuit 308, and the image correcting means 309 such as a VAP is driven, thus bringing the process to an end.

If it is determined in Step S502 that the vibration frequency F is 30 Hz or above, i.e., the vibration frequency F is in a frequency range in which the image-shake correction has the opposite effect, the process proceeds to Step S511, in which resetting of the image correcting system is performed to hold the image correcting system at the center point of the image-shake correction range thereof. In Step S512, the center frequency of the vibration is detected on the basis of the angular-velocity signal, and the process is brought to an end. Thus, one cycle of the processing of the flowchart of FIG. 38 is completed.

The flowchart of FIG. 38 shows one cycle of the processing, and is repeated in practice.

Means for setting the image correcting system will be described below. A stepping motor such as that shown in FIG. 30 may be used as the image correcting system. In this arrangement, if no signal is transmitted, the stepping motor is at a standstill at the current state. Accordingly, the stepping motor is returned to and stopped at its center position.

A voice-coil motor such as that shown in FIG. 28 may be employed as the image correcting system. In this arrangement, a center-position signal may be outputted as the control signal 420. However, if a high-frequency vibration is applied due to the relationship between the mass of the VAP or the like and the torque of the voice coil, the image correcting system may be unable to be held at the center position. For this reason, although not shown, it is preferable to use a mechanism lock part for mechanically holding the VAP.

As described above, according to the eleventh embodiment of the image-shake correcting device, the primary frequency range of a vibration during photography is detected on the basis of a signal outputted from the angular-velocity detecting means, such as a vibration gyro, which is used for vibration detection, and the detected vibration frequency is employed for control purpose, whereby it is possible to achieve optimum image-shake correction corresponding to any photographic condition and environment.

Another advantage of the eleventh embodiment is that since a maximum correction effect can be achieved at the primary frequency band of a vibration applied to the photographic apparatus including the image-shake correcting device, it is possible to efficiently correct an image shake due to an applied vibration having a specific frequency distribution.

A twelfth embodiment of the present invention will be described below. First of all, the background of the twelfth embodiment will be described.

To photograph a continuous scene, an image-shake correcting device used in a photographic apparatus, particularly a video movie camera such as a video camera, needs to have the ability to distinguish an unnecessary vibration, such as an unintended camera shake, from a photographers' intentional motion such as panning or tilting. (This ability is referred to as the "panning detection".)

Figure 39:
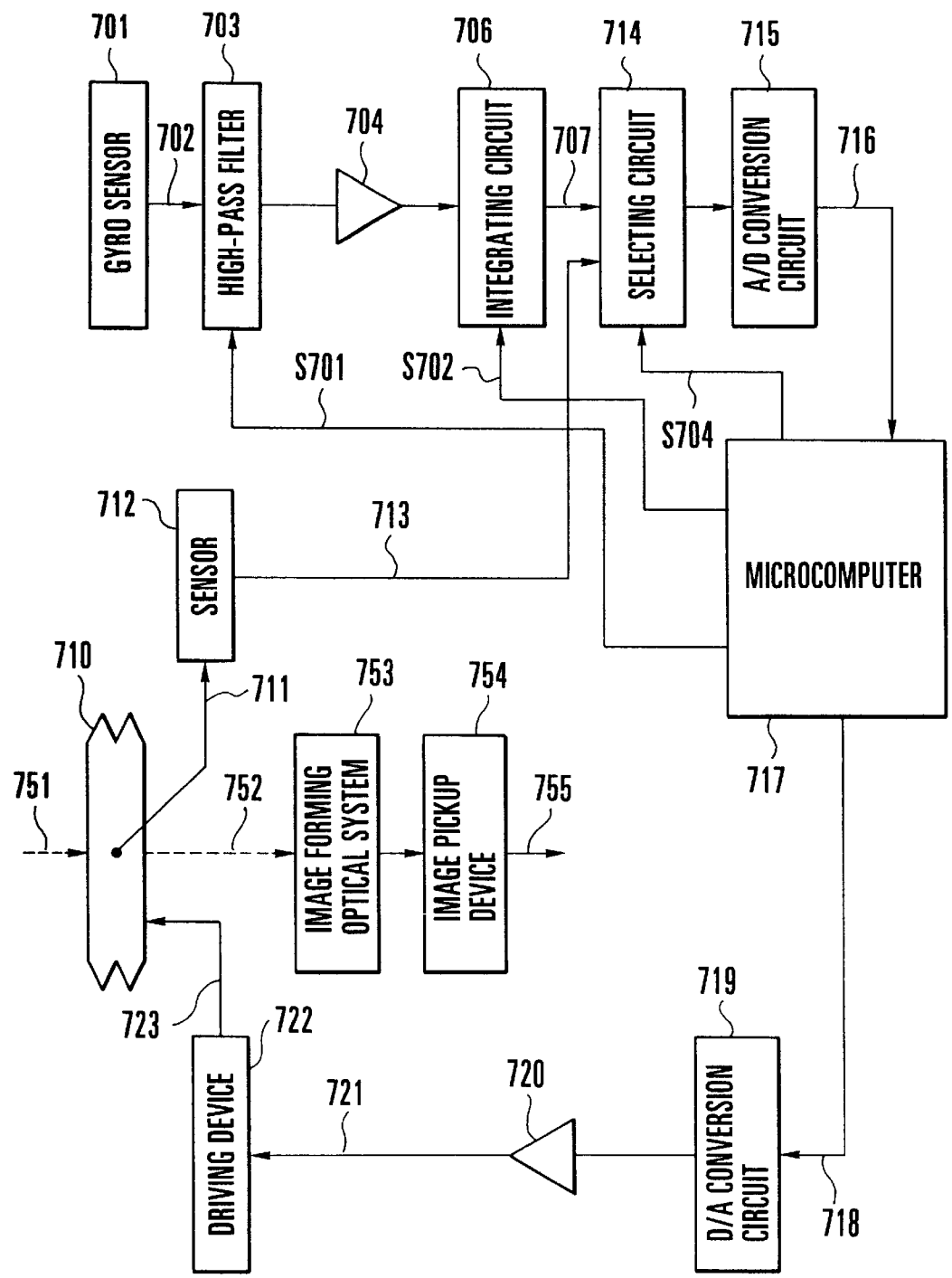
FIG. 39 is a block diagram which serves to explain the background of twelfth and thirteenth embodiments of the present invention, and shows the basic arrangement of an image-shake correcting device.

The basic arrangement of the image-shake correcting device related to the twelfth embodiment is, for example, as shown in FIG. 39.

Referring to FIG. 39, the vibration detecting system of the apparatus is provided with a gyro sensor 701. An angular-velocity electrical signal 702 outputted from the gyro sensor 701 is supplied to a high-pass filter 703. The high-pass filter 703 can alter its high-frequency pass characteristic in response to a control signal S701. The output of the high-pass filter 703 is supplied to an integrating circuit 706 via a buffer amplifier 704. The integrating circuit 706 can alter its integration characteristic in response to a control signal S702. An output signal 707 serves as angular-velocity information.

The image-shake correcting system of-the image-shake correcting device includes a variable angle prism 710 capable of varying the direction of progression of incident light, and angular-velocity information 711 is converted into an electrical signal 713 by a sensor 712. A driving digital signal 718 from a microcomputer 717 is converted into a driving analog signal by a D/A conversion circuit 719. The driving analog signal is supplied to a driving device 722 as a driving signal 721 via an electric-power amplifying circuit 720. The driving device 722 generates a driving force 723 to operate the variable angle prism 710.

Accordingly, photographic incident light 751 is formed into transmitted light 752 by adjusting the angle of the photographic incident light 751. The transmitted light 752 passes through an image-forming optical system 753 and is focused on an image pickup device 754. The image pickup device 754 outputs an image pickup signal 755.

The control system of the image-shake correcting device includes the microcomputer 717. An input selecting signal S704 outputted from the microcomputer 717 is supplied to a selecting circuit 714, while the signal 707 or 713 is supplied to an A/D conversion circuit 715. The selected signal is converted into a digital signal 716 by A/D conversion executed by the A/D conversion circuit 715, and the digital signal 716 is inputted into the microcomputer 717.

The basic operation of the image-shake correcting device having the above-described system arrangement will be described below.

In the image-shake correcting device, the output signal 707 and the electrical signal 713 are subtracted from each other, and the driving digital signal 718 is outputted on the basis of the result of the subtraction. The image-shake correcting device is controlled so that the signals 707 and 713 are equivalent to each other at all times.

Specifically, the range of variation of the apex angle of the variable angle prism 710 has limits in its positive and negative directions, respectively. If the variable angle prism 710 is to be driven to vary beyond either of the limits, the variable angle prism 710 abruptly stops to cause an abrupt variation in an image, thereby extremely distorting the image. Further, a large load is applied to the correcting system. For these reasons, it is necessary to control the variable angle prism 710 as carefully as possible so that the range of variation of the apex angle does not exceed either of the limits. Although it is not particularly necessary to cope with a variation of small amplitude, if no measures are taken against a vibration of large amplitude, panning or tilting, a large variation easily occurs in an integral voltage, with the result that either of the limits is ignored. A method for coping with the above-described problem will be described below with reference to the flowchart shown in FIG. 40.

The shown system monitors the value (x) of the signal 713. If the value (x) exceeds a first predetermined value (V1), the characteristic of the high-pass filter 703 is shifted toward a higher-frequency side by the control signal S701, thereby limiting a large variation of a low frequency due to panning or tilting. (While a normal mode is called "mode 0" (Step S501), the state in which the large variation of the low frequency is limited is called "mode 1" (Step S504).) If the value (x) of the signal 713 exceeds a second predetermined value (V2) greater than the first predetermined value (V1) (Step S503), the characteristic of the integrating circuit 706 is varied by the control signal S702 in the direction in which a centripetal force becomes stronger (for example, 5 seconds→2 seconds (time constant)) (mode 2). Thus, the variable angle prism 710 is brought to a stop within the limits (Step S505). In this system, whether the mode 1 or 2 is to be changed to the mode 0 is determined by a timer (Step S506).

According to the above-described method, by altering the characteristic of the arrangement up to the integrating circuit 706 by means of the panning detection, it is possible to realize a good, image-shake correction characteristic within the correction limits of the correcting system. However, since the characteristic is altered in such a way that a detection frequency range is made narrow, information about panning or tilting is interrupted. Also, although the characteristic altered by the panning detection is maintained for a certain predetermined time, if the predetermined time elapses, the altered characteristic is returned to a normal characteristic. In actual photography, a photographer may intentionally complete panning or tilting before the predetermined time elapses, or may intentionaly continue panning or tilting after the predetermined time elapses. In such a case, it is not always possible to execute optimum panning detection and control.

Accordingly, an object of the twelfth embodiment is to provide an image-shake correcting device capable of executing optimum panning detection and control at all times.

To achieve the above object, according to the twelfth embodiment, there is provided an image-shake correcting device which includes a filter circuit arranged to pass therethrough only a high-frequency component of an angular-velocity signal outputted from an angular-velocity detecting element and also arranged to vary its frequency characteristics in response to a first control signal, and an integrating circuit arranged to integrate the angular-velocity signal passing through the filter circuit and outputting an angle signal and also arranged to vary the angle signal on the basis of a time constant set by a second control signal, the image-shake correcting device being arranged to control the characteristic of each of the filter circuit and the integrating circuit by the first and second control signals, thereby eliminating an unnecessary vibration component. The image-shake correcting device is also provided with signal processing means for performing signal processing of an output of the angular-velocity detecting element without using the filter circuit nor the integrating circuit, thereby detecting an angular displacement. The image-shake correcting device determines whether an input status of the unnecessary vibration component is complete, on the basis of an output of the signal processing means, and returns, if the input status of the unnecessary vibration component is complete, the characteristic of each of the filter circuit and the integrating circuit to a characteristic corresponding to a normal mode.

In the above-described arrangement, it is determined whether the input status of the unnecessary vibration component is complete, on the basis of the output signal of the signal processing means. More specifically, since the input of the unnecessary vibration component is limited in the case of the output signal of the integrating circuit for integrating the angular-velocity signal passing through the filter circuit, it is impossible to detect whether the input status of the unnecessary vibration component is complete, from the output signal of the integrating circuit. However, since such limitation is not contained in the output signal of the signal processing means, it is always possible to detect the presence or absence of the input of the unnecessary vibration component by tracking the variation of the value of the output signal of the signal processing means. In the above-described manner, it is quickly detected that the input status of the unnecessary vibration component is complete, whereby the characteristic of each of the filter circuit and the integrating circuit is returned to the characteristic corresponding to the normal mode.

(Twelfth Embodiment)

Figure 41:
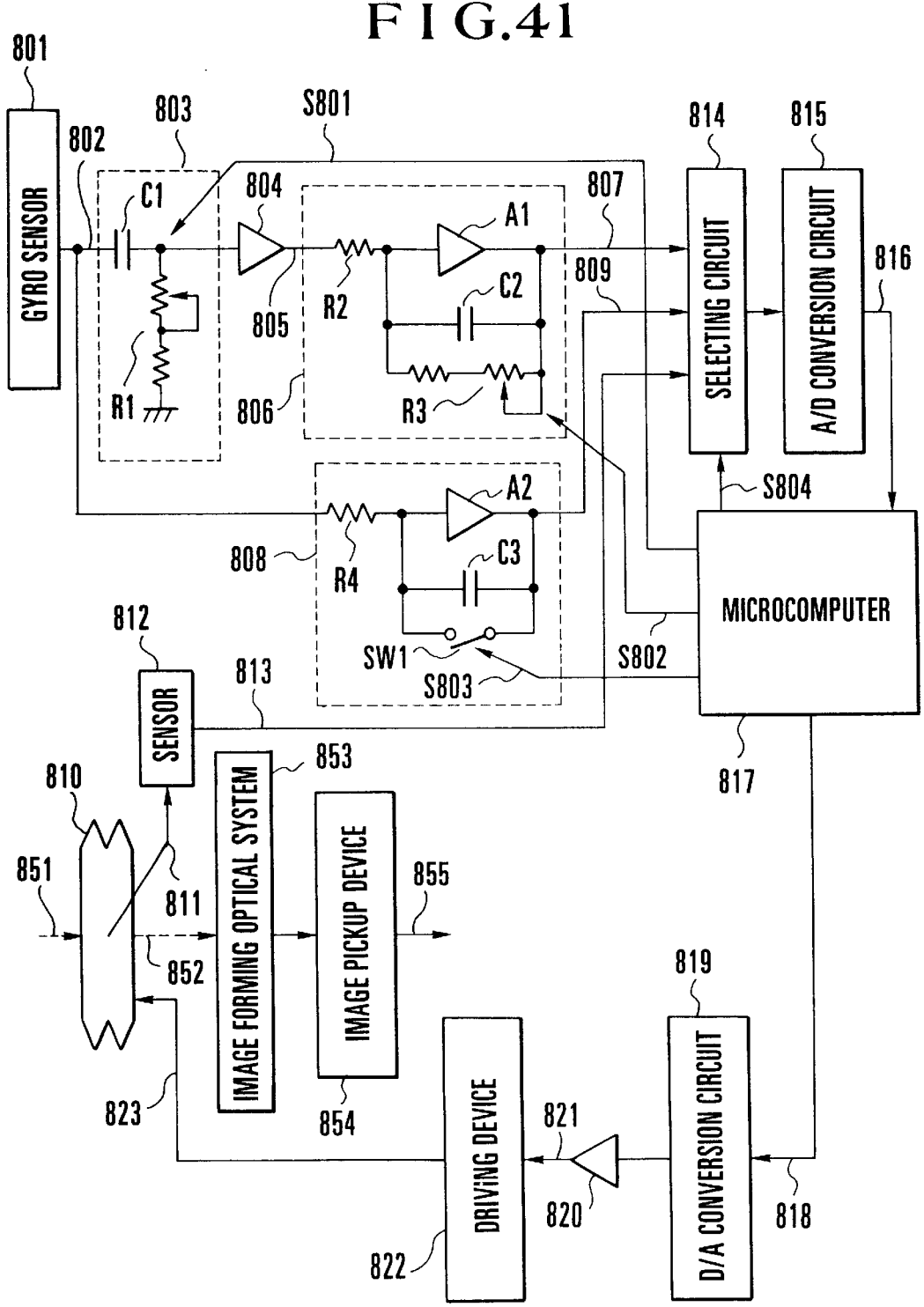
FIG. 41 is a block diagram showing the arrangement of the twelfth embodiment of the present invention.

FIG. 41 is a block diagram showing the twelfth embodiment of the image-shake correcting device according to the present invention.

The shown image-shake correcting device is provided in a photographic apparatus such as a video movie camera, and includes a detecting system for detecting a vibration component applied to a camera body, a correcting system for eliminating an necessary vibration component, and a control system for controlling the detecting system and the correcting system.

In the detecting system of the image-shake correcting device shown in FIG. 41, a gyro sensor (angular-velocity detecting element) 801 outputs an electrical signal 802 corresponding to a detected angular velocity. The angular-velocity electrical signal 802 is supplied to a high-pass filter 803. The high-pass filter 803 is made up of a capacitor C1 and a resistor R1, and the high-frequency pass characteristic of the high-pass filter 803 can be altered by varying the resistance value of the resistor R1 by a control signal S801 supplied from a microcomputer 817 which will be described later. A buffer amplifier 804 and an integrating circuit 806 are sequentially connected to the output side of the high-pass filter 803.

The buffer amplifier 804 supplies a signal 805 of low impedance to the integrating circuit 806, and the integrating circuit 806 is made up of an operational amplifier A1, a capacitor C2, a resistor R2 and a resistor R3. The integration characteristic of the integrating circuit 806 can be altered by varying the resistance value of the resistor R3 by a control signal S802 supplied from the microcomputer 817. An output signal 807 from the integrating circuit 806 represents angular-velocity information.

The electrical signal 802 is simultaneously supplied to an integrating circuit (signal processing means) 808. The integrating circuit 808 is made up of an operational amplifier A2, a capacitor C3, a resistor R4 and a switch SW1, and the switch SW1 opens and closes in accordance with a control signal S803 to reset an integral voltage. An output signal 809 of the integrating circuit 808 is supplied to the input side of a selecting circuit 814. The output signal 809 also represents angular-velocity information, but differs from the output signal 807 of the integrating circuit 806 in that the output signal 809 is obtained by integrating the angular-velocity electrical signal 802 which is not at all processed. It is, therefore, possible to accurately grasp the movement of the camera body by monitoring the output signal 809.

The correcting system includes a variable angle prism 810 capable of varying the apex angle thereof by an external force and altering the direction of progression of incident light. The structure of the variable angle prism 810 is such that a liquid is charged into the space between two glasses which are movably connected by a bellows. Angular-velocity information 811 from the variable angle prism 810 is converted into an electrical signal 813 by a sensor 812 and the electrical signal 813 is supplied to the input side of the microcomputer 817.

A driving digital signal 818 from the microcomputer 817 is converted into a driving analog signal by a D/A conversion circuit 819, and the driving analog signal is amplified by an electric-power amplifying circuit 820, thereby preparing a driving signal 821. The driving signal 821 is outputted to a driving device 822. The driving device 822 generates a driving force 823 to operate the variable angle prism 810.

Photographic incident light 851 has its angle adjusted by the variable angle prism 810 and is formed into transmitted light 852. The transmitted light 852 passes through an image-forming optical system 853 and is focused on an image pickup device 854, and an image pickup signal 855 is outputted from the image pickup device 854.

The control system includes the microcomputer 817. An input selecting signal S804 is applied to the selecting circuit 814, and any one of the signals 807, 809 and 813 is supplied to an A/D conversion circuit 815. The selected signal is converted into a digital signal 816 by A/D conversion executed by the A/D conversion circuit 815, and the digital signal 816 is inputted into the microcomputer 817.

The basic operation of the image-shake correcting device having the above-described system arrangement will be describe below.

The basic operation of the entire system is as follows: The output signal 807 supplied from the integrating circuit 806 is subtracted from the electrical signal 813 supplied from the sensor 812, and the digital signal 816 is outputted on the basis of the resultant value, whereby control is executed so that the output signal 807 and the output signal 813 are made equal to each other at all times.

Figure 42:
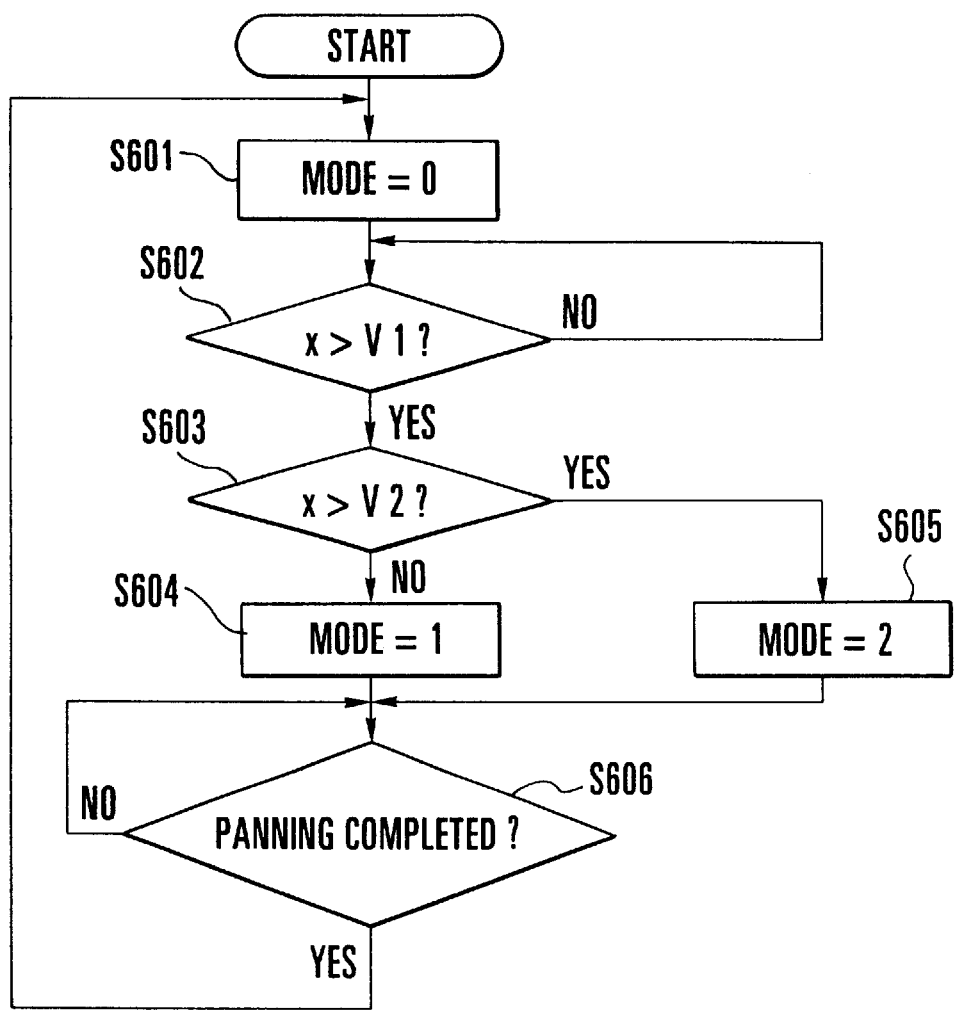
FIG. 42 is a flowchart which serves to explain the operation of the twelfth embodiment, shown in FIG. 41, of the present invention.

A process for coping with a vibration of large amplitude, panning or tilting in accordance with the twelfth embodiment will be described below with reference to the flowchart shown in FIG. 42.

In the shown system, a value x of the output signal 813 from the sensor 812 (which is basically equal to the signal 809) is monitored. In the case of the normal mode (mode=0), the value x is within a first predetermined value (V1) (Step S601). If the mode 1 is selected in which the value x of the output signal 813 exceeds the first predetermined value (V1), the value of the resistor R1 is made small by the control signal S801, thereby shifting the characteristic of the high-pass filter 803 toward a high-frequency side (for example, 0.1 Hz→1 Hz). Thus, a large variation of a low frequency due to panning or tilting is limited (Step S602).

Then, the value x of the output signal 813 is compared with a second predetermined value (V2) greater than the first predetermined value (Step S603). If the value x is within the second predetermined value (V2), the aforesaid operation in the mode 1 is continued (Step S604). If the mode 2 is selected in which the value x exceeds the predetermined value (V2), the value of the resistor R3 is made small by the control signal S802, thereby varying the characteristic of the integrating circuit 806 in the direction in which a centripetal force becomes stronger (for example, 5 seconds→2 seconds (time constant)). Thus, the variable angle prism 810 is brought to a stop within the limits (Step S605).

Figure 40:
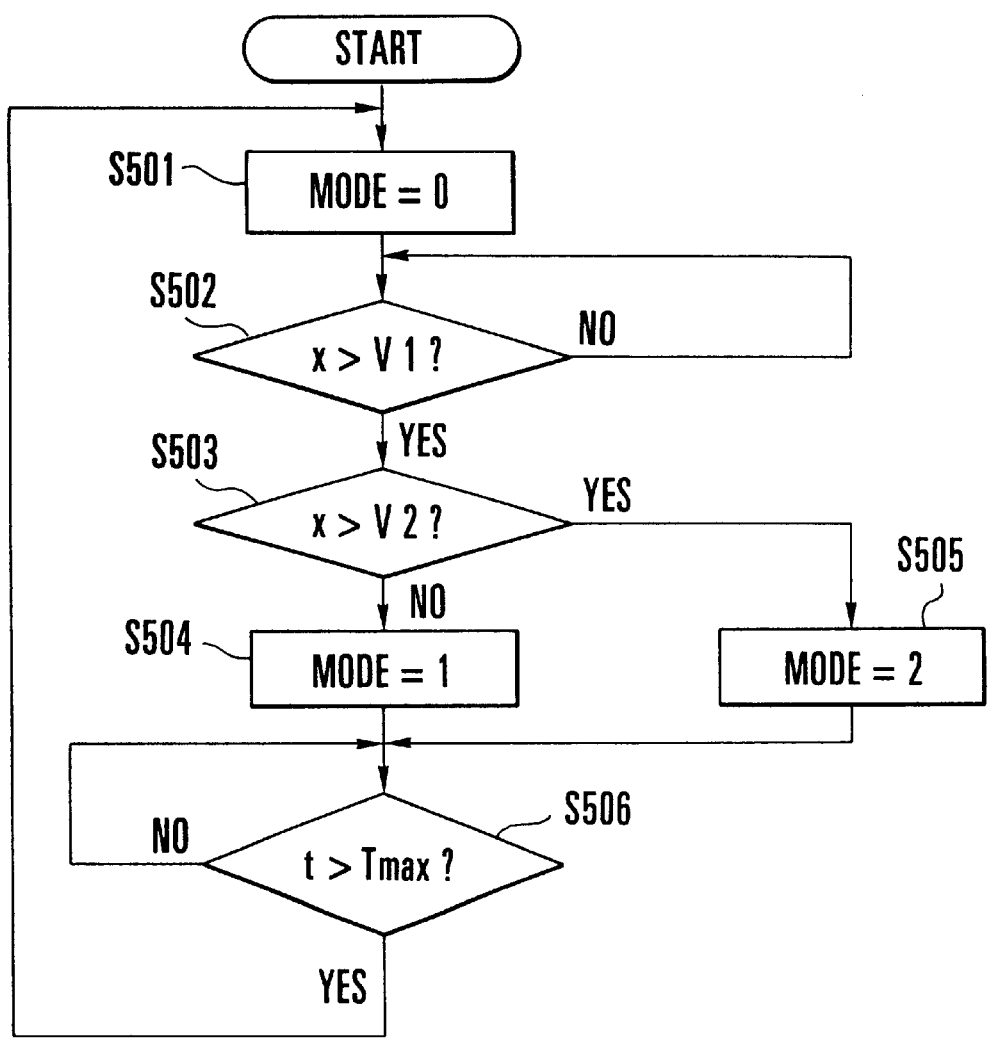
FIG. 40 is a flowchart which serves to explain the operation of the arrangement shown in FIG. 39.

However, the above-described process lowers the characteristics of an image-shake correcting function similarly to the arrangement which is shown in FIGS. 39 and 40 as the background of the twelfth embodiment.

For this reason, in the twelfth embodiment, in Step S606, it is quickly detected whether an undesired input status (an input of an unnecessary vibration component) is complete, and as soon as it is detected that the undesired input status is complete, the characteristics of the high-pass filter 803 and the integrating circuit 806 are returned to the characteristics corresponding to the normal mode. Whether the undesired input status is complete is determined on the basis of the output signal 809 of the integrating circuit 808. In the case of the output signal 807 of the integrating circuit 806, since the input of the undesired signal is limited in either of the mode 1 and the mode 2, it is impossible to detect whether the input status of the undesired signal is complete. In contrast, since such limitation is not at all contained in the output signal 809 of the integrating circuit 808, it is always possible to detect the presence or absence of the input of the undesired signal by tracking the variation of the value of the output signal 809.

The aforesaid decision using the output signal 809 is made according to whether the output signal 809 is a vibrational signal whose value crosses zero or a monotonous increase signal. If the output signal 809 continues to be the monotonous increase signal, it is determined that the panning detection has not been completed. Incidentally, the switch SW1 is provided for resetting the value of the output signal 809 to zero by being closed by the control signal S803 when the output signal 809 tends to be saturated. Accordingly, the switch SW1 does not hinder a decision to be made as to the status of the angle signal.

(Thirteenth Embodiment)

Figure 43:
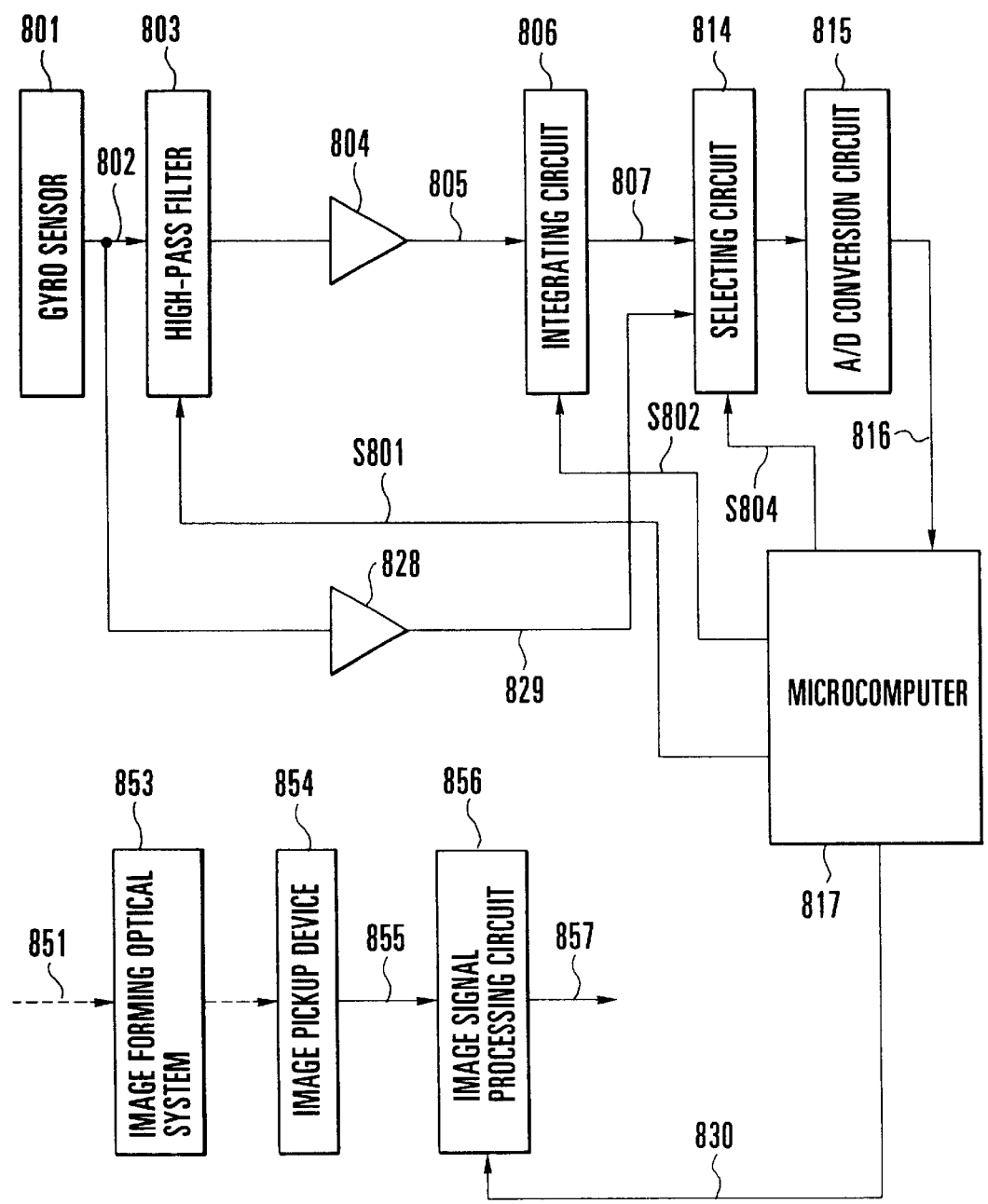
FIG. 43 is a block diagram showing the arrangement of the thirteenth embodiment of the present invention.

FIG. 43 is a block diagram showing the arrangement of a thirteenth embodiment of the image-shake correcting device according to the present invention.

The thirteenth embodiment differs from the twelfth embodiment in the following respects. In the thirteenth embodiment, an amplifying circuit 828 is substituted for the integrating circuit 808 as signal processing means which constitutes a detecting system for detecting an angular displacement, so that a method of directly monitoring an angular velocity is adopted. Regarding a correcting system, the optical system of the variable angle prism 810 is omitted, and an image signal processing circuit 856 connected to the output side of the image pickup device 854 is employed. A signal produced by image processing executed by the image signal processing circuit 856 is further processed, as by controlling the timing of a synchronizing signal, and the thus-processed signal is used in the correcting system. Incidentally, in FIG. 43, reference numeral 830 denotes a readout address specifying signal.

The detecting system according to the thirteenth embodiment has the advantages that it is possible to simplify the circuit arrangement of the detecting system and that it is possible to comparatively rapidly make a decision as to the presence or absence of an undesired signal input. The correcting system according to the thirteenth embodiment has the advantage that the correcting system can be constructed of a reduced number of hardware parts.

As described above in detail, according to the third embodiment, there is provided an image-shake correcting device which includes a filter circuit arranged to pass therethrough only a high-frequency component of an angular-velocity signal outputted from an angular-velocity detecting element and also arranged to vary its frequency characteristics in response to a first control signal, and an integrating circuit for integrating the angular-velocity signal passing through the filter circuit and outputting an angle signal, the integrating circuit being arranged to vary the angle signal on the basis of a time constant set by a second control signal, the image-shake correcting device being arranged to control the characteristic of each of the filter circuit and the integrating circuit by the first and second control signals, thereby eliminating an unnecessary vibration component. The image-shake correcting device is also provided with signal processing means for performing signal processing of an output of the angular-velocity detecting element without using the filter circuit nor the integrating circuit, thereby detecting an angular displacement. The image-shake correcting device determines whether an input status of the unnecessary vibration component is complete, on the basis of an output of the signal processing means, and returns, if the input status of the unnecessary vibration component is complete, the characteristic of each of the filter circuit and the integrating circuit to a characteristic corresponding to a normal mode. Accordingly, it is possible to accurately and rapidly make a decision as to the presence or absence of the unnecessary vibration component in a status such as panning, whereby it is possible to execute optimum panning detection control at all times.

What is claimed is:

1. A shake compensating apparatus, comprising:
    a) detecting means for detecting a shake of the apparatus;
    b) filter means for extracting a predetermined frequency component signal;
    c) computing means for computing a compensation value on the basis of the predetermined frequency component signal and a time delay between said shake and a shake detecting operation of said detecting means; and
    d) compensating means for compensating a movement of an image caused by the shake of the apparatus on the basis of the compensation value.

2. An apparatus according to claim 1, wherein said compensating means compensates the movement of the image with an image signal.

3. A shake compensating apparatus, comprising:
    a) detecting means for detecting a shake of the apparatus and outputting a shake detecting value;
    b) delay correcting means for correcting the shake detecting value output from said detecting means so as to compensate a time delay between the shake and a shake detecting operation of said detecting means;
    c) computing means for computing a shake compensation value on the basis of an output of said delay correcting means; and
    d) compensating means for compensating a movement of an image caused by the shake of the apparatus on the basis of the compensation value.

4. An apparatus according to claim 3, wherein said delay correcting means compensates the time delay in an analog signal process.

5. An apparatus according to claim 3, wherein said delay correcting means compensates the time delay in a digital signal process.

6. An apparatus according to claim 3, wherein said compensating means compensates the movement of the image with an image signal.

7. An apparatus according to claim 3, further comprising:
    gain correcting means for correcting a gain of detecting means.

8. A camera apparatus comprising:
    a) shake detecting means;
    b) phase correcting means for shifting a phase of an output of said shake detecting means by a predetermined amount corresponding to a delay of a shake detecting operation of said shake detecting means;
    c) computing means for computing a shake correcting signal on the basis of an output of said phase correcting means; and
    d) correcting means for correcting a movement of an image caused by shake on the basis of the shake correcting signal outputted by said computing means.

9. A camera apparatus according to claim 8, wherein said phase correcting means performs a phase advance correction which compensates delay of the phase of the output of said shake correcting means.

10. An apparatus according to claim 8, wherein said phase correcting means shifts the phase in an analog signal process.

11. An apparatus according to claim 8, wherein said phase correcting means shifts the phase in a digital signal process.

12. An apparatus according to claim 8, wherein said correcting means compensates the movement of the image with an image signal.

13. An apparatus according to claim 8, further comprising:
    gain correcting means for correcting a gain of said shake detecting means.

14. A camera apparatus comprising:
    a) shake detecting means;
    b) filter means for performing phase advance compensation which advances a phase of an output of said shake detecting means on the basis of a delay of a shake detecting operation of said shake detecting means;

c) computing means for computing a shake correcting signal on the basis of an output of said filter means; and d) correcting means for correcting a movement of an image caused by shake on the basis of the shake correcting signal outputted from said computing means.

15. An apparatus according to claim 14, wherein said filter means advances the phase in an analog signal process.

16. An apparatus according to claim 14, wherein said filter means advances the phase in a digital signal process.

17. An apparatus according to claim 14, wherein said correcting means compensates the movement of the image with an image signal.

18. An apparatus according to claim 14, further comprising:

gain correcting means for correcting a gain of said shake detecting means.

19. A camera apparatus comprising:

a) an angle speed sensor for detecting shake;

b) correcting means for correcting a shake of an image caused by the shake according to an output of said angle speed sensor; and c) delay compensating means, located between said angle speed sensor and said correcting means, for compensating a delay in detection of generation of the shake.

20. An apparatus according to claim 19, wherein said delay compensating means compensates the delay in an analog signal process.

21. An apparatus according to claim 19, wherein said delay compensating means compensates the delay in a digital signal process.

22. An apparatus according to claim 19, wherein said correcting means corrects the movement of the image with an image signal.

23. An apparatus according to claim 19, further comprising:

gain correcting means for correcting a gain of angle speed sensor.

24. A camera comprising:

a) an angle speed sensor for detecting shake;

b) correcting means for correcting a movement of an image caused by the shake according to an output of said angle speed sensor; and c) phase compensating means for compensating a predetermined delay in a transmission system formed by said angle speed sensor and said correcting means.

25. A camera according to claim 24, wherein said phase compensating means compensates the predetermined delay in an analog signal process.

26. A camera according to claim 24, wherein said phase compensating means compensates the predetermined delay in a digital signal process.

27. A camera according to claim 24, wherein said correcting means compensates the movement of the image with an image signal.

28. A camera according to claim 24, further comprising:

gain correcting means for correcting a gain of said shake detecting means.

29. An apparatus comprising:

a shake detection device;

a compensation device that compensates a shake of an image in accordance with said shake detection device; and a delay correction device that corrects a shake detection time delay between the shake and a shake detection operation of said shake detection device.

30. An apparatus according to claim 29, wherein said delay correction device comprises a filter.

31. An apparatus according to claim 29, wherein said delay correction device advances a phase of an output of said shake detection device.

32. An apparatus according to claim 29, wherein said delay correction device corrects the shake detection delay in an analog signal process.

33. An apparatus according to claim 29, wherein said delay correction device corrects the shake detection delay in a digital signal process.

34. An apparatus according to claim 29, wherein said compensation device compensates the shake of the image with an image signal.

35. An apparatus according to claim 29, further comprising:

gain correcting means for correcting a gain of said shake detection device.

36. An apparatus according to claim 29, wherein said apparatus comprises a camera.

37. An apparatus according to claim 29, wherein said apparatus comprises an optical apparatus.

* * * * *

UNITED STATES PATENT AND TRADEMARK OFFICE
CERTIFICATE OF CORRECTION

PATENT NO. : 6,233,009 B1　　　　　　　　　　　　　　　　　　Page 1 of 1
DATED : May 15, 2001
INVENTOR(S) : Tsuyoshi Morofuji; Akihiro Fujiwara It is certified that error appears in the above-identified patent and that said Letters Patent is hereby corrected as shown below:

Column 1,
Line 59, delete "phothotographic" and insert -- photographic --.

Column 3,
Line 46, delete "imageshake" and insert -- image-shake --.

Column 10,
Line 55, delete "1a" and insert -- 10a --.

Column 14,
Line 16, delete "obtain e" and insert -- obtained --.

Column 31,
Line 54, delete "$_{w0}$" and insert -- w 0 --

Column 37,
Line 9, delete "AID" and insert -- A/D --.

Signed and Sealed this

Fifth Day of March, 2002

*Attest:*

JAMES E. ROGAN
*Attesting Officer*　　　*Director of the United States Patent and Trademark Office*